United States Patent [19]

Anderson

[11] Patent Number: 4,514,815
[45] Date of Patent: Apr. 30, 1985

[54] COMPUTERIZED SYSTEM AND METHOD OF MATERIAL CONTROL

[75] Inventor: Nils A. Anderson, Paradise Valley, Ariz.

[73] Assignee: Honeywell Information Systems Inc., Phoenix, Ariz.

[21] Appl. No.: 325,377

[22] Filed: Nov. 27, 1981

Related U.S. Application Data

[63] Continuation-in-part of Ser. No. 61,124, Jul. 27, 1979, abandoned.

[51] Int. Cl.³ .............................................. G06F 15/24
[52] U.S. Cl. .................................... 364/478; 235/385
[58] Field of Search ............... 364/478, 479, 468, 403, 364/469; 235/383, 385, 465, 375, 469; 101/2; 382/8

[56] References Cited

U.S. PATENT DOCUMENTS

| | | | |
|---|---|---|---|
| 3,637,989 | 1/1972 | Howard | 235/385 X |
| 3,751,637 | 8/1973 | Dillon et al. | 235/385 X |
| 3,988,571 | 10/1976 | Blair et al. | 235/385 X |
| 4,024,380 | 11/1977 | Gunn | 235/432 |
| 4,028,537 | 6/1977 | Snow | 235/385 X |
| 4,075,605 | 2/1978 | Hilley et al. | 382/8 |
| 4,084,742 | 4/1978 | Silverman | 235/383 |
| 4,141,078 | 2/1979 | Bridges, Jr. et al. | 364/419 X |
| 4,180,204 | 12/1979 | Koenig et al. | 235/385 |
| 4,365,148 | 12/1982 | Whitney | 235/383 |
| 4,398,253 | 8/1983 | Karp et al. | 235/383 X |

Primary Examiner—Joseph Ruggiero
Attorney, Agent, or Firm—A. A. Sapelli; L. J. Marhoefer; J. S. Solakian

[57] ABSTRACT

A system and method for material control to allow tracking and prevent diversion of articles within the system having a computer connected to a visual display, a keyboard, and printer. The computer is also connected to an OCR device for reading labels associated with articles within the system. Each article is provided with a swerialized initial label when it enters the system having the nature of the article and a serial number disposed thereon. The initial label contains a character field which it is OCR readable by the OCR device. After a reading of the initial label of each article by the OCR device, the computer generates a unique identifying indicia for that article which is utilized by a printer to print a sequential label with the indicia disposed thereon. The sequential label is then associated with the article to allow tracing and to prevent diversion of the article.

8 Claims, 10 Drawing Figures

Fig-3

| 88 DES | MNEM | SERIAL | ARTICLE 89 | REVISIONS | 58009320 | 84 NSAIB |
|---|---|---|---|---|---|---|
| 23391 | NSAIB | M0460 | 58009320 / | 76 | SER=0460 | 233931 |
| DES | MNEM | SERIAL | ARTICLE | REVISIONS | 58009320 | 85 NSAIB |
| 23391 | NSAIB | M0461 | 58009320 / | 77 | SER=0461 | 233931 |
| 1 MR10462X3D238000030505229 | | | MUST BE USED | | NSAIB | 86 |
| 2 MR10462X3D238000030505229 ~90 | | | TO RE-ORDER 79 | | 58009320 | |

| 100 MNEM | 105 INDICIA | 108 ARTICLE | 102 CODE | REVISIONS | 58009320-008 | NSAIB |
|---|---|---|---|---|---|---|
| NSAIB | P6090137 | 58009320 | 0A732 | K G C  93 | P6090137  124 | K G C |
| MNEM | 115 INDICIA | 117 ARTICLE | CODE | REVISIONS | 58009340-004 | |
| NSAIB | P6090138 | 58009320 | 0A732 | K G C  94 | P6090138 | |
| MNEM | 119 INDICIA | 121 ARTICLE | CODE | REVISIONS | 58009340-004 | |
| NSAIB | P6090139 | 58009340 | 0754R | G E D  95 | P6090139 | |

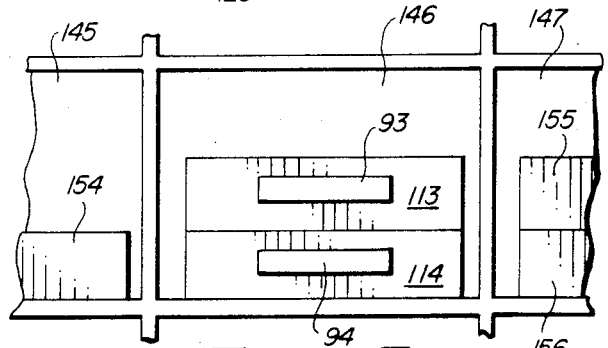
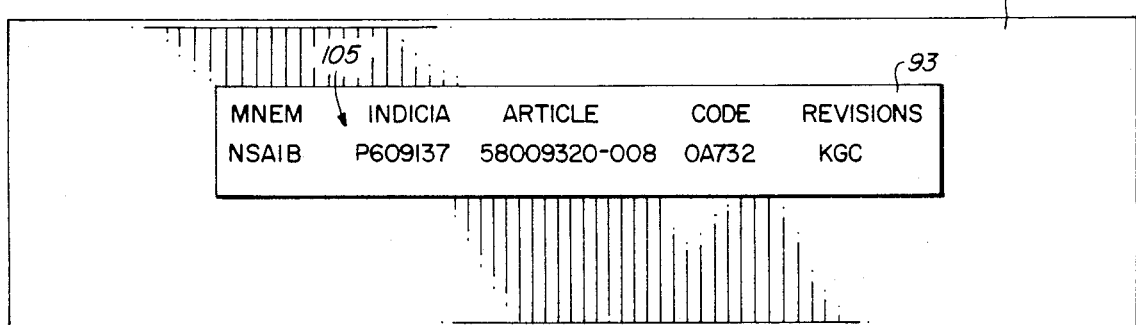

COMPUTERIZED SYSTEM AND METHOD OF MATERIAL CONTROL

This application is a continuation-in-part of Ser. No. 61,124, filed July 27, 1979, now abandoned.

BACKGROUND OF THE INVENTION

1. Field of the Invention

The invention relates generally to a system and method of material control, and, more particularly, the invention relates to a system and method of material control utilizing a unique identifying indicia associated with each article within the material control system.

2. Description of the Prior Art

Material control systems, as known in the art, are utilized to provide a journal of the kind and quantity of articles that are in stock and their location at any one time, for example, in the stockroom. As is well-known in the art, considerable paperwork is necessary to provide the journal and, therefore, considerable man hours are required to update the listing of articles and their storage locations within the stockroom because articles are constantly moved into and out of the stockroom. Additional time and effort is expended in verification of the journal because of the inaccuracies involved in the manual system. Periodic inventories of the stockroom are necessary to update exactly what articles are located in which of the storage locations.

An additional problem is that certain materials are diverted from the stockroom without having the paperwork processed to update the stockroom journal. For example, if a particular article was required immediately in a factory for construction of a particular machine, the article can be taken by an individual from its storage location out to the area where the machine is being constructed without the completion of any of the paperwork that is normally performed. In addition, in certain environments it is desirable to track articles through many uses and into and out of the stockroom several times over an extended period of time.

With the advent of the computer, certain material control systems began to utilize manual entry of data into a storage device for utilization by the computer. This allows the computer to generate the required journals on the number and storage location of each type of article within the stockroom. Although the use of the computer reduces somewhat the volume of the manual labor, the inaccuracies involved in keying the necessary data into the computer still generate errors so that periodic manual inventories continue to be necessary.

None of the prior systems utilize an optical character recognition (hereinafter referred to as ORC) device to reduce errors or to associate a label provided with unique OCR readable identifying indicia with each article so that the article can be tracked for as long as desired. Further, the use of such a label prevents the diversion of articles by allowing the tracking of the articles to their end use by utilizing the unique identifying indicia associated therewith.

SUMMARY OF THE INVENTION

Accordingly, it is desirable to provide a material control system having increased accuracy and being capable of tracking a plurality of articles to prevent the diversion thereof. The present invention utilizes a computer capable of executing a number of predetermined operations. The computer is connected to an acoustic device which emits an audible tone in response to a command from the computer. In addition, the computer is connected to a printer which is capable of printing any of a predetermined set of ORC readable alphanumeric characters in response to the output of the computer. The printer is capable of printing either of two colors as directed by the computer. The printer can also be adapted to vary the intensity of its striking force for improved OCR readability by applying greater force when the character is to be OCR readable.

The computer is connected to a visual display for exhibiting information. The information could comprise how to operate the system, data contained within the system, and the status of the system. The information can be displayed either in tabular form or in any other form desired. The computer can also be connected to a large data processing computer for both transmitting and receiving information.

A keyboard is connected to the computer for allowing instructions and data to be inputted thereto. An OCR device which is capable of reading alphanumeric characters is connected to the computer to provide an electronic representation of the characters scanned and read. The OCR device may be of any type, for example a hand-held module containing a photocell array.

The printer is capable of printing logs, journals, reports, listings, initial labels, and sequential labels. Of the two colors which the printer is capable of producing, one is capable of being read by the OCR device and the other is a blind color meaning one which the OCR device cannot read. This allows material to be printed on the labels which is readable by the OCR device and is further human readable as well as information to be printed which cannot be read by the OCR device but is human readable. That is, information printed in the blind color, which is human readable, cannot be read by the OCR device. This eliminates the possibility of reading information from the label which is unnecessary or undesirable. The computer utilized a First In and First Out (FIFO) mode to transfer data received from the OCR device to the data processing computer. Initial labels are generated by the printer and include the nature of the article and a serial number. The computer directs the printer to increase the intensity of the striking force on these fields to be read by the OCR device. These initial labels also contain spaces for writing additional information onto the label for later manual entry into the computer. The labels can be read immediately after attachment to the articles which are entering the material control system so that the computer is notified that an article of a certain nature and certain serial number is within the system. The entry of the article into the system is part of the information transferred to the data processing computer.

When it is desired to store the articles in a centralized area such as a stockroom having a plurality of storage locations therein, for example bins or shelves, the labels are again read by an OCR device. The computer determines from the nature of the article if similar articles are currently residing in any storage location. If there are similar articles stored in a particular storage location than the printer, in response to the computer, prints out a designation of the particular storage location and the nature of the article. The article is then placed within the particular storage location.

The computer periodically generates a journal of the nature of the articles present in the storage locations, the quantities of similar articles, and the storage locations of each type of similar articles. Articles are selected from the journal to be moved out of the storage locations for the purpose of distribution of the articles as desired. The computer is capable of generating a unique distribution indicia comprising, for exaample sequentially ordered alphanumeric characters, for each article.

After the computer generates the particular indicia which identifies a certain article, a label is printed by the printer under direction of the computer. The label is associated with that certain article in order to allow that article to be traced until its end use and to prevent diversion of the article prior to its end use. The article is prevented from diversion by insuring that no article with the same indicia is present within the system and, therefore, if the article is missing a search will reveal where the article was used. Thus, the article is locatable by its unique identifying indicia. Also, the final documentation allowing the article to be used for various purposes is generated only after the unique identifying indicia is read by the OCR device.

The keyboard is provided with two sets of positioning keys which through communication with the computer and the printer position paper and labels inserted into the printer. One of the keys allows rapid positioning for coarse movements. The other key of each set allows fine positioning of the printer through slow movement thereof.

The computer and, more particularly, its memory can be adapted to contain the revision status of articles. The revision status of a type of article can be compared with the revision status of an identical article to determine if the revision status of that particular article is current.

The method of the present invention is to enter the article into the material control system by placing the initial label thereon. The initial labels which are generated in batches contain the nature of the article and a serial number which places the article in a sequentially ordered set of similar articles. This initial label can be read several times by the OCR device as various modifications are performed on the article, the article is moved from one location to another, or the article has manufacturing processes performed on it. When the initial label is read, additional information concerning the article can be entered through the keyboard into the memory of the computer. If it is desired to store the article in a storage location the OCR device is utilized to read the initial article. After the label is read, the computer searches through its memory for the particular storage location containing similar articles. If similar articles are stored in a particular storage location, the printer, under the direction of the computer, prints a journal containing the nature of the article and the particular storage location where similar articles are stored. The computer also generates a log for the printer to print which contains the quantity of similar articles, the nature of the similar articles and the particular storage location for each type of article.

If it is desired to remove one or more of a particular type of article or articles from a storage location for distribution, each article is retrieved from its storage location and the initial label is read by the OCR device. The computer then generates a unique identifying indicia which is comprised of a plurality of OCR readable alphanumeric characters. The unique identifying indicia can be, for example, a sequentially ordered set of alphanumeric characters. This set can contain either numerals or alphabetic characters or a combination thereof. Further indicia within the sequentially ordered set would either increase or decrease as based on the position of the characters within the decimal system and alphabet.

The printer, in response to the computer, prints the indicia, the nature of the article, and various other information in OCR readable characters onto another label which can be referred to as the sequential label. It is now possible to distribute the article after association of the label therewith and be able to identify each article by its indicia. During various movements of the article through whatever processes are required, the labels can be read by the OCR device to enter additional updating information into the computer. Other updating information can be entered through the keyboard to account for modifications of the article to meet new revisions for that particular type of article prior to its end use. If it is desired to restore the article within a storage bin or location, the computer can be so informed through a keyboard entry, and as the sequential label is read the computer will cause the printer to print the particular location where similar articles are located. When the article is selected for removal from a storage location the sequential labels are read by the OCR device after the retrieval of the articles. This continues until the article reaches its end use and exits the material control system.

BRIEF DESCRIPTION OF THE DRAWINGS

The invention will be described with reference to the accompanying drawings, wherein:

FIG. 3 is a front view of a portion of a sheet of initial labels utilized in the present invention;

FIG. 4 is a front view of a portion of a sheet of sequential labels with the unique identifying indicia disposed thereon utilized in the present invention;

FIG. 5 is a view of a portion of a log depicting the storage location, nature of the article, and unique identifying indicia;

FIG. 6 shows a portion of a journal having a quantity, the nature of the article and its particular storage location thereon;

FIG. 7 shows a portion of a report having a unique identifying indicia, the nature of the article, and various other information disposed thereon;

FIG. 8 shows a front view of storage locations having articles disposed therein;

FIG. 9 shows an enlarged view of an article shown in FIG. 8, and

DESCRIPTION OF THE PREFERRED EMBODIMENT

Figure 1:
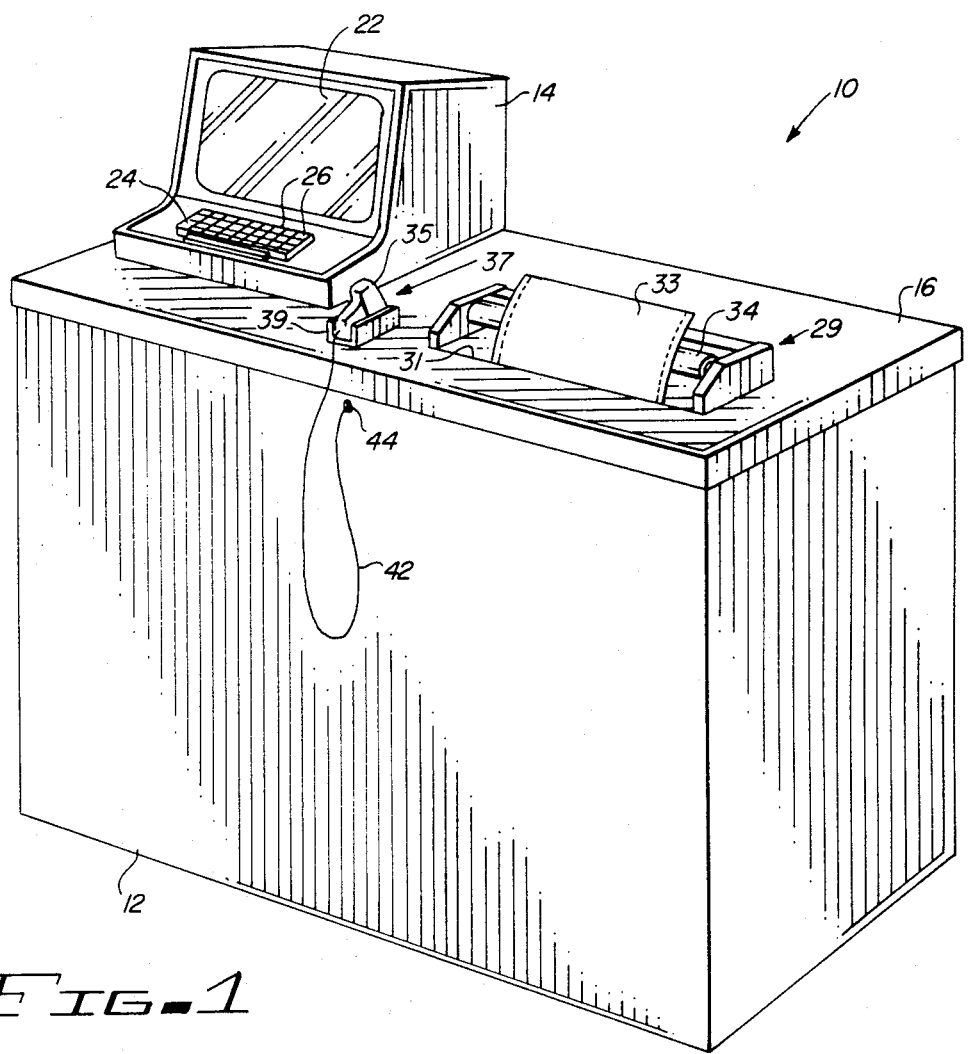
FIG. 1 is a pictorial representation of components of a material control system constructed according to the present invention.

A portion of a material control system 10 is shown in FIG. 1. A console 12 supports a housing 14 on its upper surface 16. A computer 18 (FIG. 2) is contained within the housing 14 or console 12. Housing 14 provides support for a visual display 20 (FIG. 2) of which only the cathode ray tube (CRT) 22 is shown. A keyboard 24 extends in an outwardly sloping manner away from the housing 14 to provide easy access to the keys 26 thereof. A printer 29 is shown in FIG. 1 extending through an opening 31 in the upper surface 16 of the console 12. The printer 29 is shown with a sheet of paper 33 engaged therewith for printing purposes. The sheet 33 is held against a platen 34.

A hand-held module 35 of an OCR device 37 is shown resting in a holder 39 attached to the surface 16. A cable 42 which comprises a plurality of electrically insulated wires surrounded by an outer insulating sheath passes through a hole 44 and into the interior (not shown) of the console 12.

Figure 2:
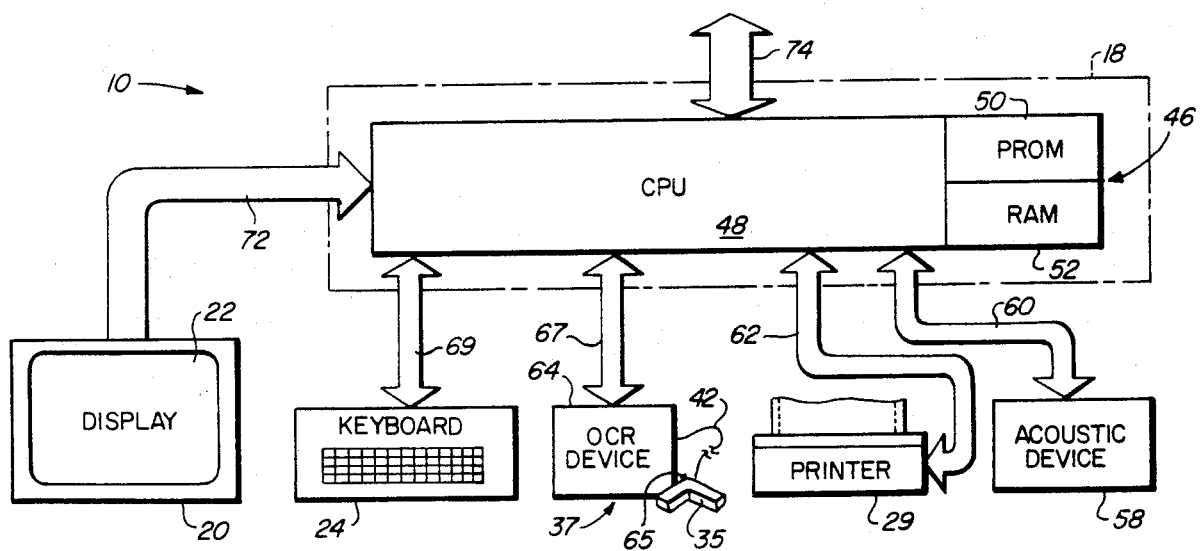
FIG. 2 is a block diagram of a portion of a material control system constructed according to the present invention.

In FIG. 2, the computer 18 is shown as divided into a memory 46, and a Central Processing Unit (CPU) 48 including the arithmetic unit, the input/output control, etc. The memory 46 is divided into a programmable read only memory (PROM) 50 and a random access memory (RAM) 52 which are connected to the CPU 48. The CPU 48 is also connected to an acoustic device 58 through a multi-line channel 60. More than a single line within the channel 60 can be necessary in order to operate the acoustic device 58. The acoustic device 58 emits an audible signal (such as a tone or vocalism) in response to actuation by the computer 18. Further, the acoustic device 58 may supply outputs to the unit 48 through lines (not shown) within the channel 60.

The printer 29 is connected to the CPU 48 through a multi-line channel 62 to provide the CPU 48 with reports on the status of the printer 29 such as ready to print, out of paper, etc. The unit 48 provides information to be printed and instructions to the printer 29 through the channel 62. The printer 29 is supplied with a two color ribbon (not shown). The CPU 48 through the channel 62 directs the picture 29 with regard to which of the two colors provided on the ribbon is to be printed. The printer 29 is also provided with a print wheel (not shown) which produces a particular font generally known in the art as OCR-A, which is an alphanumeric, human readable font. (It should be noted that the drawings do not fully reflect this front because it is only important that the print wheel has the same font as the OCR device is capable of reading.)

The OCR device 37 is provided with an electronics module 64 which is connected through the cable 42 to the hand-held module 35. The electronics module 64 is adapted to read (or recognize) the characters produced by the printer 29 in the OCR-A font. The hand-held module 35 includes a photocell array (not shown) which, when scanned across a character on a written medium such as a label, provides an electronic image of that character to the electronics module 64 through the cable 42. The electronics module 64 provides power and commands to the hand-held module 35 through the cable 42, if desired. The electronics module 64, after receiving the electronic image from the hand-held module 35, attempts to recognize which of the predetermined set of characters in the font is the character currently being scanned and represented by the electronic image.

The hand-held module 35 is provided with an LED (light emitting diode) 65 for indicating when characters are read. Although any suitable OCR device can be adapted to the present invention, the hand-held module 35 is useful because of its mobility. Other fonts besides OCR-A could be utilized. If another font is utiized the electronics module 64 of the OCR device 37 would be adapted to recognize that particular font and the printer provided with an appropriate print wheel. The use of an OCR device in the system 10 (FIG. 1) increases its accuracy by eliminating operator errors which occur during manual keying. An example of an OCR device having a hand-held module is found in U.S. Pat. No. 4,075,605 issued to Hilley and Neff on Feb. 21, 1978, and entitled "Character Recognition Unit."

Although the printer 29 can be provided with a ribbon having only one color, it is well-known that some OCR devices are color sensitive and are in fact blind to certain pigments which form the deposited matter on the written medium, such as a label. For example, the hand-held module 35 in the present embodiment cannot read red characters when printed by the printer 29. The printer 29 produces characters which are either black or red as instructed by the unit 48 of the computer 18. When red characters are scanned by the hand-held module 35, the photocell array (not shown) thereof does not generate an image of the characters printed in red because it is blind thereto. The other color printed by the printer 29 is black and the hand-held module 35, when scanning a character printed in black, generates an electronic image of that character. Although black and red colors are utilized herein, any suitable combination of colors can be adapted for use.

After the electronic module 64 has recognized a character an electronic representation of that character is transferred to the CPU 48 through multi-line channel 67. The CPU 48 stores the electronic representation of that character in the RAM 52.

The keyboard 24 is connected through a multi-line channel 69 to the CPU 48. Instructions and data are received by the CPU 48 from the keyboard 24. Instructions entered through the keyboard 24 cause the CPU 48 to perform certain predetermined operations stored within a PROM 50. The data entered into the CPU 48 through the keyboard 24 is stored in the RAM 52. The keyboard 24 has certain keys 26 (FIG. 1) which instruct the CPU 48 to provide the necessary commands to the printer 29 to move the sheet 33 (FIG. 1) up and down. This, of course, allows the sheet 33 to be moved to the proper position for printing purposes. The keys for the moving printer 29 comprise two sets, each set having two keys. One key of each set is provided for coarse positioning and instructs the CPU 48 to command the platen 34 or other paper handling mechanism to move rapidly. The other key of the set is for fine positioning and instructs the CPU 48 to command the printer 29 to have its paper handling mechanism move the sheet 33 slowly.

The CPU 48 is also connected through a multi-line channel 72 to a visual display 20. The display 20 is adapted to receive information for display from the CPU 48 which could have been, for example, data stored in the RAM 52 or the status of the computer 18 and exhibit that information in a human readable form. The display of information in tabular form has been found to be useful and the display 20 and the computer 18 can be so adapted. Further, the display 20 can be adapted to display graphics, for example, a simulated keyboard as a background to a soft keyboard (not shown) disposed across the surface of CRT/CPU 22. Various status indications from display 20 can be communicated to the CPU 48 through the channel 72.

Finally, the CPU 48 is connected to a general purpose data processing computer (not shown) through a multi-line channel 74. The CPU 48 is capable of both receiving and transmitting information through the multi-line channel 74. Although the computer 18 is shown connected to another computer, full implementation of the invention as shown and described herein can be accomplished with a single computer or several computers linked together as desired for utilization within environments having particular requirements. For example, a stockroom can have a computer 18 connected as shown in FIG. 2 for use with articles moving into the stockroom and another computer 18 connected as shown in FIG. 2 at a location where the articles move out of the stockroom. The arrangements of computers is purely a matter of design choice to implement the system 10.

Articles as defined herein means objects which are tangible whether or not they are comprised of one or more components which are somehow interrelated, for example, contained within a single enclosure. Facility means any installation receiving, assembling, manufacturing, or consuming articles.

The computer 18 can be, for example, a micro-computer Model #MC80800D1 manufactured by Honeywell Information Systems Inc., which also includes the visual display 20 and the keyboard 24. Although any appropriate acoustic device or printer can be utilized with the present invention the acoustic device A1335 from Projects Unlimited and the Diablo printer Hytype II Model 1355HS, respectively, are useful. The OCR device can be Model 603 from Recognition Equipment Incorporated.

FIG. 3 shows a pair of initial labels 76 and 77 and a reorder label 79. In order to facilitate printing of the labels, they are purchased in sheet form for insertion into the printer 29 and printing in batches. Each individual label is attached by an adhesive to a backing sheet 82. A pair of stubs 84 and 85 are located adjacent to labels 76 and 77, respectively. The backing sheet 82 has a smooth surface which allows labels to be removed along with the adhesive which in turn allows the labels to be associated with an article. To associate labels with articles as utilized herein means to attach by any means such as adhesive, a wire wrapped about the article, stapling to the article, etc., or by placing the label within a slot or within a component of the article, or resting the label upon the article or in any other way which maintains a physical proximity and identifying relationship between the label and its particular article. The initial labels 76 and 77 are substantially identical and a detailed description of one will suffice for both. Stub 86 is adjacent to label 79.

A line 88 of the OCR readable alphanumeric characters is disposed on the label 76. The first five characters "23391" comprise a designator whose purpose is, for example, to indentify a particular routing or a particular construction process. The next five characters "NSAIB" comprise a mnemonic which is an abbreviated representation of the nature of the article. The designator and the mnemonic are printed in the color to which the OCR device 37 is blind. The next five characters "M0460" comprise the serial number which identifies the place that this article has with respect to the entering of similar articles into the material control system 10. The next eight characters "58009320" comprise an alphanumeric field 89 and represent the nature of the article. The eight characters could, for example, represent the nature of the article as a packet of hardware materials, a printed circuit board, a book, a portion of a chassis, or any other article falling within the definition of the article. Further, the eight characters of the alphanumeric character field 89 define specifically what the nature of the article is, for example, flat head screws of a certain dimension, bolts of a certain diameter and length, or circuit boards of a particular type.

The serial number and the nature of the article are printed in the color which is readable by the OCR device 37.

An area toward the right portion of the label 76 is left with space for the manual entry of information concerning, for example, a particular revision or date of receipt or any other information which is desired to be placed on the label.

The stub 84 repeats the information present on the label 76 to provide a record thereof. A serial number present on the initial label 77 is "M0461" which is the next serial number in series from the serial number "M0460" of the initial label 76. The nature of the article for labels 76 and 77 are identical.

The reorder label 79 is utilized to order the printing of another sheet of labels. The labels are printed in batches, if desired. The sheet 33 (FIG. 1) is replaced in printer 29 by a sheet of labels (not shown) and the alphanumeric character fields 90 are both scanned. The information thus provided to the computer 18 causes the computer 18 to actuate the printer 29 for printing the proper initial labels including a new reorder label. It should be noted that a field 90 includes information concerning the next serial number after the serial number of the label 77 and thus it enables the computer 18 to generate the necessary serial numbers for the new sheet of labels. Two character fields 90 are provided so that both of the two character fields must be scanned prior to the computer 18 commanding the printer 29 to print the labels. This reduces errors which can result in improper labels being printed.

In FIG. 4, sequential labels 93 through 95 are shown disposed on a backing sheet 97 similar to backing sheet 82 (FIG. 3). Sequential labels 93 through 95 are similar in nature and a detailed discussion of one will suffice for all. The mnemonic 100 "NSAIB" is printed in the color to which the OCR device 37 is blind, for example red. The revisions 102 are also printed in red. A sequential, alphanumeric, OCR readable, unique identifying indicia 105 is printed in the OCR readable color, for example black. The character field 108, which identifies the nature of the article, and a code 111 which is five characters in length are also printed in black. The first four characters of the code 111 represent the revisions 102 and the rightmost character is a check digit for editing purposes.

The indicia 105 is generated by the computer 18 in response to the reading by the OCR device 37 of the initial label 76 and is printed by the printer 29 in response to the computer 18. The sequential label 93 is then associated with its article 113 (FIG. 9). The initial label 76 has previously been associated with the article 113. After the label 93 is placed on its associated article 113, the article can be tracked by scanning the indicia with the OCR device 37. This insures that a record is maintained of the modification, movements, and utilizations of the article 113.

The sequential label 94 has the alphanumeric, OCR readable, unique identifying indicia 115 disposed thereon in a location similar to the location of the indicia 105. The nature of the article is described by the character field 117. By way of example, the article 114 (FIG. 8) with which sequential label 94 is associated, is the same article with which the initial label 77 (FIG. 3) is associated. The sequential label 95 has unique identifying indicia 119 disposed thereon. As shown the indicia 119 is the next ordered indicia from the indicia 115;

however, the nature of the article shown by character field 121 is different.

Although the indicia is shown to be in ascending alphanumeric order, they could be generated by the computer 18 in descending alphanumeric, any other numeric ordering, or randomly with a mixture of alphabetic and numeric characters. The number of characters comprising the unique identifying indicia should be sufficiently large and have sufficient permutations provided in order that no two articles within the system are provided with the same indicia. Stubs 124 through 126 are shown in FIG. 4 disposed to the right of the sequential labels 93 through 95, respectively, and repeat certain information contained in the labels. Although labels of the type discussed above are shown herein, any printed medium can be utilized for the disposition of the indicia and character fields thereon. Any suitable printed medium such as a tag or paper leaf can be utilized as the initial and sequential labels.

In FIG. 5, a portion of a log 129 gives the quantity, the storage location, the nature of the article, and the unique identifying indicia of each article within that particular storage location. For example, the storage location shown by the characters 131 "N179" has two articles, (113 and 114, FIG. 8) the natures of which are both described by the alphanumeric character field 133 "58009320." The unique identifying indicia 135 and 136, "P6090137" and P6090138," respectively, for each of the articles is given.

In FIG. 6, a portion of a journal 138 is shown. The purpose of this journal is to allow the selection of certain articles for distribution or use, for example, two articles (113 and 114 in FIG. 8) with a nature described by the alphanumeric character field 139 "58009320" as shown in the storage location "N179" described by the characters 140.

FIG. 7 shows a report 141 which contains the indicia 142 and 143 and the alphanumeric character fields 144 which is the nature of the article along with the revision status for each of the articles. The final column labeled "LATEST" contains a "yes" or "no" indication of whether the particular revisions for that article are up-to-date. This report is an example of the final paperwork associated with the distribution of an article for its end use.

FIG. 8 shows storage locations 145 through 147. For example, the storage location 146 could be designated as the same storage location shown for characters 131 (FIG. 5) and designated as "N179." The articles 113 and 114 with sequential labels 93 and 94 (FIG. 3) are disposed within the storage location 146. The adjacent storage locations 145 and 147 have articles 154 through 156 disposed therein. A storage location is any area such as a shelf, a bin, or any other mode of separation such as a designated area on a floor which is adapted to receive and maintain recognizable separation of similar articles placed therein from all other articles.

FIG. 9 shows a more detailed view of the article 113 with the label 93 disposed thereon. As shown herein the labels are associated with their articles by means of adhesive on the surface of the label placed against the article. The printed matter on the label is on the side opposite to the surface having the adhesive.

In operation, the material control system 10 (FIGS. 1 and 2) is capable of tracking and preventing the diversion of a plurality of articles. As at least one article enters the system, an initial label similar to the initial labels 76 and 77 (FIG. 3) is associated therewith. An OCR device 37 is utilized to read the initial label one or more times. Several OCR devices connected to at least one computer 18 can be located at a variety of stations throughout the facility. For example, an OCR device 37 can be located at the receiving dock, at the end of an assembly line, at a fabrication area, etc. After the serial number and nature of the article are read from the initial label, information concerning the article can be entered through the keyboard 24 into the computer 18, if desired.

When it is desired to store the article prior to its distribution or use, the article is placed in a particular storage location which contains articles of similar nature. The initial label is read by the OCR device 37 and the computer 18 searches the memory 46 to determine if any articles of a similar nature are presently stored. If such articles are stored in a particular storage location that storage location, the nature of the article, and possibly the serial number on the initial label or the particular article to be stored are printed out onto a log similar to that shown in FIG. 5 by the printer 29. The log in FIG. 5 shows the log containing a similar operation by the OCR device 37 and the computer involving sequential labels associated with articles. Since these are initial labels, the unique identifying indicia are not printed out onto the log but rather only the serial number.

After the initial labels are read by the OCR device 37 the articles are placed into the storage locations designated on the log. If the computer 18 determines that articles of this particular nature are not contained within any of the storage locations a storage location or bin can be assigned by the computer or the article can be placed in an empty storage location and the designation of that storage location and be entered into the computer 18 through keyboard 24. If a storage location contains too many articles of a similar nature, all the articles can be moved to another storage location and the designation of the new storage location for articles of that nature can be entered into the computer 18 through the keyboard 24.

Periodically, a journal 138 is printed on the printer 29. The journal contains the quantity, the nature of the articles, and their particular storage locations so that articles can be selected for distribution and further use. The articles selected from the journal 138 are retrieved from their particular storage locations and the initial labels again read by the OCR device 37. The computer 18, after receiving the electronic representation of the OCR readable alphanumeric characters on the initial label, generates a unique identifying indicia for each of the articles scanned and the printer 29 prints a sequential label (such as labels 93 through 95 in FIG. 3) for that particular article. The computer stores the nature of the article conjunctive with its respective indicia. The output of the computer 18 to the printer 29 causes the printer 29 to print the sequential label including the indicia. The sequential labels are then removed from the backing sheet and associated with the proper article.

It should be noted that the nature of the article as it is processed or manufactured may change. Therefore, the alphanumeric field designating the nature would accordingly change. It is also possible that the computer 18 of one or more other computers with which it is in communication may compile a list of articles to be selected, for example, a list of articles for a particular device to be constructed. The computers could also monitor the articles stored in the storage locations and determine when it is possible to construct a particular device from the articles within the storage locations and a list requesting that those articles be retrieved from the storage locations printed on a printer which can be printer 29. For certain applications where there are articles which are being modified or revised, the computer 18, or any of the computers with which it communicates, can maintain a record of the current modifications or revisions and check each article as its sequential label is scanned to determine if the article meets the current revisions. The results of this check are shown as a printed report 141 in FIG. 7.

In certain applications it is desirable that the contents of RAM 52 be transferred to the general purpose data processing computer through channel 74 (FIG. 2). The data entered into the memory 52 can be transferred to the data processing computer on a first in and first out basis (FIFO). In other words, the contents of the first initial label read by the OCR device 37 would be transferred followed by the information contained in the next label read by the OCR device 37. After an acknowledgement from the data processing computer that the information from a label has been received, the computer 18 deletes that information from the RAM 52. The computer 18 can also direct the printer 29 to print out a record of the information transferred to the data processing computer. If the computer 18 must be available for the entry of additional information the transfer operation can be halted at any time.

After the sequential label is associated with the article (an example of which is shown in FIG. 9), it can be read by many of the plurality of OCR devices whenever it is determined to be necessary. In some applications it is desirable to replace the current sequential label with another sequential label. For example, the nature of the article can be altered during manufacture and a new sequential label can be printed to reflect the change in the nature of the article. The final paperwork concerned with distribution and end use of an article is not generated by the computer 18 until the sequential label of the article is read by the OCR device 37 prior to distribution for end use. The OCR devices can be placed at various stations along an assembly line in order to insure that diversion has not taken place and that the articles have been used and distributed as selected. For example, a particular assemblage of parts could have their sequential labels scanned to determine whether or not the articles actually used were those selected for utilization within that assemblage of parts.

The visual display 20 can be utilized throughout the abovedescribed system and method for displaying the logs, reports and journals discussed above. In addition, the display can show the status of the system. For example, if the computer 18 is communicating with the data processing computer this condition can be exhibited on the visual display. Thus, in certain applications it may be desirable that the reports, logs and journals be maintained within the computers and visually displayed only, although the printed reports, logs, and journals have been found to be useful in certain environments. It has also been found useful to process articles in batches so that a plurality of labels can be scanned one immediately after another.

The acoustic device 58 (FIG. 2) provides another means of communication for the computer; the other ways are of course through the visual display and the printer. For example, the computer 18 can actuate acoustic device 58 several times after the OCR device 35 reads the label and the computer 18 determines that this article is to be distributed immediately even though the label is being read to determine the particular storage location in which the article is to be placed. The acoustic device could also be actuated for short intervals several times in order to indicate certain conditions. Although the acoustic device is not necessary for the operation of the system 10, it has been found useful because it allows the computer to communicate without visual contact with the display or the printer. For example, if the labels of 200 articles are to be scanned by the OCR device 37 and after completing the reading of the information from all of the labels only label data for 199 articles have been received by the computer 18 as inputs, the computer 18 can actuate the acoustic device 58 when the label which was not previously stored by the computer 18 is read by the OCR device 37 during a second reading of the labels. The computer ignores the attempted second entry of the information on the labels of the other 199 articles.

In summary, the material control system 10 (FIG. 2) has a computer 18 capable of storing information in its RAM 52 and executing predetermined operations stored in the PROM 50. The outputs of the computer 18 are connected to a display 20, an acoustic device 58, and a printer 29, although the computer 18 can receive certain inputs from these devices. The inputs to the computer 18 are connected to the keyboard 24 and the OCR device 37. The computer 18 can also have inputs and outputs connected to other computers such as a general purpose data processing computer or computers similar to the computer 18.

The computer 18 generates the necessary signals to actuate the printer 29 in response to inputs from a keyboard 29 and the hand-held module 35. The signals cause the printer 29 to print labels, both initial and sequential. The computer 18 is capable of generating indicia for each sequential label such that each article can be identified from its sequential label. The OCR device increases the accuracy of the information which is received by the computer 18. Several of the computers 18 with one more of the devices, for example, the hand-held module 35 attached thereto, can be included within the system 10. The increased accuracy and control over diversion achieved by the utilization of the unique identifying indicia allow each article to be tracked and reduce the number of articles required to be distributed within the system. Thus, economy in the utilization of the articles within the system 10 is promoted thereby.

Figure 10:
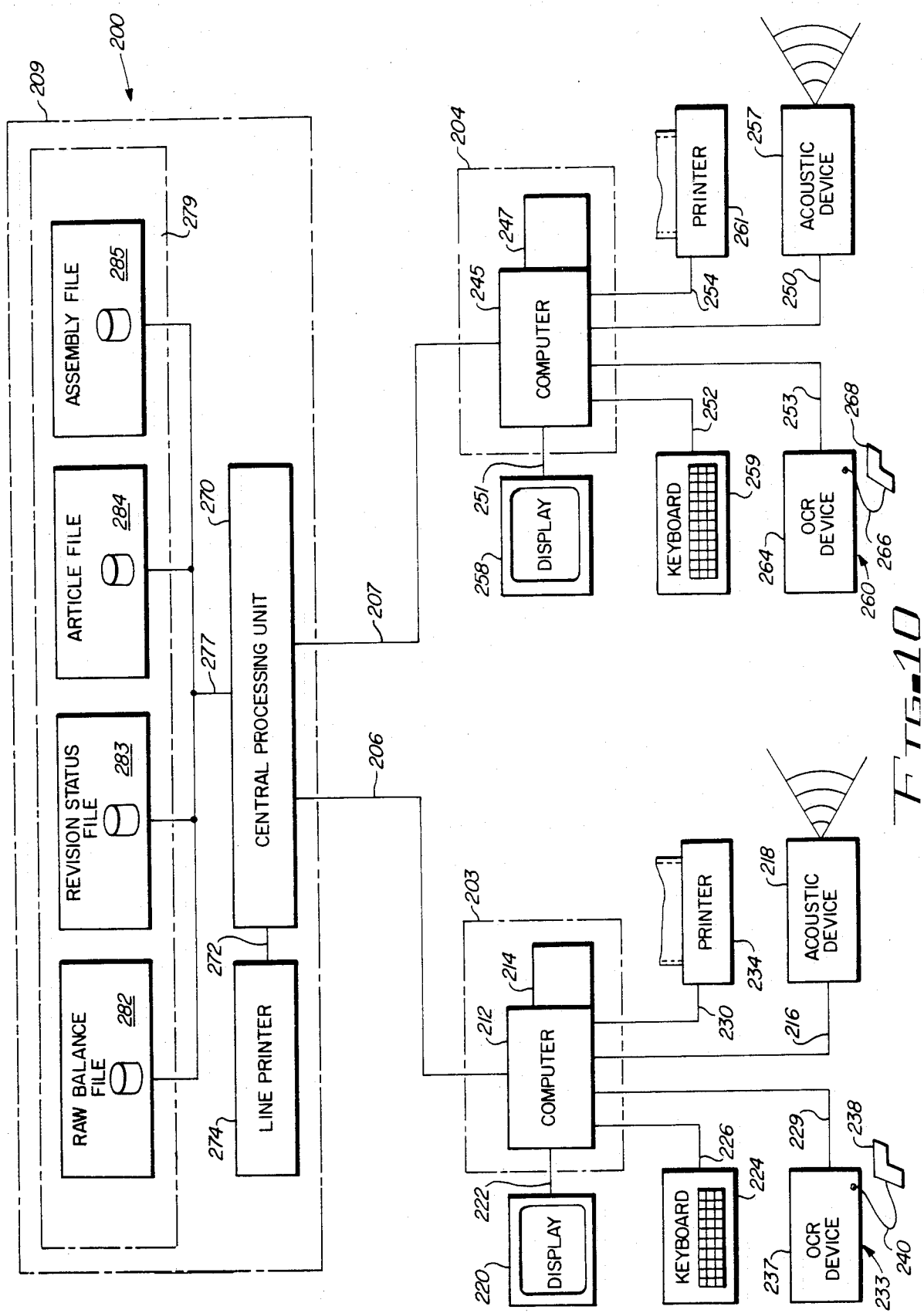
FIG. 10 shows a modification of the material control system of the present invention.

Another embodiment 200 (FIG. 10) of the present invention has a pair of computers 203 and 204 connected through a pair of multi-line busses 206 and 207, respectively, to a data processing computer 209. The computer 203 comprises a CPU 212 and a memory 214. The CPU 212 is connected through a multi-line channel 216 to an acoustic device 218 capable of emitting an audible signal upon command of the CPU 212. A visual display 220 is connected to the CPU 212 through a multi-line channel 222. The display 220 is responsive to the CPU 212 by exhibiting information selected by the CPU 212. The display 220 can be of any standard type as known in the art, for example, a CRT display. A keyboard 224 is connected through a multi-line channel 226 to a CPU 212 to allow the manual entry of data into the computer 212 for storage into a memory 214 or for instructions and commands to the CPU 212 to execute certain predetermined operations. Although the acoustic device 218, the visual display 220, and the keyboard 224 have been found useful in the practice of the present invention, full implementation of the invention as disclosed herein can be achieved without this additional apparatus. The keyboard 224 which allows manual entry of the data into the CPU 212 could be replaced by any other data entry device as known in the art.

The CPU 212 is also connected through a pair of multi-line channels 229 and 230 to an OCR device 233 and a printer 234, respectively. The OCR device 233 is comprised of an electronic module 237 and a hand-held module 238. The hand-held module 238 is connected to the electronics module 237 through a cable 240. The computer 203 and its associated apparatus as discussed above comprise an arrangement similar to the arrangement of the computer 18 and its associated apparatus shown in FIG. 2. In this embodiment of the present invention, however, the two computers 203 and 204 are shown connected to a central data processing computer 209. Each of the computers 203 and 204 and their associated apparatus comprise a transactional computer complex. At least one transactional computer complex is necessary for practice of the present invention.

Since the computer complex is formed by computers 203 and 204 and their associated apparatus are similar in nature, a detailed discussion of one shall suffice for both. The CPU 212 receives from the OCR device 233 a different electronic representation for each of a predetermined set of alphanumeric characters, which are human readable and disposed on a printed medium scanned by the hand-held module 238 as OCR data signals. The OCR data signals which correspond to the characters scanned and read by the OCR device 233 are stored by the CPU 212 into the memory 214. The memory 214 can be any type of storage apparatus as known in the art, for example, a RAM, a tape drive, etc. The printer 234 is responsive to the signals from the CPU 212 received through the channel 230 and is capable of printing any of the predetermined set of human readable alphanumeric characters, which are readable by the OCR device 233, as selected by the CPU.

The CPU 212 is capable of generating signals which represent a unique identifying indicia for each article having its initial label (such as the label 76 in FIG. 3) scanned by the OCR device 233. The data signals representative of the characters on the initial labels are stored into the memory 214. The signals corresponding to the indicia are received by the printer 234 and are printed onto a sequential label (such as the sequential label 93 in FIG. 4) which is a printed medium capable of being read by the OCR device 233. The nature of the article and its revision status are also printed. The computer 212 stores the signals representative of the unique identifying indicia into the memory 214 conjunctive with the OCR data signals, which include the nature of the article as received from the OCR device 233. In other words, the OCR data signals generated by the OCR device 233 by scanning and reading an initial label (such as the label 76 in FIG. 3) are stored in a one-to-one corresponding relationship with the signals representative of the unique identifying indicia for that article which were generated in response to the OCR data signals. Therefore, accessing the unique identifying indicia within the memory 214 also identifies the nature of the article. Further, the locating of the various OCR data signals within the memory 214 which represents similar articles can be accomplished by accessing the memory 214 to determine if any articles of that particular nature are contained therein. If one or more similar articles are contained therein the signals representing the unique identifying indicia on each article are also located by accessing the nature of the similar article within the OCR data signals stored in the memory 214.

The computer 204 comprises a CPU 245 and a memory 247. The function of the CPU 245 and the memory 247 are similar to the function of the CPU 212 and the memory 214, respectively. The CPU 245 is connected through a pair of multi-line channels 250–254 to an acoustic device 257, a visual display 258, a keyboard 259, an OCR device 260, and a printer 261, respectively. The OCR device 260 comprises an electronics module 264 connected through a cable 266 to a hand-held module 268 containing a photocell array (not shown). The acoustic device 257, the visual display 258, the keyboard 259, the OCR device 260, and the printer 261, which are connected to computer 204 are similar to acoustic device 218, display 220, keyboard 224, OCR device 233, and printer 234, respectively, which are connected to the computer 203.

The computers 203 and 204 are connected through a pair of busses 206 and 207, respectively, to the data processing computer 209 and, more particularly, to the CPU 270. The CPU 270 is connected through a multi-line channel 272 to a line printer 274 and through a multi-line bus 277 to a data storage device 279. The CPU 270 has the capability of selecting through the bus 277 any of the files 282–285 of data storage 279 unit. The CPU 270 is capable of selecting any location within the various files for storing information, accessing information, or deleting information contained therein. The data storage unit 279 can be arranged in any manner as known in the art and can be any type of storage device known in the art, for example, a RAM, a tape drive, etc.

The raw balance file 282 updates accounting information as, for example, articles are moved from inventory into assemblies for shipment. The revision status file 283 contains the latest revisions for each type (or nature) of article. This file can also be located in the memories 214 and 247 with a file 283 acting as a backup. The article file 284 contains the nature of the articles, the storage location of each article, if applicable, and either the serial number of the article or its identifying indicia as appropriate. The assembly file 285 contains information concerning the articles required to produce certain assemblies. For example, the assembly file 285 could contain a listing of the natures of all of the articles required to build a certain type of computer. The CPU 270 can access the assembly file 285 and the article file 284 to determine if articles of the necessary natures to construct the computer are available.

After a sequential label is read by an OCR device, the revision status file 283 can be accessed by the CPU 270 to determine by comparison if a particular article, which has its revision status printed on its sequential label, is the latest revision for articles of a similar nature. The CPU 270 transfers information concerning the revision status to the computer 203 for comparison. If the revision file is stored in the memory 214, then the computer 203 can make the comparison by accessing its memory. The computer 203 can make the comparison when the sequential label is read by the OCR device 233. The computer 203 can print the report 141 (FIG. 7) on the printer 234. Information concerning the listing of the natures of articles to make up an assembly stored within an assembly file 285 and the latest revisions for particular articles stored within revision status file 283 can be inputted through the keyboard 224 or the keyboard 259 and transferred to central processing unit 270 through the computers 203 and 204, respectively, for storage within the respective files. The information could also be entered into the CPU 270 through any standard means, for example, a keyboard connected directly to the central processing unit 270. The data storage unit 279 can also contain a file (not shown) in which the last unique identifying indicia generated by either the computer 203 or the computer 204 is stored.

A particular arrangement and usage of the computers 203 and 204 and their attendant peripheral devices is set forth below. The computer 204 can be located at the entry of a stockroom having a plurality of storage locations (such as those shown in FIG. 8). The OCR device 260 and, more particularly, its hand-held module 268 is utilized to read the initial labels (FIG. 3) disposed on each article. The CPU 245 stores that information, i.e., the serial number and the nature of the article into the memory 247. This information is transferred to the CPU 270 for storage in the article file 254. The revision status can also be assigned when the article is constructed by utilizing the latest revision for articles of that nature stored in the revision status file 283 or the revision status can be manually entered.

The electronics module 264 of the OCR device 260 produces a different electronic representation for each character of the predetermined set of characters which the OCR device 260 is capable of recognizing. The electronic representations are stored as OCR data signals within the memory 247. Those OCR data signals, of course, represent the nature of the article and its serial number. The CPU 245 accesses the memory 247 to determine if articles of a similar nature are stored within the stockroom. If such articles are stored then the computer 245 commands the printer 261 to print the location, the nature of the article, and the serial number onto a log (similar to that shown in FIG. 5). The nature of the article, its serial number, and its location are transferred to the CPU 270 and stored within the article file 284. After this information is transferred to the file 284, the OCR data can be deleted from the memory 247, if desired. A file can be maintained within the memory 247 of the nature of articles and the particular storage location where those articles are to be found.

The articles are then placed within the designated storage location or bin. If similar articles are not stored within any of the storage locations then the computer 204 can assign a storage location for that particular article or a storage location can be selected and its designator entered through the keyboard 259 for storage within the memory 247 as to the nature of that article and the storage location.

Periodically it is desirable to print out a journal (FIG. 6) of the articles stored in the stockroom and the particular storage locations containing these articles. The journal can be utilized to select articles for retrieval from their particular storage locations to be moved out of the stockroom for distribution purposes. The articles can also be selected by the central processing unit 270 for distribution by determining that the articles within the stockroom, as indicated by comparing the natures of articles stored in the article file 284 and the natures of the articles necessary to construct a certain assembly which are stored within assembly file 285, include all of the articles necessary to construct that certain assembly. The CPU 270 could cause that selection to be printed by the line printer 274 or through the computers 203 and 204 by the printers 234 or 261, respectively. This information or any other data or information which is stored within the memories 214 or 247 can be exhibited on either the display 220 or the display 258.

After the certain articles selected for distribution are retrieved from their particular storage locations, they are transferred to the vicinity of the computer 203 and its associated apparatus. The initial labels associated with each article are scanned with the hand-held module 283 and an electronic representation of each character read is generated by the OCR device 233 and stored as OCR data signals within the memory 214. The computer 203 then generates a unique identifying indicia comprised of characters selected from the predetermined set of alphanumeric characters. If required, the CPU 270 can transfer the last unique identifying indicia generated to the computer 203 for utilization in the generation of the indicia. The last unique identifying indicia generated by the computer 203 is transferred to the CPU 270 for storage within the data storage 279. Information concerning the revision status of the article can be entered through the keyboard 224 if desired or the latest revision for articles of that nature can be accessed from the file 283 or the memory 214 or the revision status of the article can be assumed to be the latest. The latter method of assigning revision status is useful if the article isn't finished and the remaining construction is to be done to the latest revision.

The printer 234 in response to commands from the computer 203 prints sequential labels (such as the labels 93 through 95 in FIG. 4) which have the OCR readable unique identifying indicia, the nature of the article, and a code for the revision status of the article. The code for the revision status is developed from the revision status for the articles of that nature stored in the file 283. The computer 203 directs a printer 234 to print sequential labels for each of the articles, having their initial labels read by the OCR device 233. Of course, when the computer 203, and more particularly the CPU 212, generates the unique identifying indicia, the indicia are comprised of signals which identify the particular characters and the ordering of those characters comprising the indicia. The sequential labels are then associated with their respective articles prior to leaving the stockroom and being distributed.

In some instances the articles may re-enter the stockroom with their sequential labels associated therewith. These sequential labels would be read by the OCR device 260, and the resulting OCR data signals are transferred from the electronics module 264 to the CPU 245 to be stored into the memory 247. The OCR data signals are electronic representations of the characters disposed on the printed medium. Any change in the revision status of the article can be entered through the keyboard 259, if desired. As discussed above, the computer 245 determines if articles of a similar nature are stored with any of the storage locations within the stockroom by accessing a file in the memory 247. If similar articles are so located, the log (FIG. 5) is generated by the computer 204 and is printed by the printer 261. If a certain article is required for immediate use, the computer 204, after the OCR device 260 reads the initial or sequential label, can actuate the acoustic device 257 to so indicate. The acoustic device 218 can be actuated by the computer 203 when, for example, only 23 of 24 articles have their labels converted into data signals and stored within the memory 214. When the OCR device again reads the labels of the 24 articles one or more times it will emit an audible signal when a label not previously read is scanned. The information stored within the memories 214 and 247 can be deleted therefrom after the data is transferred to the CPU 270 for storage within the proper location within the data storage 279, if desired. Of course, if storage was adequate within the memories, a duplicate file to that in data storage 279 could be maintained and in many environments this is highly desirable.

Appendices A and B, which constitute a part of the specification, set forth the instructions for controlling the CPU 48 (FIG. 2) to perform its material control functions. Appendix A is a listing of a firmware program stored within the PROM 50 to serve as an operating system for the CPU 48. Appendix B is a program normally stored in the RAM 52 to be executed by the CPU 48 to carry out the material control system functions.

These programs are written in the PL/M programming language set forth in the PL/M-80 Programming Manual published by Intel Corp. One of ordinary skill in the art would recognize Appendix B as a program for controlling inventory and use of printed circuit boards through the use of human and machine readable labels as described above. It will be apparent to one of ordinary skill in the art that different programs could be written to perform inventory control over different articles.

It should be evident that various modifications can be made to describe embodiments without departing from the scope of the present invention.

APPENDIX A

```
8080 PL/M VERS 4.1

000100  1    /***********************************************/
000200  1    /*    OCR PROM MONITOR - REVISED JULY 30, 1980 ***********/
000300  1    /***********************************************/
000400  1    /* THIS VERSION OF THE PROM MONITOR SUPPORTS THE NEEDS
000500  1       OF OCR DATA TRANSACTORS IN THE FOLLOWING WAY:
000600  1         1. AUTO-DIAL
000700  1         2. TIME SHARING TERMINAL
000800  1         3. DOWNLOAD THRU TIME SHARING
000900  1         4. READ AND WRITE AT ANY RAM MEMORY LOCATION
001000  1         5. PERFORM INITIALIZATIONS ON USARTS, WANDS ETC.
001100  1         6. OCR WAND DRIVER
001200  1         7. DIABLO PRINT MECHANISM DRIVER
001300  1         8. VECTOR ALL GHOST INTERRUPTS
001400  1         9. TEST MEMORY WITHOUT DISTURBING CONTENTS
001500  1        10. CRT DRIVERS - DISPLAY, CURSOR, WINKER
001600  1        11. CONVERT HEX TO DECIMAL OR DECIMAL TO HEX
001700  1
001800  1    DATE WRITTEN- JANUARY, 1980    AUTHOR- NILS A. ANDERSON
001900  1    ***********************************************/
002000  1    DISABLE;
002100  1    DECLARE CRTAD ADDRESS;
002200  1    DECLARE CRTBUF BASED CRTAD BYTE;
002300  1    DECLARE INTADD ADDRESS;/*INTERRUPT ADDRESS*/
002400  1    DECLARE INTADDPTR BASED INTADD ADDRESS;
002500  1    INTADD=1C00H;/*START OF TABLE*/
002600  1    DECLARE LINE22 ADDRESS;
002700  1    DECLARE CRT22CHAR BASED LINE22 BYTE;
002800  1    LINE22=0FB00H;/*START OF LINE 22 ON CRT*/
002900  1    DECLARE LINE22POS BYTE;/*POSITION OF BUFFER POINTER ON LINE 22*/
003000  1    DECLARE LINE23 ADDRESS;
003100  1    DECLARE CRT23CHAR BASED LINE23 BYTE;
003200  1    LINE23=0FB80H;/*START OF LINE 23 ON CRT*/
003300  1    DECLARE LINE23POS BYTE;/*POSITION OF BUFFER POINTER ON LINE 23*/
003400  1    DECLARE STRAD ADDRESS;
003500  1    DECLARE STRING BASED STRAD BYTE;
003600  1    DECLARE (NEWREC,NCHAR,ROW,COLUMN,ONOFF,ENDREC) BYTE;
003700  1    DECLARE TAB ADDRESS;
003800  1    DECLARE EXECUTE$ADDRESS ADDRESS;
003900  1    DECLARE WANDCHAR (48) BYTE;
          1    DECLARE (OCRPRINT,INTENSITY,HIT,DIRECTION) BYTE;/*DIABLO*/
```

```
00040   1       004000          DECLARE (POSITION,LINE) ADDRESS;/*DIABLO*/
00041   1       004100          DECLARE PRINTIT BYTE;/*USED TO TURN DIABLO ON OR OFF*/
00042   1       004200          DECLARE KEYEDVALUE BYTE;
00043   1       004300          DECLARE CLBY LITERALLY '01H';
00044   1       004400          DECLARE CR LITERALLY '0DH';
00045   1       004500          DECLARE CNT$SFT$M LITERALLY '10H';
00046   1       004600          DECLARE STARTPRINT LITERALLY '12H';/*START PRINT KEY*/
00047   1       004700          DECLARE STOPPRINT LITERALLY '14H';/*STOP PRINT KEY*/
00048   1       004800          DECLARE (I,J,K,L,A,B) ADDRESS; /*UNIV COUNTERS*/
00049   1       004900          DECLARE (HOLD$CHAR,HOLD$CT) BYTE;
00050   1       005000          DECLARE MMAD ADDRESS;
00051   1       005100          DECLARE MEMORY$ADDRESS BASED MMAD BYTE;
00052   1       005200          MMAD=000H;
00053   1       005300          DECLARE LINE21 ADDRESS;
00054   1       005400          DECLARE CRT21CHAR BASED LINE21 BYTE;
00055   1       005500          LINE21=0FA80H;/*START OF LINE 21 ON CRT*/
00056   1       005600          DECLARE LINE21POS BYTE;/*POSITION OF BUFFER ON LINE 21*/
00057   1       005700          DECLARE STOPHOST LITERALLY '09H';
00058   1       005800          DECLARE DONE LITERALLY '11H';
00059   1       005900          DECLARE CHAR BYTE;
00060   1       006000          DECLARE (VALUE,VALUEADJUSTER) ADDRESS;
00061   1       006100          DECLARE (WAIT$SECONDS,PUT$ADDRESS) ADDRESS;
00062   1       006200          DECLARE (TRIGGER$CHAR,CHAR$REMAIN) BYTE;
00063   1       006300          /*********************************************/
00064   1       006400          /* PUSH AND POP MACHINE INSTRUCTION LOAD     */
00065   1       006500          /*********************************************/
00066   1       006600          DECLARE PUSHIT DATA (0E3H,0C5H,0D5H,0F5H,0E9H);
00067   1       006700          DECLARE POPIT DATA (0E1H,0F1H,0D1H,0C1H,0E3H,0C9H);
00068   1       006800          GO TO SKIPDEFAULT;
00069   1       006900          DECLARE RESTART7 DATA ('A');/*FILLER FOR NEXT TO START AT 0038H*/
00070   1       007000          GO TO DEFAULT;/*RESTART7 JUMPS TO 0038H WHICH IS HERE*/
00071   1       007100          SKIPDEFAULT1:
00072   1       007200          /*********************************************/
00073   1       007300          /* PUSH AND POP SERVICE ROUTINES             */
00074   1       007400          /*********************************************/
00075   1       007500          PUSH: PROCEDURE;
00076   2       007600          DISABLE;
00077   2       007700          GO TO 0029H;
00078   2       007800          END PUSH;
00079   1       007900          POP: PROCEDURE;
00080   2       008000          DISABLE;
00081   2       008100          GO TO 002EH;
00082   2       008200          END POP;
00083   1       008300          CRTAD=0F000H; /*START TO CRT BUFFER*/
00084   1       008400          /*********************************************/
00085   1       008500          /* CRT DISPLAY ROUTINE -
00086   1       008600                STRAD - STRING STRATING ADDRESSED TO BE DISPLAYED
00087   1       008700                NCHAR - NUMBER CHARACTERS IN STRING
```

```
                    LINE - LINE NUMBER 0-23
                    POSITION - POSITION 0-79
        /******************************************************/
00088  1    008800    DISPLAYIT: PROCEDURE;
00089  1    008900      K=(128*ROW)+COLUMN;
00090  1    009000      CRT$DISPLAY: PROCEDURE;
00091  2    009100        DO J=0 TO (NCHAR-1);
00092  2    009200          CRTBUF(K)=(STRING(J) AND 5FH); /*DISP WITH BITS 6  7 OFF*/
00093  3    009300          K=K+1;
00094  3    009400        END;
00095  3    009500      END CRT$DISPLAY;
00096  2    009600      CALL CRT$DISPLAY;
00097  1    009700    END DISPLAYIT;
00098  1    009800    DISPLAY: PROCEDURE(A,B,C,D);
00099  1    009900      DECLARE A ADDRESS;
00100  1    010000      DECLARE (B,C,D) BYTE;
00101  2    010100      STRAD=A; /*START OF STRING*/
00102  2    010200      NCHAR=B;
00103  2    010300      ROW=C;
00104  2    010400      COLUMN=D;
00105  2    010500      CALL DISPLAYIT;
00106  2    010600    END DISPLAY;
00107  2    010700    /*******************************************************/
00108  2    010800    /*SCROLL SCREEN MACHINE INSTRUCTION LOAD */
00109  2    010900    /*******************************************************/
00110  1    011000    DECLARE SCROLLIT DATA (01H,54H,0BH,21H,80H,0FOH,11H,00H,0FOH,
00111  1    011100                          7EH,/*LOOP RETURN TO THIS POINT*/
00112  1    011200                          12H,23H,13H,0BH,78H,3CH,0C2H,
00113  1    011300                          0FH,01H,/*INSERT ADDRESS OF LOOP 7E ABOVE*/
00114  1    011400                          0C9H);/*RETURN*/
00115  1    011500    /*******************************************************/
00116  1    011600    /* SCROLL THE CRT SHIFTS ALL LINES UP ONE
00117  1    011700        AND BLANKS THE BOTTOM LINE. THE PLM VERSION
00118  1    011800        ALLOWS A VISIBLE RIPPLE TO SHOW AND IS NOT
00119  1    011900        FITTING FOR THE HONEYWELL MICROCOMPUTER,
00120  1    012000        ESPECIALLY WHEN IT IS USED AS A TERMINAL
00121  1    012100        EMULATOR. THE MACHINE LANGUAGE ROUTINE SAVES PROM
00122  1    012200        AND THE RIPPLE IS INVISIBLE.
00123  1    012300    /*******************************************************/
00124  1    012400    EXECUTE$SCROLLIT: PROCEDURE;
00125  1    012500      GO TO 0106H;
00126  1    012600    END EXECUTE$SCROLLIT;
00127  1    012700    SCROLL: PROCEDURE;
00128  2    012800      CALL EXECUTE$SCROLLIT;
00129  2    012900      /*BLANK BOTTOM LINE*/
00130  2    013000      DO J=0 TO 79;
00131  2    013100        CRT23CHAR(J)=20H;
00132  2    013200      END;
00133  2    013300      ENABLE;
```

```
00137  2    013700              END SCROLL;
00138  1    013800              /*******************************************************************/
00139  1    013900              CLEAR$SCREEN: PROCEDURE;
00140  2    014000                K=0;
00141  2    014100                DO I=0 TO 23;
00142  2    014200                  DO J=0 TO 79;
00143  3    014300                    CRTBUF(K)=20H;
00144  4    014400                    K=K+1;
00145  4    014500                  END;
00146  3    014600                  K=K+48;
00147  3    014700                END;
00148  2    014800              END CLEAR$SCREEN;
00149  1    014900              /*******************************************************************/
00150  1    015000              WINKIT: PROCEDURE;
00151  2    015100                /*NCHAR=NUMBER OF POSITIONS TO WINK
00152  2    015200                  ROW=START ROW (0-23)
00153  2    015300                  COLUMN=STARTCOLUMN (0-79)
00154  2    015400                  ONOFF=1,CURSOR ON
00155  2    015500                        2,CURSOR OFF
00156  2    015600                        3,BLINK CHARACTER
00157  2    015700                        4,BLINKER OFF*/
00158  2    015800                K=(128*ROW)+COLUMN;
00159  2    015900                DO J=0 TO (NCHAR-1);
00160  2    016000                  IF ONOFF=1 THEN CRTBUF(K)=(CRTBUF(K) OR 40H);/*SET BIT 6*/
00161  3    016100                  IF ONOFF=2 THEN CRTBUF(K)=(CRTBUF(K) AND 0BFH);
00162  3    016200                  IF ONOFF=3 THEN CRTBUF(K)=(CRTBUF(K) OR 80H);/*SET BIT 7*/
00163  3    016300                  IF ONOFF=4 THEN CRTBUF(K)=(CRTBUF(K) AND 7FH);
00164  3    016400                  K=K+1;
00165  3    016500                END;
00166  3    016600              END WINKIT;
00167  2    016700              WINKER: PROCEDURE(A,B,C,D);
00168  2    016800                DECLARE(A,B,C,D) BYTE;
00169  2    016900                NCHAR=A;
00170  2    017000                ROW=B;
00171  2    017100                COLUMN=C;
00172  2    017200                ONOFF=D;
00173  2    017300                CALL WINKIT;
00174  2    017400              END WINKER;
00175  1    017500              /*******************************************************************/
00176  1    017600              /*        BEGIN MACHINE INITIALIZATIONS          */
00177  1    017700              /*******************************************************************/
00178  1    017800              DECLARE (NUMTRYS,NUMDIGIT) BYTE;
00179  1    017900              DECLARE TELENUMBER (12) BYTE;
00180  1    018000              DECLARE HSTRAD ADDRESS;
00181  1    018100              DECLARE HSTRING BASED HSTRAD BYTE;
00182  1    018200              DECLARE OSTRAD ADDRESS;
00183  1    018300              DECLARE OSTRING BASED OSTRAD BYTE;
00184  1    018400              DECLARE PSTRAD ADDRESS;
00185  1    018500              DECLARE PSTRING BASED PSTRAD BYTE;
```

```
00186  018600  1   DECLARE(HCHAR,OCHAR,PCHAR) BYTE;
00187  018700  1   DECLARE(HHOLD$CT,OHOLD$CT,HENDREC,OENDREC) BYTE;
00188  018800  1   OUTPUT(0C7H)=92H;
00189  018900  1   OUTPUT(4DH)=22H;
00190  019000  1   OUTPUT(0C7H)=02H; /*SET MODEM ON HOOK*/
00191  019100  1   OUTPUT(0C7H)=00H; /*DISABLE ANSWER*/
00192  019200  1   OUTPUT(0D1H)=00H;
00193  019300  1   OUTPUT(0D1H)=00H;
00194  019400  1   OUTPUT(0D1H)=40H;
00195  019500  1   OUTPUT(0D1H)=0FAH;
00196  019600  1   OUTPUT(0D1H)=10H;
00197  019700  1   I=INPUT(0D0H); /*GET GARBAGE CHAR*/
00198  019800  1   OUTPUT (47H)=80H;
00199  019900  1   OUTPUT (4BH)=0AGH; /*KEYBOARD*/
00200  020000  1   OUTPUT (4BH)=05H;  /*START KEYBOARD*/
00201  020100  1   OUTPUT (1CH)=1CH;  /*SET PAGE IN INTERRUPT TABLE*/
00202  020200  1   OUTPUT(4DH)=00;
00203  020300  1   OUTPUT(4DH)=00;
00204  020400  1   OUTPUT(4DH)=00;
00205  020500  1   OUTPUT (4DH)=40H; /*RESET PORT TO MODE STATUS*/
00206  020600  1   OUTPUT (4DH)=0FAH;/*SET MODE*/
00207  020700  1   OUTPUT (4DH)=10H; /*RESET ERS*/
00208  020800  1   I=INPUT(4CH);     /*GET GARBAGE CHAR*/
00209  020900  1   OUTPUT (0CH)=00H; /*RESET INTER*/
00210  021000  1   OUTPUT (0C3H)=0B0H; /*INIT WAND*/
00211  021100  1   OUTPUT (0CBH)=80H;  /*INIT PRINT*/
00212  021200  1   OUTPUT(0CBH)=0DH;
00213  021300  1   OUTPUT(0CBH)=0CH;
00214  021400  1   OUTPUT(0CBH)=01H; /*SELECT PRINTER*/
00215  021500  1   /************************************************************/
00216  021600  1   DECLARE GHOSTINTER DATA (' ');
00217  021700  1   GHOST: PROCEDURE;
00218  021800  1       CALL PUSH;
00219  021900  2       OUTPUT(0CH)=0;
00220  022000  2       CALL POP;
00221  022100  2       ENABLE;
00222  022200  2   END GHOST;
00223  022300  2   IF INTADDPTR(63)=.GHOSTINTER THEN GO TO SKIPBLANK;
00224  022400  2   DO VALUE=1E00H TO 0EFFH; /*CLEAR MEMORY*/
00225  022500  1       MEMORY$ADDRESS(VALUE)=0FFH;
00226  022600  1   END;
00227  022700  2   SKIPBLANK:
00228  022800  1       DO J=0 TO 63; /*VECTOR ALL UN-USED INTERRUPTS*/
00229  022900  2           INTADDPTR(J)=.GHOSTINTER;
00230  023000  1       END;
00231  023100  2   /************************************************************/
00232  023200  1   /*** I N P U T   O U T P U T ***/
00233  023300  1   /************************************************************/
00234  023400  1
```

```
00235  023500  1    BEEPER: PROCEDURE;
00236  023600  2      OUTPUT(0C3H)=0DH;
00237  023700  2      DO J=1 TO 7;
00238  023800  3        CALL TIME(250);
00239  023900  3      END;
00240  024000  2      OUTPUT(0C3H)=0CH;
00241  024100  2    END BEEPER;
00242  024200       /*************************************************************/
00243  024300  1    SEND$HOST$IT: PROCEDURE;
00244  024400  2      HHOLD$CT,HENDREC=0;
00245  024500  2      DECLARE SENDINTER DATA (' ');
00246  024600  2    SENDINT: PROCEDURE;
00247  024700  3      CALL PUSH;
00248  024800  3      OUTPUT(0D0H)=HSTRING(HHOLD$CT);  /*NEXT CHAR*/
00249  024900  3      IF (HHOLD$CT:=HHOLD$CT+1)=HCHAR THEN DO;
00250  025000  3        DO WHILE (INPUT(0D1H) AND 4)=0;
00251  025100  4          IF (INPUT(0D1H) AND 80H) <> 80H THEN GO TO NOWAIT;
00252  025200  5          IF KEYEDVALUE=09H THEN GO TO NOWAIT;/*STOP HOST KEY*/
00253  025300  5        END; /*WAIT FOR LAST CHAR TRANS*/
00254  025400  4      NOWAIT:
00255  025500  4        OUTPUT(0D1H)=22H;/*DISABLE REC-TRAN*/
00256  025600  4        HENDREC=1;
00257  025700  4      END;
00258  025800  3      OUTPUT(0CH)=0;
00259  025900  3      CALL POP;
00260  026000  3      ENABLE;
00261  026100  3    END SENDINT;
00262  026200  2      INTADDPTR(12)=.SENDINTER;
00263  026300  2      OUTPUT(0D1H)=23H;/*TRANS ENABLE*/
00264  026400  2      DO WHILE HENDREC=0;
00265  026500  2      END;
00266  026600  2    END SEND$HOST$IT;
00267  026700       /*************************************************************/
00268  026800  1    SEND$HOST: PROCEDURE(A,B);
00269  026900  2      DECLARE A ADDRESS;
00270  027000  2      DECLARE B BYTE;
00271  027100  2      HSTRAD=A;
00272  027200  2      HCHAR=B;
00273  027300  2      CALL SEND$HOST$IT;
00274  027400  2    END SEND$HOST;
00275  027500       /*************************************************************/
00276  027600  1    OUTPUT$PORT: PROCEDURE;
00277  027700  2      OHOLD$CT,OENDREC=0;
00278  027800  2      DECLARE SENDINTER DATA (' ');
00279  027900  2    SENDINT: PROCEDURE;
00280  028000  3      CALL PUSH;
00281  028100  3      OUTPUT(4CH)=OSTRING(OHOLD$CT);  /*NEXT CHAR*/
00282  028200  3      IF (OHOLD$CT:=OHOLD$CT+1)=OCHAR THEN DO;
00283  028300  3        DO WHILE (INPUT(4DH) AND 4)=0;
```

```
00264  4  028400      END;/*WAIT FOR LAST CHAR TRANS*/
00285  4  028500      OUTPUT(4DH)=22H;/*DISABLE REC-TRAN*/
00286  4  028600      OENDREC=1;
00287  4  028700      END;
00288  3  028800      OUTPUT(0CH)=0;
00289  3  028900      CALL POP;
00290  3  029000      ENABLE;
00291  3  029100      END SENDINT;
00292  2  029200      INTADDPTR(7)=.SENDINTER;
00293  2  029300      OUTPUT(4DH)=23H;/*TRANS ENABLE*/
00294  2  029400      DO WHILE OENDREC=0;
00295  2  029500      END;
00296  2  029600      END OUTPUT$PORT;
00297  1  029700      /**************************************************/
00298  1  029800      PRINTITIT: PROCEDURE;
00299  2  029900      I=0;
00300  2  030000      IF (OCRPRINT=1) OR (OCRPRINT=2) THEN INTENSITY=07H;
00301  2  030100      ELSE INTENSITY=00H;/*NORMAL*/
00302  2  030200      IF PSTRING(I)=0DH THEN DO;/*PERFORM CARRIAGE RETURN*/
00303  2  030300      DO WHILE (INPUT(0C4H) AND 05H)<>05H;
00304  3  030400      END;
00305  3  030500      POSITION=POSITION-(TAB*3);
00306  3  030600      OUTPUT(0C8H)=LOW(POSITION);
00307  3  030700      OUTPUT(0C9H)=(HIGH(POSITION) OR 04H);/*NEGATIVE DIRECTION*/
00308  3  030800      OUTPUT(0CBH)=05H;/*STROBE-*/
00309  3  030900      OUTPUT(0CBH)=04H;/*CARRIAGE*/
00310  3  031000      POSITION=(TAB*3);
00311  3  031100      RETURN;
00312  3  031200      END;
00313  2  031300      IF PSTRING(I)=0AH THEN DO; /*PERFORM LINE FEED*/
00314  2  031400      DO WHILE (INPUT(0C4H) AND 11H) <> 11H;/*FEED NOT READY*/
00315  3  031500      END;
00316  3  031600      LINE=LINE+TAB;
00317  3  031700      TAB=TAB*4;
00318  3  031800      OUTPUT(0C8H)=LOW(TAB);
00319  3  031900      OUTPUT(0C9H)=HIGH(TAB);
00320  3  032000      OUTPUT(0CBH)=07H;/*STROBE-*/
00321  3  032100      OUTPUT(0CBH)=06H;/*-PAPER FEED-*/
00322  3  032200      RETURN;
00323  3  032300      END;
00324  2  032400      DO WHILE (INPUT(0C4H) AND 05H)<>05H;/*NOT READY*/
00325  2  032500      END;
00326  2  032600      TAB=TAB*3;
00327  2  032700      OUTPUT(0C8H)=LOW(TAB);
00328  2  032800      OUTPUT(0C9H)=(HIGH(TAB) OR DIRECTION);
00329  2  032900      OUTPUT(0CBH)=05H;
00330  2  033000      OUTPUT(0CBH)=04H;/*STROBE CARRIAGE*/
00331  2  033100      IF DIRECTION=0 THEN POSITION=POSITION+TAB;
00332  2  033200      ELSE POSITION=POSITION-TAB;
```

```
033300  2  IF PSTRING(I)=20H THEN GO TO SKIPSPACE;
033400  2  SELECT$PRINTSWHEEL:
033500  2  HIT=0;
033600  2  HIT$AGAIN:
033700  2  DO WHILE (INPUT(0C4H) AND 09H) <> 09H;
033800  2  END;
033900  2  OUTPUT(0C8H)=PSTRING(I);
034000  2  OUTPUT(0C9H)=INTENSITY;
034100  2  OUTPUT(0CBH)=09H;/*STROBE-*/
034200  2  OUTPUT(0CBH)=08H;/*-PRINT WHEEL*/
034300  2  IF (OCRPRINT=2) OR (OCRPRINT=3)
034400  2  THEN IF (HIT:=HIT+1) = 1 THEN GO TO HIT$AGAIN;
034500  2  SKIPSPACE:
034600  2  IF (I:=I+1) = PCHAR THEN RETURN;
034700  2  DO WHILE (INPUT(0C4H) AND 05H) <>05H;/*NOT READY*/
034800  2  END;
034900  2  OUTPUT(0C8H)=6;
035000  2  OUTPUT(0C9H)=DIRECTION;
035100  2  OUTPUT(0CBH)=05H;/*STROBE-*/
035200  2  OUTPUT(0CBH)=04H;/*CARRIAGE*/
035300  2  IF DIRECTION=0 THEN POSITION=POSITION+6;
035400  2  ELSE POSITION=POSITION-6;
035500  2  IF PSTRING(I)=20H THEN GO TO SKIPSPACE;
035600  2  GO TO SELECT$PRINTSWHEEL;
035700  2  END PRINTITIT;
035800  1  PRINT: PROCEDURE(A,B,C);
035900  2  DECLARE (A,B) ADDRESS;
036000  2  DECLARE C BYTE;
036100  2  PSTRAD=B;
036200  2  TAB=A;
036300  2  PCHAR=C;
036400  2  CALL PRINTITIT;
036500  2  END PRINT;
036600     /****************************************************/
036700  1  BLACK: PROCEDURE; /**PRINT IN BLACK*/
036800  2  DO WHILE (INPUT(0C4H) AND 09H) <> 09H;
036900  2  END; /*WAIT FOR LAST CHSAR TO HIT*/
037000  2  OUTPUT(0CBH)=03H;
037100  2  END BLACK;
037200     /****************************************************/
037300  1  RED: PROCEDURE; /*PRINT IN RED*/
037400  2  DO WHILE(INPUT(0C4H) AND 09H) <> 09H;
037500  2  END; /*WAIT FOR LAST CHAR TO HIT*/
037600  2  OUTPUT(0CBH)=02H;
037700  2  END RED;
037800     /****************************************************/
037900  1  RIGHT: PROCEDURE;
038000  2  DIRECTION=0;
038100  2  END RIGHT;
038200     /****************************************************/
```

```
00383  038300  1    LEFT: PROCEDURE;
00384  038400  2      DIRECTION=04H;
00385  038500  2    END LEFT;
00386  038600  1    /*********************************************/
00387  038700  1    RESET$PRINTER: PROCEDURE;
00388  038800  2      POSITION=0;
00389  038900  2      OUTPUT(0CBH)=0DH;/*RESTORE*/
00390  039000  2      OUTPUT(0CBH)=0CH;/*PRINTER*/
00391  039100  2      CALL RIGHT;
00392  039200  2      CALL RED;
00393  039300  2      OUTPUT(0CBH)=01H; /*SELECT PRINTER*/
00394  039400  2    END RESET$PRINTER;
00395  039500  1    /*********************************************/
00396  039600  1    /*** W A N D   R E C O R D
00397  039700  1    -----------------------------------------------
00398  039800  1        BY CALLING THIS, THE WAND INTERRUPT IS ENABLED AND
00399  039900  1        CHARACTERS FROM THE WAND ARE PUT IN BUFFER WANDCHAR. BECAUSE
00400  040000  1        ONLY SIX BITS ARE TRANSMITTED 40H MUST BE ADDED TO ALPHAS.
00401  040100  1        SPACES ARE THROWN AWAY IF THEY OCCUR IN THE FIRST 24
00402  040200  1        POSITIONS TO EASE THE EDIT PROCEDURE BUT ARE NEEDED AT THE END
00403  040300  1        TO DETECT G1 G11 OCCURRING. THE PROCEDURE DROPS BAC WHEN
00404  040400  1        AN 80H IS SENT BY THE WAND.
00405  040500  1    *********************************************/
00406  040600  1    WANDRECORD: PROCEDURE;
00407  040700  2      KEYEDVALUE,ENDREC,I=0;
00408  040800  2      DO J=0 TO 47;
00409  040900  2        WANDCHAR(J)=20H;
00410  041000  3      END;
00411  041100  2      DECLARE WANDINPUT DATA ('');
00412  041200  2      WANDINTERRUPT: PROCEDURE;
00413  041300  3        CALL PUSH;
00414  041400  3        WANDCHAR(I)=INPUT(0CCH);
00415  041500  3        IF (WANDCHAR(I) AND 80H)=00H THEN DO;/*LAST CHAR*/
00416  041600  3          ENDREC=1; GO TO SKIPIT;
00417  041700  4        END;
00418  041800  3        IF WANDCHAR(I) < 20H THEN WANDCHAR(I)=WANDCHAR(I)+40H;
00419  041900  3        IF I=0 THEN IF WANDCHAR(I)=3FH THEN GO TO SKIPIT;/*LEAD QUESTION MKS*/
00420  042000  3        IF I=0 THEN IF WANDCHAR(I)=20H THEN GO TO SKIPIT;/*REMOVE SPACES*/
00421  042100  3        IF I > 33 THEN GO TO SKIPIT;
00422  042200  3        I=I+1;
00423  042300  3      SKIPIT:
00424  042400  3        OUTPUT(0CH)=00H;/*RESET INTER*/
00425  042500  3        CALL POP;
00426  042600  3        ENABLE;
00427  042700  3      END WANDINTERRUPT;
00428  042800  2      OUTPUT(0C3H)=09H;/*ENABLE WAND*/
00429  042900  2      INTADDPTR(9)=.WANDINPUT;
00430  043000  2      DO WHILE ENDREC=0;
00431  043100  2        DO J=1 TO 20;/*LED TIMER*/
```

```
00432  3  043200           IF ENDREC=1 THEN GO TO RECDONE;
00433  4  043300           CALL TIME(100);
00434  4  043400           END;
00435  3  043500           OUTPUT(0C3H)=04H;/*LED OFF*/
00436  3  043600           IF KEYEDVALUE=11H THEN GO TO RECDONE;
00437  3  043700           IF KEYEDVALUE=0DH THEN GO TO RECDONE;
00438  3  043800           IF KEYEDVALUE=04H THEN DO;/*DELETE KEY*/
00439  3  043900           I=0;
00440  4  044000           GO TO RECDONE;
00441  4  044100           END;
00442  3  044200           IF KEYEDVALUE <> 0 THEN DO;
00443  3  044300           DISABLE;
00444  4  044400           WANDCHAR(I)=KEYEDVALUE;
00445  4  044500           KEYEDVALUE=0;
00446  4  044600           I=I+1;
00447  4  044700           ENABLE;
00448  4  044800           IF I>27 THEN GO TO RECDONE;
00449  4  044900           CALL DISPLAY(.WANDCHAR,28,22,34);
00450  4  045000           END;
00451  3  045100           END;
00452  2  045200           RECDONE:
00453  2  045300           DO J=1 TO 47;
00454  2  045400           WANDCHAR(J)=20H;
00455  3  045500           END;
00456  2  045600           OUTPUT(0C3H)=08H;/*DISABLE WAND*/
00457  2  045700           END WANDRECORD;
00458  1  045800  /*******************************************************/
00459  1  045900
00460  1  046000           SEND$BREAK:PROCEDURE;
00461  2  046100           /* TO SIMULATE THE BREAK KEY */
00462  2  046200           /* SEND THE BREAK BIT TO THE USART */
00463  2  046300           OUTPUT(0D1H) = 2EH;
00464  2  046400           DO I = 1 TO 2; /* HOLD THE BREAK BIT */
00465  2  046500           CALL TIME(200);
00466  3  046600           END;
00467  2  046700           /* SET USART BRACK TO RECEIVE */
00468  2  046800           OUTPUT(0D1H) = 26H;
00469  2  046900           RETURN;
00470  2  047000           END SEND$BREAK;
00471  1  047100  /*******************************************************/
00472  1  047200           DECLARE KB$INTERRUPT DATA ('');
00473  1  047300           KB$INTERRUPT$ROUTINE:PROCEDURE;
00474  2  047400           CALL PUSH; /* SAVE REGISTERS */
00475  2  047500           /* INPUT THE DATA BYTE */
00476  2  047600           IF (KEYEDVALUE := (INPUT (49H) AND 7FH)) = CNT$SFT$M THEN DO;
00477  2  047700           OUTPUT(0CH)=00H;
00478  3  047800           CALL POP;
00479  3  047900           ENABLE;         GO TO MENUWAIT;
00480  3  048000
00481  3  048100           END;
```

```
00482  048200  2    IF KEYEDVALUE=00H THEN GO TO 0000H;
00483  048300  2    /* CTRL-SHIFT-P  GO TO START OF PROM*/
00484  048400  2       OUTPUT(OCH) = 00H;
00485  048500  2       CALL POP;
00486  048600  2       ENABLE;
00487  048700  2       RETURN;
00488  048800  2    END KB$INTERRUPT$ROUTINE;
00489  048900  1    /**********************************************/
00490  049000  1    /* KEYHEX- ACCEPTS 4 DIGITS OF HEX FROM
                        KEYBOARD, DISPLAYS AND STORES IN -VALUE-  */
00491  049100  1
00492  049200  1    /**********************************************/
00493  049300  1    KEYHEX: PROCEDURE;
00494  049400  2       VALUE=0;
00495  049500  2       VALUEADJUSTER=4096;
00496  049600  2       DO A=35 TO 38;
00497  049700  2       CALL WINKER(1,12,A,1);
00498  049800  2       KEYEDVALUE=0;
00499  049900  3       DO WHILE ((KEYEDVALUE < 30H) OR
00500  050000  3          ((KEYEDVALUE > 39H) AND (KEYEDVALUE <40H))
00501  050100  3             OR (KEYEDVALUE > 46H));
00502  050200  3       END;
00503  050300  3       DISABLE;
00504  050400  3       CALL DISPLAY(.KEYEDVALUE,1,12,A);
00505  050500  3       IF KEYEDVALUE > 40H THEN KEYEDVALUE=KEYEDVALUE - 7H;
00506  050600  3       VALUE=VALUE + (KEYEDVALUE - 30H)*VALUEADJUSTER;
00507  050700  3       VALUEADJUSTER=VALUEADJUSTER/16;
00508  050800  3       ENABLE;
00509  050900  3    END;
00510  051000  2    END KEYHEX;
00511  051100  1    /**********************************************/
00512  051200  1    /* HEXDISPLAY-ACCEPTS -VALUE- AND FORMATS FOR
                           A 4 DIGIT DISPLAY              */
00513  051300  1    /**********************************************/
00514  051400  1    HEXDISPLAY: PROCEDURE;
00515  051500  1       VALUEADJUSTER=12;
00516  051600  2       DO A=35 TO 38;
00517  051700  2       IF A=38 THEN DO;
00518  051800  3       CHAR=LOW(VALUE);
00519  051900  3       GO TO SKIPIT;
00520  052000  4       END;
00521  052100  4       CHAR=SHR(VALUE,VALUEADJUSTER);
00522  052200  3    SKIPIT:
00523  052300  3       CHAR=CHAR AND 000FH;
00524  052400  3       IF (CHAR:=CHAR + 30H) > 39H THEN CHAR=CHAR+7H;
00525  052500  3       CALL DISPLAY(.CHAR,1,12,A);
00526  052600  3       VALUEADJUSTER=VALUEADJUSTER-4;
00527  052700  3    END;
00528  052800  3    END HEXDISPLAY;
00529  052900  2
```

```
00530  053000  1   /************************************************/
00531  053100  1   /* DISPLAYMEMORYCONTENTS- CONVERT AND DISPLAY    */
00532  053200  1   /*   CONTENTS OF MEMMORY -MEMORY$ADDRESS- AT LOCATION -VALUE- */
00533  053300  1   /************************************************/
00534  053400  1   DISPLAYMEMORYCONTENTS: PROCEDURE;
00535  053500  1   IF (CHAR:=SHR(MEMORY$ADDRESS(VALUE),4)+30H)>39H THEN CHAR=CHAR+7H;
00536  053600  2   CALL DISPLAY(.CHAR,1,14,36);
00537  053700  2   IF (CHAR:=(MEMORY$ADDRESS(VALUE) AND 0FH)+30H)>39H THEN CHAR=CHAR+7H;
00538  053800  2   CALL DISPLAY(.CHAR,1,14,37);
00539  053900  2   END DISPLAYMEMORYCONTENTS;
00540  054000      /************************************************/
00541  054100  1   /* DISPLAY MEM AND CONTENTS - OF LOCATION KEYEDIN,-VALUE-,*/
00542  054200  1   /************************************************/
00543  054300  1   DISPMEMADDRCONT: PROCEDURE;
00544  054400  2   CALL DISPLAY(.'****',4,12,35);
00545  054500  2   CALL KEYHEX;/*GET KEY INPUT*/
00546  054600  2   CALL DISPLAYMEMORYCONTENTS;/*DISPLAY WHATS THERE*/
00547  054700  2   KEYEDVALUE=0;
00548  054800  2   END DISPMEMADDRCONT;
00549  054900      /************************************************/
00550  055000  1   /* MOVE MEMORY POINTER AND DISPLAY*/
00551  055100  1   /************************************************/
00552  055200  1   MOVEMEMPOINTER: PROCEDURE;
00553  055300  2   IF KEYEDVALUE=',' THEN VALUE=VALUE-1;
00554  055400  2   IF KEYEDVALUE='.' THEN VALUE=VALUE+1;
00555  055500  2   CALL HEXDISPLAY;/*DISP NEW ADDRESS*/
00556  055600  2   CALL DISPLAYMEMORYCONTENTS;/*DISP WHATS THERE*/
00557  055700  2   KEYEDVALUE=0;
00558  055800  2   END MOVEMEMPOINTER;
00559  055900      /************************************************/
00560  056000  1   CHANGEMEMORY: PROCEDURE;
00561  056100  2   CALL WINKER(1,14,36,1);
00562  056200  2   KEYEDVALUE=0;
00563  056300  2   DO WHILE ((KEYEDVALUE < 30H)
00564  056400  2       OR ((KEYEDVALUE > 39H) AND (KEYEDVALUE <40H))
00565  056500  2       OR (KEYEDVALUE > 46H))
00566  056600  2   END;
00567  056700  2   DISABLE;
00568  056800  2   CALL DISPLAY(.KEYEDVALUE,1,14,36);
00569  056900  2   IF KEYEDVALUE > 39H THEN KEYEDVALUE=KEYEDVALUE-7H;
00570  057000  2   CHAR=KEYEDVALUE-30H;
00571  057100  2   CHAR:=(SHL(CHAR,4));
00572  057200  2   MEMORY$ADDRESS(VALUE)=((MEMORY$ADDRESS(VALUE) AND 0FH) OR CHAR);
00573  057300  2   CALL WINKER(1,14,37,1);
00574  057400  2   KEYEDVALUE=0;
00575  057500  2   ENABLE;
00576  057600  2   DO WHILE (KEYEDVALUE < 30H)
00577  057700  2       OR ((KEYEDVALUE > 39H) AND (KEYEDVALUE <40H))
00578  057800  2       OR (KEYEDVALUE > 46H);
                    END;
```

```
00579  057900  2      DISABLE;
00580  058000  2      CALL DISPLAY(.KEYEDVALUE,1,14,37);
00581  058100  2      IF KEYEDVALUE > 39H THEN KEYEDVALUE=KEYEDVALUE-7H;
00582  058200  2      CHAR=KEYEDVALUE-30H;
00583  058300  2      MEMORY$ADDRESS(VALUE)=((MEMORY$ADDRESS(VALUE) AND 0F0H) OR CHAR);
00584  058400  2      ENABLE;
00585  058500  2      KEYEDVALUE=0;
00586  058600  2      END CHANGEMEMORY;
00587  058700  1      /*****************************************************/
00588  058800  1      /* READ WRITE MEMORY - ALLOWS CHANGE OF MEMORY       */
00589  058900  1      /*****************************************************/
00590  059000  1      READ$WRITE$MEMORY: PROCEDURE;
00591  059100  2      CALL CLEAR$SCREEN;
00592  059200  2      CALL DISPLAY(.'LOCATION',8,12,25);
00593  059300  2      CALL DISPLAY(.'CONTENTS',8,14,25);
00594  059400  2      CALL DISPLAY(.'- CHANGE',8,16,25);
00595  059500  2      CALL DISPLAY(.'> INCREMENT',11,18,25);
00596  059600  2      CALL DISPLAY(.'< DECREMENT',11,20,25);
00597  059700  2      CALL DISPLAY(.'M MEMORY LOCATION',17,22,25);
00598  059800  2      CALL DISPMEMADDRCONT;
00599  059900  2      KEYEDVALUE=0;
00600  060000  2      KEYWAIT1:
00601  060100  2      IF KEYEDVALUE=',' THEN CALL MOVLMEMPOINTER;
00602  060200  2      IF KEYEDVALUE='M' THEN CALL DISPMEMADDRCONT;
00603  060300  2      IF KEYEDVALUE='.' THEN CALL MOVEMEMPOINTER;
00604  060400  2      IF KEYEDVALUE='-' THEN CALL CHANGEMEMORY;
00605  060500  2      GO TO KEYWAIT1;
00606  060600  2      END READ$WRITE$MEMORY;
00607  060700  1      /*****************************************************/
00608  060800  1      CONVERTHEX: PROCEDURE;
00609  060900  2      DECLARE J BYTE;
00610  061000  2      CALL CLEAR$SCREEN;
00611  061100  2      CALL DISPLAY(.'HEX          DEC',6,17,36);
00612  061200  2      CALL DISPLAY(.'H OR D',6,17,36);
00613  061300  2      KEYWAIT1;
00614  061400  2      IF KEYEDVALUE='H' THEN GO TO HEX;
00615  061500  2      IF KEYEDVALUE='D' THEN GO TO DML;
00616  061600  2      GO TO KEYWAIT1;
00617  061700  2      HEX:
00618  061800  2      CALL DISPLAY(.'****    **,***',13,12,35);
00619  061900  2      CALL KEYHEX;
00620  062000  2      VALUEADJUSTER=10000;
00621  062100  2      DO J=42 TO 47;
00622  062200  2      CHAR=VALUE/VALUEADJUSTER MOD 10 + 30H;
00623  062300  2      CALL DISPLAY(.CHAR,1,12,J);
00624  062400  2      VALUEADJUSTER=VALUEADJUSTER/10;
00625  062500  3      IF J=43 THEN J=44;/*SKIP COMMA*/
00626  062600  3      END;
```

```
00628  062800  2   GO TO KEYWAIT1;
00629  062900  2   DML;
00630  063000  2   CALL DISPLAY(.'****    **,***',13,12,35);
00631  063100  2   VALUE=0;
00632  063200  2   VALUEADJUSTER=10000;
00633  063300  2   DO J=42 TO 47;
00634  063400  2   CALL WINKER(1,12,J,1);
00635  063500  2   KEYEDVALUE=0;
00636  063600  3   DO WHILE KEYEDVALUE=C;
00637  063700  3   END;
00638  063800  3   DISABLE;
00639  063900  3   CALL DISPLAY(.KEYEDVALUE,1,12,J);
00640  064000  3   VALUE=VALUE+(KEYEDVALUE-30H)*VALUEADJUSTER;
00641  064100  3   VALUEADJUSTER=VALUEADJUSTER/10;
00642  064200  3   IF J=43 THEN J=44;/*SKIP COMMA*/
00643  064300  3   ENABLE;
00644  064400  3   END;
00645  064500  2   CALL HEXDISPLAY;
00646  064600  2   GO TO KEYWAIT1;
00647  064700  2   END CONVERTHEX;
00648  064800  1   /*****************************************************/
00649  064900  1   DECLARE TERMKEYINTERRUPT DATA ('');
00650  065000  1   TERMKEY: PROCEDURE;
00651  065100  2   CALL PUSH;
00652  065200  2   IF (KEYEDVALUE:=(INPUT(49H) AND 7FH))=CNT$SFT$M THEN DO;
00653  065300  2   OUTPUT(0D1H)=00H;
00654  065400  2   OUTPUT(0C7H)=2;/*HANG UP*/
00655  065500  3   OUTPUT(0CH)=00H;
00656  065600  3   CALL POP;
00657  065700  3   ENABLE;
00658  065800  3   GO TO MENUWAIT;
00659  065900  3   END;
00660  066000  2   IF KEYEDVALUE=00H THEN GO TO 0000H;
00661  066100  2   /*CTRL-SHIFT-P RETURNS TO START OF PROM*/
00662  066200  2   IF KEYEDVALUE=STARTPRINT THEN DO;
00663  066300  3   CALL RESET$PRINTER;
00664  066400  3   CALL BLACK;
00665  066500  3   OCRPRINT,PRINTIT=1;
00666  066600  3   GO TO SKIPIT;
00667  066700  3   END;
00668  066800  2   IF KEYEDVALUE=0CH THEN DO;
00669  066900  2   GO TO SKIPIT;
00670  067000  3   END;
00671  067100  2   IF KEYEDVALUE=STOPPRINT THEN DO;
00672  067200  2   CALL RED;
00673  067300  3   CALL RESET$PRINTER;
00674  067400  3   OCRPRINT,PRINTIT=0;
00675  067500  3   GO TO SKIPIT;
00676  067600  3   END;
00677  067700  2   IF KEYEDVALUE=STOPHOST THEN DO:
```

```
00676  2  067800          CALL SEND$BREAK;
00679  3  067900          GO TO SKIPIT;
00680  3  068000          END;
00681  2  068100          IF KEYEDVALUE=CR THEN DO;
00682  3  068200             IF PRINTIT=1 THEN DO;
00683  3  068300                CALL PRINT(2,.OAH,1);
00684  4  068400                CALL PRINT(0,.ODH,1);
00685  4  068500             END;
00686  3  068600             GO TO SKIP$DISP;
00687  3  068700          END;
00688  2  068800          CRT23CHAR(LINE23POS)=(KEYEDVALUE AND 3FH);
00689  2  068900          IF (LINE23POS+1) > 79 THEN DO;
00690  2  069000             CALL SCROLL;
00691  3  069100             LINE23POS=0;
00692  3  069200          END;
00693  3  069300          IF PRINTIT=1 THEN CALL PRINT(2,.KEYEDVALUE,1);
00694  2  069400   SKIPDISP:
00695  2  069500          OUTPUT(OCH)=00H;
00696  2  069600          ENABLE;
00697  2  069700          CALL SEND$HOST(.KEYEDVALUE,1);
00698  2  069800          OUTPUT(OD1H)=26H;/*RECEIVE ENABLE*/
00699  2  069900   SKIPIT:
00700  2  070000          OUTPUT(OCH)=00H;
00701  2  070100          CALL POP;
00702  2  070200          ENABLE;
00703  2  070300          END TERMKEY;
00704  1  070400   /*************************************************/
00705  1  070500          DECLARE TERMHOST$INTERRUPT DATA ('');
00706  1  070600   TERMHOST: PROCEDURE;
00707  2  070700          CALL PUSH;
00708  2  070800          IF ((HOLD$CHAR:=INPUT(ODOH))AND 7FH) = 7FH THEN GO TO SKIPIT;
00709  3  070900          IF HOLD$CHAR=11H THEN GO TO SKIPIT;
00710  3  071000          IF HOLD$CHAR=ODH THEN DO;
00711  3  071100             IF PRINTIT=1 THEN CALL PRINT(0,.ODH,1);
00712  3  071200             GO TO SKIPIT;/*DONT DISPLAY CARRIAGE RETURN*/
00713  3  071300          END;
00714  2  071400          IF HOLD$CHAR=OAH THEN DO;
00715  2  071500             CALL SCROLL;
00716  3  071600             LINE23POS=0;
00717  3  071700             GO TO SKIPDISP;
00718  3  071800          END;
00719  3  071900          IF (HOLD$CHAR)> 60H THEN HOLDCT:=HOLDCT - 20H;
00720  2  072000          CRT23CHAR(LINE23POS)=(HOLD$CT AND 3FH);/*DISPLAY CHAR*/
00721  2  072100          IF (LINE23POS + 1) > 79 THEN DO;
00722  2  072200             CALL SCROLL;
00723  3  072300             LINE23POS=0;
00724  3  072400          END;
00725  2  072500   SKIPDISP:
00726  2  072600          IF PRINTIT=1 THEN CALL PRINT(2,.HOLD$CHAR,1);
```

```
00727  2  072700         SKIPIT:
00728  2  072800         OUTPUT(0CH)=00H;
00729  2  072900         CALL POP;
00730  2  073000         ENABLE;
00731  2  073100         END TERMHOST;
00732  1  073200  /************************************************************/
00733  2  073300         MEMORY$TEST: PROCEDURE;
00734  2  073400         DECLARE (SAVE,OK) BYTE;
00735  2  073500         OK,KEYEDVALUE=0;
00736  2  073600         CALL CLEAR$SCREEN;
00737  2  073700         CALL DISPLAY(.'MEMORY TESTING',14,12,22);
00738  2  073800         DO VALUE=1E00H TO 0EFFFH;
00739  2  073900         SAVE=MEMORY$ADDRESS(VALUE);
00740  3  074000         MEMORY$ADDRESS(VALUE)=55H;
00741  3  074100         IF MEMORY$ADDRESS(VALUE) <> 55H THEN OK=1;
00742  3  074200         MEMORY$ADDRESS(VALUE)=0AAH;
00743  3  074300         IF MEMORY$ADDRESS(VALUE)<>0AAH THEN OK=1;
00744  3  074400         IF OK=1 THEN DO;
00745  3  074500         CALL DISPLAY(.'FAULT AT',8,12,29);
00746  4  074600         CALL HEXDISPLAY;
00747  4  074700         DO WHILE KEYEDVALUE<>DONE;
00748  4  074800         END;
00749  4  074900         END;
00750  3  075000         MEMORY$ADDRESS(VALUE)=SAVE;
00751  3  075100         END;
00752  3  075200         END MEMORY$TEST;
00754  1  075300  /************************************************************/
00755  1  075400         DECLARE TERMLOAD DATA ('');
00755  1  075500         TERMLOADER: PROCEDURE;
00756  2  075600         CALL PUSH;
00757  2  075700         IF ((HOLD$CHAR:=INPUT(0DDH))AND 7FH) = 7FH THEN GO TO SKIPIT;
00758  2  075800         IF HOLD$CHAR=11H THEN GO TO SKIPIT;
00759  2  075900         IF HOLD$CHAR=0DH THEN GO TO SKIPIT;
00760  2  076000         IF HOLD$CHAR=0AH THEN DO;
00761  2  076100         CALL SCROLL;
00762  3  076200         LINE23POS=0;
00763  3  076300         NEWREC=1;/*USED TO TELL BOOTLOAD TO WAKE-UP AND LOAD NEXT*/
00764  3  076400         GO TO SKIPIT;
00765  3  076500         END;
00766  2  076600         CRT23CHAR(LINE23POS)=HOLDCHAR;/*ENTER ON SCREEN*/
00767  2  076700         LINE23POS=LINE23POS+1;
00768  2  076800         SKIPIT:
00769  2  076900         OUTPUT(0CH)=00H;
00770  2  077000         CALL POP;
00771  2  077100         ENABLE;
00772  2  077200         END TERMLOADER;
00773  1  077300  /************************************************************/
00774  1  077400         BOOTLOAD$MEMORY: PROCEDURE;           /* FORMAT MACHINE CODE */
00775  2  077500         INTADDPTR(10)=.TERMLOAD;
```

```
077600  2         DECLARE (CHECK,J,K,L) BYTE;
077700  2         OUTPUT(0C7H)=06H;
077800  2         OUTPUT(0C7H)=0AH;
077900  2         /*CLOCK IS STOPPED*/
078000  2         LINE23POS,VALUE=0;
078100  2         VALUEADJUSTER=4096;
078200  2         CALL SEND$HOST(.'LIST',1);
078300  2         CALL SEND$HOST(.ODH,1);
078400  2         OUTPUT(0D1H)=26H;/*RECEIVE ENABLE*/
078500  2         DO WHILE LINE23POS=0;/*WAIT FOR DATA */
078600  2         END;
078700  2         NEWREC=0;
078800  2         DO WHILE NEWREC=0;/*WAIT FOR SCROLL AFTER DATA*/
078900  2         END;
079000  2         DO K=0 TO 3;
079100  2         IF CRT22CHAR(K) > 39H THEN CRT22CHAR(K)=CRT22CHAR(K) - 7H;
079200  3         CRT22CHAR(K)=CRT22CHAR(K)-30H;
079300  3         VALUE=VALUE + CRT22CHAR(K)*VALUEADJUSTER;
079400  3         VALUEADJUSTER=VALUEADJUSTER/16;
079500  3         END;
079600  2         WAIT$NEWREC:
079700  2         CHECK,NEWREC=0;/*STAYS AT 0 UNTIL AFTER THE SCROLL*/
079800  2         DO WHILE NEWREC=0;
079900  2         END;
080000  2         IF CRT22CHAR(0)=7AH THEN DO;/*END OF FILE*/
080100  2         KEYEDVALUE=0;/*AVOID RETURNING AGAIN*/
080200  3         INTADDPTR(10)=.TERMHOSTINTERRUPT;
080300  3         RETURN;
080400  3         END;
080500  2         LINE22POS,LINE21POS=0;
080600  2         DO J=1 TO 32;/*DECODE LINE 22 INTO LINE 21*/
080700  2         CRT22CHAR(LINE22POS)=CRT22CHAR(LINE22POS)-20H;
080800  3         CRT22CHAR(LINE22POS+1)=CRT22CHAR(LINE22POS+1)-20H;
080900  3         CRT21CHAR(LINE21POS+2)=(CRT22CHAR(LINE22POS+1)/16)*4
081000  3               + CRT22CHAR(LINE22POS+1)/16;
081100  3         DO L=1 TO 2;
081200  3         CHECK=CHECK + CRT21CHAR(LINE22POS);
081300  4         CRT21CHAR(LINE21POS)=CRT22CHAR(LINE22POS) MOD 16;
081400  4         LINE21POS=LINE21POS+1;
081500  4         LINE22POS=LINE22POS+1;
081600  4         END;
081700  3         LINE21POS=LINE21POS+1;/*SKIP OVER THIRD CHAR*/
081800  3         END;
081900  2         LINE21POS=0;/*BEGIN MEMORY LOAD FROM LINE 21*/
082000  2         DO J=1 TO 48;
082100  2         MEMORY$ADDRESS(VALUE)=(SHL(CRT21CHAR(LINE21POS),4))
082200  3               OR (CRT21CHAR(LINE21POS+1));
082300  3         LINE21POS=LINE21POS + 2;
082400  3         VALUE=VALUE+1;
082500  3         END;
```

```
00826  082600  2        IF (CRT22CHAR(64)-20H) <> (CHECK MOD 64) THEN DO;
00827  082700  2          CALL SEND$BREAK;/*STOP LISTING*/
00828  082800  2          CALL CLEAR$SCREEN;
00829  082900  3          CALL DISPLAY('.'CHECK FAILED AT',15,12,22),
00830  083000  3          CALL HEXDISPLAY;/*DISPLAY MEMORY VALUE*/
00831  083100  3          KEYEDVALUE=0;/*AVOID RETURNING AGAIN*/
00832  083200  3          INTADDPTR(10)=.TERMHCSTINTERRUPT;
00833  083300  3          RETURN;
00834  083400  3        END;
00835  083500  2        GO TO WAITNEWREC;
00836  083600  2          END BOOTLOAD$MEMORY;
00837  083700  1      /*********************************************************/
00838  083800  1      TERMINAL: PROCEDURE;
00839  083900  2        INTADDPTR(5)=.TERMKEYINTERRUPT;
00840  084000  2        CALL CLEAR$SCREEN;
00841  084100  2        LINE22POS,LINE23POS=C;
00842  084200  2        OUTPUT(OD1H)=26H;/*ENABLE RECEIVER*/
00843  084300  2        PRINTIT=0;
00844  084400  2      TYPETEST:
00845  084500  2        IF KEYEDVALUE=0CH THEN CALL BOOTLOAD$MEMORY;/*CTRL-L*/
00846  084600  2        GO TO TYPETEST;
00847  084700  2        END TERMINAL;
00848  084800  1      /*********************************************************/
00849  084900  1      AUTO$DIAL: PROCEDURE;
00850  085000  2        L=0;/*SET NUMBER OF TRYS*/
00851  085100  2      STARTOVER:
00852  085200  2        OUTPUT(OD1H)=00H;/*DISABLE DSR*/
00853  085300  2        OUTPUT(OC7H)=3;/*LIFT RECEIVER*/
00854  085400  2        J=0;
00855  085500  2      WAITONE:
00856  085600  2        CALL TIME(100);
00857  085700  2        IF (J:=J+1)=300 THEN DO;/*WAIT 3 SEC*/
00858  085800  3          OUTPUT(OC7H)=2;
00859  085900  3          DO J=0 TO 200;
00860  086000  3          CALL TIME(100);
00861  086100  4          END;
00862  086200  3          GO TO STARTOVER;
00863  086300  3        END;
00864  086400  2        IF (INPUT(OC5H) AND 1) <> 1 THEN GO TO WAITONE;
00865  086500  2        DO J=1 TO 200;
00866  086600  2          CALL TIME(100);
00867  086700  3        END;
00868  086800  2        DISABLE;
00869  086900  2        DO K=0 TO (NUMDIGIT - 1);
00870  087000  2        IF (TELENUMBER(K)<1) OR (TELENUMBER(K)>9) THEN TELENUMBER(K)=OAH;
00871  087100  3          DO J=1 TO TELENUMBER(K);
00872  087200  3          OUTPUT(OC7H)=2;/*CRADLE RECEIVER*/
00873  087300  4          DO I=1 TO 57;
00874  087400  4          CALL TIME(10);
00875  087500  5          END;
```

```
00876  4  087600  OUTPUT(OC7H)=3;/*LIFT RECEIVER*/
00877  4  087700  DO I=1 TO 37;
00878  4  087800  CALL TIME(10);
00879  5  087900  END;
00880  4  088000  END;

00881  3  088100  DO I=1 TO 528;
00882  3  088200  CALL TIME(10);
00883  4  088300  END;
00884  3  088400  IF K=0 THEN DO I=1 TO 200;/*WAIT 2 SEC FOR OUTSIDE LINE*/
00885  4  088500  CALL TIME(100);
00886  4  088600  END;
00887  3  088700  END;
00888  2  088800  J=0;
00889  2  088900  ENABLE;
00890  2  089000  CARRIERWAIT:
00891  2  089100  IF (J:=J+1) = 1500 THEN DO;
00892  3  089200  OUTPUT(OD1H)=00H;/*DISBALE TRANS/REC*/
00893  3  089300  OUTPUT(OC7H)=3;/*LIFT RECEIVER*/
00894  3  089400  DO J=0 TO 200;/*WAIT 2 SEC*/
00895  3  089500  CALL TIME(100);
00896  4  089600  END;
00897  3  089700  OUTPUT(OC7H)=2;/*HANG UP*/
00898  3  089800  IF (L:=L+1)=NUMTRYS THEN RETURN;/*RETURN*/
00899  3  089900  IF KEYEDVALUE=STOPHOST THEN RETURN;
00900  3  090000  DO J=0 TO 200;/*WAIT TWO SECONDS*/
00901  3  090100  CALL TIME(100);
00902  4  090200  END;
00903  3  090300  GO TO STARTOVER;
00904  3  090400  END;
00905  2  090500  CALL TIME(100);
00906  2  090600  IF (INPUT(OC5H)) AND 2) <> 2 THEN GO TO CARRIERWAIT;
00907  2  090700  OUTPUT(OD1H)=26H;/*ENABLE DATA TERMINAL READY*/
00908  2  090800  OUTPUT(OC7H)=2;/*HANG UP*/
00909  2  090900  DO I=1 TO 50;
00910  2  091000  CALL TIME(100);
00911  3  091100  END;
00912  2  091200  NUMTRYS=OFFH;/*TELL REQUEST BLOCK CARRIER IS ON LINE*/
00913  2  091300  END AUTO$DIAL;
00914     091400  /******************************************************/
00915  1  091500  GO TO SKIPDEFAULT2;/*JUMP OVER RESTART7 ROUTINE*/
00916  1  091600  DEFAULT:/*RST7 ROUTINE*/
00917  1  091700  CALL CLEAR$SCREEN;
00918  1  091800  CALL DISPLAY(.'DEFAULT -',9,12,24);
00919  1  091900  VALUE=(MEMORY$ADDRESS(STACKPTR + 1)*100H)
00920  1  092000           +MEMORY$ADDRESS(STACKPTR);
00921  1  092100  CALL HEXDISPLAY;
00922  1  092200  ENABLE;
00923  1  092300  DO WHILE KEYEDVALUE<> CNT$SFTSM;
00924  1  092400  END;
```

```
00925  092500  1        SKIPDEFAULT2:
00926  092600  1        EXECUTE$ADDRESS=1E00H;/*DEFAULT TO STANDARD*/
00927  092700  1        ENABLE;
00928  092800  1        MENUWAIT:
00929  092900  1        INTADDPTR(5)=.KBINTERRUPT;/*RESET BACK TO NORMAL*/
00930  093000  1        INTADDPTR(10)=.TERMHOSTINTERRUPT;
00931  093100  1        /*******************************************/
00932  093200  1        /* BEGIN MENU SELECTION                    */
00933  093300  1        /*******************************************/
00934  093400  1        CALL CLEAR$SCREEN;
00935  093500  1        CALL DISPLAY(.'OCR SYSTEM MONITOR',18,0,20);
00936  093600  1        CALL DISPLAY(.'KEY YOUR MENU SELECTION',25,4,16);
00937  093700  1        CALL DISPLAY(.'  H = HOST AUTO DIAL-UP',25,6,16);
00938  093800  1        CALL DISPLAY(.'  T = TSS TERMINAL',20,8,16);
00939  093900  1        CALL DISPLAY(.'  M = MEMORY DISPLAY AND CHANGE',33,10,16);
00940  094000  1        CALL DISPLAY(.'  E = EXECUTE',15,12,16);
00941  094100  1        CALL DISPLAY(.'  C = CONVERT HEX-DECIMAL-HEX',31,14,16);
00942  094200  1        CALL DISPLAY(.'  D = DIAGNOSE MEMORY',23,16,16);
00943  094300  1        DO A=4 TO 16 BY 2;
00944  094400  1          CALL DISPLAY(.5BH,1,A,16);
00945  094500  2          CALL DISPLAY(.5DH,1,A,20);
00946  094600  2        END;
00947  094700  1        CALL WINKER(5,4,16,3);
00948  094800  1        CALL DISPLAY(.'CTRL-SHIFT-M  = MONITOR MENU',29,20,7);
00949  094900  1        CALL DISPLAY(.'CTRL-SHIFT-P  = START OF PROM PROGRAM',38,22,7);
00950  095000  1        DO A=20 TO 22 BY 2;
00951  095100  1          CALL DISPLAY(.5BH,1,A,5);
00952  095200  2          CALL DISPLAY(.5DH,1,A,20);
00953  095300  2        END;
00954  095400  1        KEYEDVALUE=0;
00955  095500  1        DO WHILE KEYEDVALUE=0;
00956  095600  1        END;
00957  095700  1        CALL DISPLAY(.KEYEDVALUE,1,23,1);
00958  095800  1        K1:
00959  095900  1        IF KEYEDVALUE='H' THEN DO;
00960  096000  1          CALL CLEAR$SCREEN;
00961  096100  2          CALL DISPLAY(.'DIALING',7,10,35);
00962  096200  2          CALL AUTO$DIAL;
00963  096300  2          IF L=NUMTRYS THEN GO TO MENUWAIT;
00964  096400  2          CALL TERMINAL;
00965  096500  2          GO TO MENUWAIT;
00966  096600  2        END;
00967  096700  1        K2:
00968  096800  1        IF KEYEDVALUE='T' THEN DO;
00969  096900  1          CALL TERMINAL;
00970  097000  2          GO TO MENUWAIT;
00971  097100  2        END;
00972  097200  1        IF KEYEDVALUE='M' THEN DO;
00973  097300  1          CALL READ$WRITE$MEMORY;
```

```
00974  2    097400           GO TO MENUWAIT;
00975  2    097500           END;
00976  1    097600           IF KEYEDVALUE='E' THEN GO TO EXECUTE$ADDRESS;
00977  1    097700           IF KEYEDVALUE='C' THEN CALL CONVERTHEX;
00978  1    097800           IF KEYEDVALUE='D' THEN CALL MEMORY$TEST;
00979  1    097900           GO TO MENUWAIT;
00980  1    098000           EOF;
NO PROGRAM ERRORS
```

APPENDIX B

```
SRU1B = 1819T, ACTIVITY # = 01, REPORT CODE = 06, RECORD COUNT = 03134

8080 PLM1 VERS 4.1

00001  1   000100    /**** OCR BASE-LINK WITH AUTODIAL ************************/
00002  1   000200    /* THIS BASE SHOULD BE COPIED INTO THE APPLICATION
00003  1   000300       AS A BASE TO BUILD UPON AS IT HAS ALL THE
00004  1   000400       NECESSARY LINKS TO THE OCR PROM MONITOR.*/
00005  1   000500    /*********************************************************/
00006  1   000600    DECLARE (A,B,C,D,E,I,J,K,L) ADDRESS;
00007  1   000700    DECLARE MMAD ADDRESS;
00008  1   000800    DECLARE MEMORY$ADDRESS BASED MMAD BYTE;
00009  1   000900    MMAD=0000H;
00010  1   001000    DECLARE WANDPT ADDRESS;
00011  1   001100    DECLARE WAND$CHAR BASED WANDPT BYTE;
00012  1   001200    WANDPT=1D72H;
00013  1   001300    DECLARE INTADD ADDRESS;
00014  1   001400    DECLARE INTADDPTR BASED INTADD ADDRESS;
00015  1   001500    INTADD=1C00H;
00016  1   001600    DECLARE (CTR,TIMEOUT,CHAR) BYTE;
00017  1   001700    DECLARE BUF ADDRESS;
00018  1   001800    DECLARE ON$HOST BYTE;
00019  1   001900    DECLARE YES LITERALLY '0';
00020  1   002000    DECLARE NO LITERALLY '1';
```

```
00021  002100  1    DECLARE DONE LITERALLY '11H';
00022  002200  1    DECLARE MORE LITERALLY '05H';
00023  002300  1    DECLARE STARTPRINT LITERALLY '12H';
00024  002400  1    DECLARE STOPPRINT LITERALLY '14H';
00025  002500  1    DECLARE REPORT LITERALLY '19H';
00026  002600  1    DECLARE LABELS LITERALLY '15H';
00027  002700  1    DECLARE STOPHOST LITERALLY '09H';
00028  002800  1    DECLARE KEYRESTART LITERALLY '3DH';
00029  002900  1    DECLARE CTRL$SHIFT$M LITERALLY '1DH';
00030  003000  1    DECLARE KEYLINEUP LITERALLY '3BH';
00031  003100  1    DECLARE KEYLINEKEYDOWN LITERALLY '2EH';
00032  003200  1    DECLARE KEYPAGEUP LITERALLY '7FH';
00033  003300  1    DECLARE KEYPAGEDOWN LITERALLY '2FH';
00034  003400  1    DECLARE LIGHT LITERALLY '0';
00035  003500  1    DECLARE HARD LITERALLY '1';
00036  003600  1    DECLARE HARDTWICE LITERALLY '2';
00037  003700  1    DECLARE LIGHTTWICE LITERALLY '3';
00038  003800  1    DECLARE (POSITION,LINE) ADDRESS;
00039  003900  1    DECLARE KEYEDVALUE BYTE;
00040  004000       /*INIT THE CLOCK FOLLOWS*/
00041  004100  1    OUTPUT (0CFH)=37H;
00042  004200  1    OUTPUT (0CCH)=00H;
00043  004300  1    OUTPUT (0CCH)=00H;
00044  004400  1    OUTPUT (0CFH)=77H;
00045  004500  1    OUTPUT (0CDH)=00H;
00046  004600  1    OUTPUT (0CDH)=60H;
00047  004700  1    OUTPUT (0C7H)=0DH;
00048  004800  1    OUTPUT (0C7H)=0CH;
00049  004900       /****************************************/
00050  005000       /** P R O C E D U R E S **/
00051  005100       /****************************************/
00052  005200  1    PUSH: PROCEDURE;
00053  005300  2    DISABLE;
00054  005400  2    GO TO 0029H;
00055  005500  2    END PUSH;
00056  005600       /****************************************/
00057  005700  1    POP: PROCEDURE;
00058  005800  2    DISABLE;
00059  005900  2    GO TO 002EH;
00060  006000  2    END POP;
00061  006100       /****************************************/
00062  006200  1    DISPLAY: PROCEDURE(STRING$ADDRESS,NUMBER$CHAR,LINE,POSITION);
00063  006300  2    DECLARE STRING$ADDRESS ADDRESS;
00064  006400  2    DECLARE STRING BASED STRING$ADDRESS BYTE;
00065  006500  2    DECLARE (NUMBER$CHAR,LINE,POSITION) BYTE;
00066  006600  2    MEMORY$ADDRESS(1D67H)=HIGH(STRING$ADDRESS);
00067  006700  2    MEMORY$ADDRESS(1D66H)=LOW(STRING$ADDRESS);
00068  006800  2    MEMORY$ADDRESS(1D69H)=NUMBER$CHAR;
00069  006900  2    MEMORY$ADDRESS(1D6AH)=LINE;
00070  007000  2    MEMORY$ADDRESS(1D6BH)=POSITION;
```

```
00071  2    007100           GO TO 0052H;
00072  2    007200           END DISPLAY;
00073  1    007300           /************************************************/
00074  1    007400           SCROLL: PROCEDURE;
00075  2    007500           GO TO 011EH;
00076  2    007600           END SCROLL;
00077  1    007700           /************************************************/
00078  1    007800           CLEAR$SCREEN: PROCEDURE;
00079  2    007900           GO TO 0153H;
00080  2    008000           END CLEAR$SCREEN;
00081  1    008100           /************************************************/
00082  1    008200           WINKER: PROCEDURE(NUMBER$CHAR,LINE,POSITION,ONOFF);
00083  2    008300           /* ONOFF=1, CURSOR ON
00084  2    008400                    2, CURSOR OFF
00085  2    008500                    3, BLINK CHARACTERS
00086  2    008600                    4, BLINKER OFF
00087  2    008700                                                */
00088  2    008800           DECLARE (NUMBER$CHAR, LINE, POSITION, ONOFF)BYTE;
00089  2    008900           MEMORY$ADDRESS(1D69H)=NUMBER$CHAR;
00090  2    009000           MEMORY$ADDRESS(1D6AH)=LINE;
00091  2    009100           MEMORY$ADDRESS(1D6BH)=POSITION;
00092  2    009200           MEMORY$ADDRESS(1D6CH)=ONOFF;
00093  2    009300           GO TO 01COH;
00094  2    009400           END WINKER;
00095  1    009500           /************************************************/
00096  1    009600           BEEPER: PROCEDURE;
00097  2    009700           GO TO 03A7H;
00098  2    009800           END BEEPER;
00099  1    009900           /************************************************/
00100  1    010000           SEND$PORT: PROCEDURE(MESSAGE$ADDRESS, NUMBER$CHAR);
00101  2    010100           DECLARE MESSAGE$ADDRESS ADDRESS;
00102  2    010200           DECLARE MGADP0 BASED MESSAGE$ADDRESS BYTE;
00103  2    010300           DECLARE NUMBER$CHAR BYTE;
00104  2    010400           MEMORY$ADDRESS(1DE5H)=HIGH(MESSAGE$ADDRESS);
00105  2    010500           MEMORY$ADDRESS(1DE4H)=LOW(MESSAGE$ADDRESS);
00106  2    010600           GO TO 04GEH;
00107  2    010700           END SEND$PORT;
00108  1    010800           /************************************************/
00109  1    010900           SEND$HOST: PROCEDURE(MESSAGE$ADDRESS, NUMBER$CHAR);
00110  2    011000           DECLARE MESSAGE$ADDRESS ADDRESS;
00111  2    011100           DECLARE MGADP0 BASED MESSAGE$ADDRESS BYTE;
00112  2    011200           DECLARE NUMBER$CHAR BYTE;
00113  2    011300           IF (INPUT(0C5H) AND 2) <> 2 THEN DO;/*LOST THE CARRIER*/
00114  2    011400           OUTPUT(0D1H)=00H;/*DISABLE DATA SET*/
00115  3    011500           OUTPUT(0C7H)=2;/*HANG UP PHONE*/
00116  3    011600           RETURN;
00117  3    011700           END;
00118  2    011800           MEMORY$ADDRESS(1DE3H)=HIGH(MESSAGE$ADDRESS);
00119  2    011900           MEMORY$ADDRESS(1DE2H)=LOW(MESSAGE$ADDRESS);
```

```
00120  012000  2  MEMORY$ADDRESS(1DE9H)=NUMBER$CHAR;
00121  012100  2  GO TO 03E1H;
00122  012200  2  END SEND$HOST;
00123  012300  1  /**********************************************************/
00124  012400  1  RECEIVEHOST: PROCEDURE(PUTADDRESS,MAXSIZE,
00125  012500  2                         WAITSECONDS,TRIGGERCHAR,CHARREMAIN);
00126  012600  2  DECLARE(PUTADDRESS,MAXSIZE,TRIGGERCHAR,WAITSECONDS) ADDRESS;
00127  012700  2  DECLARE(TRIGGERCHAR,ENDREC,CHARREMAIN) BYTE;
00128  012800  2  /***
00129  012900  2       PUT$ADDRESS=START OF RECEIVE BUFFER
00130  013000  2       WAIT$SECONDS=TIME IN SECONDS UNTIL RETURN WITH NOTHING,
00131  013100  2       MAXSIZE=MAX BUF SIZE BEFORE CHAR ARE OVERLAID START
00132  013200  2          AT BUF BEGINING
00133  013300  2          IF NOTHING CAME -TIMEOUT- IS SET TO 1
00134  013400  2       TRIGGER$CHARACTER=CHARACTER IN STRING UNIQUE ENOUGH TO
00135  013500  2          KNOW END IS COMMING
00136  013600  2       CHARS$REMAIN=MINIMUM NUMBER OC CGARACTERS AFTER TRIGGER
00137  013700  2          CHARACTER TO ALLOW IN BUFFER BEFORE RETURNING
00138  013800  2          ON A TIMEOUT CALCULATED IN SECONDS AFTER
00139  013900  2          THE TRIGGER
00140  014000  2  WARNING-  ANY OR ALL OF THE CHARACTERS AFTER THE TRIGGER ARE
00141  014100  2          NOT GARANTEED UNLESS TRIGGER IS SET TO FFH THEN ALL
00142  014200  2          THE AMOUNT SPECIFIED IN REMAINING CHARACTERS IS
00143  014300  2          GUARANTEED
00144  014400  2  ***/
00145  014500  2  DECLARE HOST$BREAK DATA(' ');
00146  014600  2  HOST$INTER$BREAK: PROCEDURE;
00147  014700  3  CALL PUSH;
00148  014800  3  IF (CHAR:=(INPUT(0D0H) AND 7FH)) = 7FH THEN GO TO SKIPIT;
00149  014900  3  MEMORY$ADDRESS(I)=CHAR;
00150  015000  3  IF (I:=I+1) = MAXSIZE THEN I=PUTADDRESS;/*DONT OVERFLOW*/
00151  015100  3  IF TRIGGER$CHAR = 0FFH THEN IF J:=J+1 = CHAR$REMAIN
00152  015200  3     THEN WAIT$SECONDS=L+100;/*CHARACTER COUNT*/
00153  015300  3  IF CHAR=TRIGGER$CHAR THEN WAIT$SECONDS=L+(CHAR$REMAIN*4 + 100);
00154  015400  3  SKIPIT:
00155  015500  3  TIMEOUT=0;
00156  015600  3  OUTPUT(0CH)=0;
00157  015700  3  CALL POP;
00158  015800  3  ENABLE;
00159  015900  3  END HOST$INTER$BREAK;
00160  016000  2  INTADDPTR(10)=.HOST$BREAK;
00161  016100  2  J=0;
00162  016200  2  TIMEOUT=1;
00163  016300  2  I=PUTADDRESS;
00164  016400  2  MAXSIZE=MAXSIZE+PUTADDRESS;
00165  016500  2  WAIT$SECONDS=WAIT$SECONDS*100;
00166  016600  2  OUTPUT(0D1H)=26H;/*REC ENABLE*/
00167  016700  2  DO L=0 TO WAIT$SECONDS;
00168  016800  2  IF KEYEDVALUE=09H THEN GO TO RECDONE;
```

```
00169  3  016900         CALL TIME(100);
00170  3  017000         END;
00171  2  017100    RECDONE:
00172  2  017200         OUTPUT(0D1H)=22H;/*DISABLE RECEIVE*/

00173  2  017300         END RECEIVE$HOST;
00174  1  017400    /************************************************************/
00175  1  017500    PRINT: PROCEDURE(TAB,STRING$ADDRESS,LENGTH);
00176  1  017600         DECLARE TAB ADDRESS;
00177  1  017700         DECLARE STRING$ADDRESS ADDRESS;
00178  2  017800         DECLARE STRINGPT BASED STRING$ADDRESS BYTE;
00179  2  017900         DECLARE LENGTH BYTE;
00180  2  018000         MEMORY$ADDRESS(1D6FH)=HIGH(TAB);
00181  2  018100         MEMORY$ADDRESS(1D6EH)=LOW(TAB);
00182  2  018200         MEMORY$ADDRESS(1DE7H)=HIGH(STRING$ADDRESS);
00183  2  018300         MEMORY$ADDRESS(1DE6H)=LOW(STRING$ADDRESS);
00184  2  018400         MEMORY$ADDRESS(1DEBH)=LENGTH;
00185  2  018500         GO TO 04C9H;
00186  2  018600         END PRINT;
00187  2  018700    /************************************************************/
00188  2  018800    BLACK: PROCEDURE;
00189  1  018900         GO TO 06CBH;
00190  1  019000         END BLACK;
00191  2  019100    /************************************************************/
00192  2  019200    RED: PROCEDURE;
00193  2  019300         GO TO 06D9H;
00194  2  019400         END RED;
00195  2  019500    /************************************************************/
00196  2  019600    RIGHT: PROCEDURE;
00197  1  019700         MEMORY$ADDRESS(1DA5H)=0;
00198  1  019800         END RIGHT;
00199  2  019900    /************************************************************/
00200  2  020000    LEFT: PROCEDURE;
00201  2  020100         MEMORY$ADDRESS(1DA5H)=04H;
00202  2  020200         END LEFT;
00203  2  020300    /************************************************************/
00204  2  020400    RESET$PRINTER: PROCEDURE;
00205  1  020500         GO TO 06F3H;
00206  1  020600         END RESET$PRINTER;
00207  2  020700    /************************************************************/
00208  2  020800    GET$PRINT$POSITION: PROCEDURE;
00209  2  020900         POSITION=MEMORY$ADDRESS(1DA7H)*256 + MEMORY$ADDRESS(1DA6H);
00210  1  021000         END GET$PRINT$POSITION;
00211  2  021100    /************************************************************/
00212  2  021200    TRANSFER$POSITION: PROCEDURE(VALUE);
00213  2  021300         DECLARE VALUE ADDRESS;
00214  1  021400         MEMORY$ADDRESS(1DA7H)=HIGH(VALUE);
00215  2  021500
00216  2  021600
```

```
00217  2  021700           MEMORY$ADDRESS(1DA6H)=LOW(VALUE);
00218  2  021800           END TRANSFER$POSITION;
00219  1  021900  /****************************************************/
00220  2  022000           GET$PRINT$LINE: PROCEDURE;
00221  2  022100           LINE=MEMORY$ADDRESS(1DA9H)*256 + MEMORY$ADDRESS(1DA8H);
00222  2  022200           END GET$PRINT$LINE;
00223  1  022300  /****************************************************/
00224  2  022400           TRANSFER$LINE: PROCEDURE(VALUE);
00225  2  022500           DECLARE VALUE ADDRESS;
00226  2  022600           MEMORY$ADDRESS(1DA9H)=HIGH(VALUE);
00227  2  022700           MEMORY$ADDRESS(1DA8H)=LOW(VALUE);
00228  2  022800           END TRANSFER$LINE;
00229  1  022900  /****************************************************/
00230  2  023000           OCRPRINT: PROCEDURE(HAMMER);
00231  2  023100           DECLARE HAMMER BYTE;
00232  2  023200           MEMORY$ADDRESS(1DA2H)=HAMMER;
00233  2  023300           END OCRPRINT;
00234  1  023400  /****************************************************/
00235  2  023500           DECLARE KEY$BOARD$INTERRUPT DATA ('');
00236  2  023600           KB$INTERRUPT: PROCEDURE;
00237  2  023700           CALL PUSH;
00238  2  023800           MEMORY$ADDRESS(1DABH),KEYEDVALUE=(INPUT(49H)AND 7FH);
00239  2  023900           IF KEYEDVALUE=CTRL$SHIFT$M THEN DO;
00240  2  024000           OUTPUT(OCH)=00;
00241  3  024100           CALL POP;
00242  3  024200           ENABLE;
00243  3  024300           GO TO 17CEH;
00244  3  024400           END;
00245  2  024500           OUTPUT(OCH)=00H;
00246  2  024600           CALL POP;
00247  2  024700           ENABLE;
00248  2  024800           END KB$INTERRUPT;
00249  1  024900           INT$ADDPTR(5)=.KEY$BOARD$INTERRUPT;
00250  1  025000  /****************************************************/
00251  2  025100           WAND$RECORD: PROCEDURE;
00252  2  025200           KEYEDVALUE=0;
00253  2  025300           GO TO 070EH;
00254  2  025400           END WANDRECORD;
00255  1  025500  /****************************************************/
00256  2  025600           AUTO$DIAL: PROCEDURE(NTRYS,TELEN,NDIGIT);
00257  2  025700           DECLARE (NTRYS,NDIGIT) BYTE;
00258  2  025800           DECLARE TELEN ADDRESS;
00259  2  025900           DECLARE TELEDIGIT BASED TELEN BYTE;
00260  2  026000           OUTPUT (OC7H)=2;/*HANG UP PHONE*/
00261  2  026100           MEMORY$ADDRESS(1DD4H)=NTRYS;
00262  2  026200           IF NDIGIT > 12 THEN NDIGIT=12;
00263  2  026300           MEMORY$ADDRESS(1DD5H)=NDIGIT;
00264  2  026400           BUF=1DD6H;
00265  2  026500           DO CTR = 0 TO (NDIGIT-1);
```

```
00266  2   MEMORY$ADDRESS(BUF)=TELEDIGIT(CTR)-30H;
00267  3   BUF=BUF+1;
00268  3   END;
00269  2   DIALHOST: PROCEDURE;
00270  3   GO TO 1473H;
00271  3   END DIALHOST;
00272  2   CALL DIALHOST;
00273  2   IF MEMORY$ADDRESS(1DD4H)=0FFH THEN ON$HOST=YES;/*GOT ON*/
00274  2   ELSE ON$HOST=NO;/*DIDN'T GET ON*/
00275  2   END AUTODIAL;
00276      /**************************************************/
00277  1   HANG$UP$HOST: PROCEDURE;
00278  2   IF (INPUT(0C5H) AND 2) <> 2 THEN GO TO NOCARRIER;
00279  2   CALL SEND$HOST(.03H,1);
00280  2   NOCARRIER:
00281  2   OUTPUT(0D1H)=00H;/*DISABLE DATA SET*/
00282  2   OUTPUT(0C7H)=2;/*HANG UP PHONE*/
00283  2   END HANG$UP$HOST;
00284      /**************************************************/
00285  1   CALL CLEAR$SCREEN;
00286      /**************************************************/
00287      /* BEGINNING OF CUSTOM APPLICATION PROGRAM */
00288      /**************************************************/
00289      /****OCR RO-THREE   $V=165-A5   MEMORY F00H**********/
00290      /**************************************************/
00291      /** REVISED AUGUST 1979 FOR THE FOLLOWING:
00292             1. MOVE BUILD STATUS LOG TO OCR-1
00293             2. MOVE FILE UPDATE TO OCR-IV
00294             3. ADD TRANSACTIONS NEEDED TO MOVE BOARDS TO CII
00295             4. GENERATE LABELS FOR CII BOARDS
00296      ****************************************************/
00297      /**************************************************/
00298      /** G L O B A L   D E C L A R E S **************/
00299      /**************************************************/
00300  1   DECLARE (TESTBASE,TSSFLAG) BYTE;
00301  1   DECLARE TDSBUF (76) BYTE;
00302  1   DECLARE EXPAND(18) BYTE;
00303  1   DECLARE COMPACT(18) BYTE;
00304  1   DECLARE FDWG(12) BYTE;
00305  1   DECLARE BDWG(12) BYTE;
00306  1   DECLARE FMNEM(5) BYTE;
00307  1   DECLARE BMNEM(5) BYTE;
00308  1   DECLARE BCODE(5) BYTE;
00309  1   DECLARE BSTAT(4) BYTE;
00310  1   DECLARE BSER(8) BYTE;
00311  1   DECLARE CRETURN DATA (0DH);
00312  1   DECLARE LINEFEED DATA (0AH);
00313  1   DECLARE TITLE DATA ('ASSEMBLY FLOOR USE',
00314  1                       'SERIALIZATION LOG ',
```

```
00315   031500  1           'PRODUCTION CONTROL',
00316   031600  1           'STOCKROOM CONSOLE ');
00317   031700  1   DECLARE CODESTRING DATA(' 1234567890ACDMNPRUXY');
00318   031800  1   DECLARE (CHECKSUMSAVE,CHECKSUM) ADDRESS;
00319   031900  1   DECLARE (KEYINDATA,PAPERSET,PAPERBRANCH,KEYLOCK)BYTE;
00320   032000  1   DECLARE COPYNO BYTE;
00321   032100  1   DECLARE STORAGELIMIT LITERALLY '18750';
00322   032200  1   DECLARE STORAGE (STORAGELIMIT) BYTE;
00323   032300  1   DECLARE TIMER ADDRESS;
00324   032400  1   DECLARE LOGON BYTE;
00325   032500  1   DECLARE UP$DE BYTE;
00326   032600  1   DECLARE FILELOAD BYTE;
00327   032700  1   DECLARE TDS BYTE;
00328   032800  1   DECLARE (TABLE$TOP,STORAGE$TOP) ADDRESS;
00329   032900  1   DECLARE YEAR BYTE;
00330   033000  1   DECLARE NEWFILE BYTE;
00331   033100  1   DECLARE NOCLOCK BYTE;
00332   033200  1   DECLARE CPDISCONNECTS BYTE;
00333   033300  1   DECLARE CLOCKDISP1 DATA ('TIME  00:00 AM');
00334   033400  1   DECLARE CLOCKDISP2 DATA ('19XX FW-00 DAY-0');
00335   033500  1   DECLARE (SERIAL,SERIAL$SAVE) ADDRESS;
00336   033600  1   DECLARE (CI$SERIAL,CI$SERIALSAVE) ADDRESS;
00337   033700  1   DECLARE SERIALDISP (8) BYTE;
00338   033800  1   DECLARE BRDCNT ADDRESS;
00339   033900  1   DECLARE SPACEQTY ADDRESS;
00340   034000  1   DECLARE DISPQTY (4) BYTE;
00341   034100  1   DECLARE PRINT$QTY (3) BYTE;
00342   034200  1   DECLARE STATION BYTE;
00343   034300  1   DECLARE (VALID,PASS,MODE,MESLIN,HOUR,MINUTE,WEEK,DAY,HOURDISP,DISP)BYTE;
00344   034400  1   DECLARE PAGE BYTE;
00345   034500  1   DECLARE QTY ADDRESS;
00346   034600  1   DECLARE FLPNTR ADDRESS;
00347   034700  1   DECLARE VALIDQTY ADDRESS;
00348   034800  1   DECLARE SUBTOTAL ADDRESS;
00349   034900  1   DECLARE FREE ADDRESS;
00350   035000  1   DECLARE UNDERSCORE (16) BYTE;
00351   035100  1   DO J=0 TO 15;
00352   035200  2   UNDERSCORE(J)=5FH;
00353   035300  2   END;
00354   035400      /***********************************************/
00355   035500      /*** P R O M   M O N I T O R   R O U T I N E S ***/
00356   035600      /*********************************************/
00357   035700  1   OUTPUT (0CFH)=37H;/* INITIALIZE CLOCK AS FOLLOWS*/
00358   035800  1   OUTPUT (0CCH)=00H;
00359   035900  1   OUTPUT (0CCH)=00H;
00360   036000  1   OUTPUT (0CFH)=77H;
00361   036100  1   OUTPUT (0CDH)=00H;
00362   036200  1   OUTPUT (0CDH)=60H;
00363   036300  1   OUTPUT (0C7H)=0DH;
```

```
00364  036400  1    OUTPUT (0C7H)=0CH;
00365  036500  1    /*******************************************************/
00366  036600  1    BEEP$TWICE: PROCEDURE;
00367  036700  2      CALL BEEPER;
00368  036800  2      CALL TIME (250);
00369  036900  2      CALL BEEPER;
00370  037000  2    END BEEP$TWICE;
00371  037100  1    /*******************************************************/
00372  037200  1    TDS$RECEIVE: PROCEDURE;
00373  037300  2      DECLARE ENDREC BYTE;
00374  037400  2      J=0;
00375  037500  2      IF FILELOAD=1 THEN DO;
00376  037600  3        I=(STORAGELIMIT-400);
00377  037700  3        GO TO SKIPOTHER;
00378  037800  3      END;
00379  037900  2      DO I=0 TO 75;
00380  038000  3        TDSBUF(I)=0FFH;
00381  038100  3      END;
00382  038200  2      I=(STORAGELIMIT-1);
00383  038300  2    SKIPOTHER:
00384  038400  2      ENDREC=0;
00385  038500  2      VALID=0;
00386  038600  2      TIMEOUT=1;
00387  038700  2      DECLARE TDS$BREAK DATA (' ');
00388  038800  2    TDS$INTERBREAK: PROCEDURE;
00389  038900  3      CALL PUSH;
00390  039000  3      TDSBUF(J),STORAGE(I)=(INPUT(0D0H) AND 7FH);
00391  039100  3      IF STORAGE(I)=7FH THEN GO TO GOTIT;
00392  039200  3      IF FILELOAD=1 THEN DO;
00393  039300  3        IF (I:=I+1) > (STORAGELIMIT-6) THEN DO;
00394  039400  4          FILELOAD=9;/*GO ALL THE CHAR*/
00395  039500  5          TIMER=L+100;
00396  039600  5        END;
00397  039700  4        GO TO GOTIT;
00398  039800  4      END;
00399  039900  3      IF LOGON=1 THEN DO;
00400  040000  3        IF TDSBUF(J)='-' THEN TIMER=L+100;
00401  040100  4        IF TDSBUF(J)=2AH THEN TIMER=L+500;
00402  040200  4        IF (J:=J+1) > 75 THEN TIMER=L+100;
00403  040300  4        GO TO GOTIT;
00404  040400  4      END;
00405  040500  3      J=J+1;
00406  040600  3      IF TDS=1 THEN IF J>13 THEN TIMER=L+100;
00407  040700  3      IF TDS=2 THEN IF J>4 THEN TIMER=L+100;
00408  040800  3      IF J>75 THEN TIMER=L+100;
00409  040900  3    GOTIT:
00410  041000  3      TIMEOUT=0;
00411  041100  3      OUTPUT(0CH)=0;
00412  041200  3      CALL POP;
```

```
00413  041300  3  ENABLE;
00414  041400  3  END TDS$INTERBREAK;
00415  041500  2  INTADDPTR(10)=.TDS$BREAK;
00416  041600  2  OUTPUT(0D1H)=26H;/*REC ENABLE*/
00417  041700  2  DO L=0 TO TIMER;
00418  041800  2  IF KEYEDVALUE=09H THEN ENDREC=1;
00419  041900  3  CALL TIME(100);
00420  042000  3  IF ENDREC=1 THEN GO TO RECDONE;
00421  042100  2  END;
00422  042200  3  RECDONE:
00423  042300  2  OUTPUT(0D1H)=22H;/*DISABLE REC-TRANS*/
00424  042400  2  END TDS$RECEIVE;
00425  042500  1  /************************************************/
00426  042600  1  /*** INTERNAL PROCEDURES **********************/
00427  042700  1  /************************************************/
00428  042800  2  SEPARATOR: PROCEDURE;
00429  042900  2  DO J=30 TO 61;
00430  043000  2  CALL DISPLAY(.3AH,1,MESLIN,J);
00431  043100  3  END;
00432  043200  2  MESLIN=MESLIN+1;
00433  043300  2  END SEPARATOR;
00434  043400  1  /************************************************/
00435  043500  2  BRACKETS: PROCEDURE(LEFT,RIGHT,ROW,NUMBER);
00436  043600  2  DECLARE (J,LEFT,RIGHT,ROW,NUMBER) BYTE;
00437  043700  2  DO J=1 TO NUMBER;
00438  043800  2  CALL DISPLAY(.5BH,1,ROW,LEFT);
00439  043900  3  CALL DISPLAY(.5DH,1,ROW,RIGHT);
00440  044000  3  ROW=ROW+2;
00441  044100  3  END;
00442  044200  2  END BRACKETS;
00443  044300  1  /************************************************/
00444  044400  1  MESSAGE$1: PROCEDURE;
00445  044500  2  CALL DISPLAY('KEY YOUR MENU SELECTION',24,3,32);
00446  044600  2  CALL DISPLAY(.5BH,1,3,31);
00447  044700  2  CALL DISPLAY(.5DH,1,3,35);
00448  044800  2  CALL WINKER(5,3,3);
00449  044900  2  END MESSAGE$1;
00450  045000  1  /************************************************/
00451  045100  1  MESSAGE$2: PROCEDURE;
00452  045200  2  CALL DISPLAY('SCROLL FILE BY DEPRESSING',25,MESLIN,31);
00453  045300  2  MESLIN=MESLIN+1;
00454  045400  2  CALL DISPLAY('UP OR DOWN ARROW KEYS',21,MESLIN,31);
00455  045500  2  MESLIN=MESLIN+1;
00456  045600  2  CALL SEPARATOR;
00457  045700  2  END MESSAGE$2;
00458  045800  1  /************************************************/
00459  045900  1  MESSAGE$3: PROCEDURE;
00460  046000  2  CALL DISPLAY('WAND OR KEY LABEL INFORMATION',29,MESLIN,31);
00461  046100  2  MESLIN=MESLIN+1;
```

```
00462  2  046200         CALL SEPARATOR;
00463  2  046300         END MESSAGE$3;
00464  1  046400         /*******************************************************/
00465  2  046500         MESSAGE$4: PROCEDURE;
00466  2  046600         CALL DISPLAY(.'COUNT ALL YOUR BOARDS AND USE',29,MESLIN,31);
00467  2  046700         MESLIN=MESLIN+1;
00468  2  046800         CALL DISPLAY(.'AS A TARGET. IF YOU ARE SHORT,',30,MESLIN,31);
00469  2  046900         MESLIN=MESLIN+1;
00470  2  047000         CALL DISPLAY(.'START WANDING AGAIN UNTIL YOU',29,MESLIN,31);
00471  2  047100         MESLIN=MESLIN+1;
00472  2  047200         CALL DISPLAY(.'READ A BOARD WITHOUT A BEEP',27,MESLIN,31);
00473  2  047300         MESLIN=MESLIN+1;
00474  2  047400         CALL SEPARATOR;
00475  2  047500         END MESSAGE$4;
00476  1  047600         /*******************************************************/
00477  2  047700         MESSAGE$5: PROCEDURE;
00478  2  047800         CALL DISPLAY(.'WAND ALL BOARDS GETTING A RED',29,MESLIN,31);
00479  2  047900         MESLIN=MESLIN+1;
00480  2  048000         CALL DISPLAY(.'LIGHT FOR EACH. IF IN DOUBT,',28,MESLIN,31);
00481  2  048100         MESLIN=MESLIN+1;
00482  2  048200         CALL DISPLAY(.'WAND AGAIN AS A DUPLICATE READ',30,MESLIN,31);
00483  2  048300         MESLIN=MESLIN+1;
00484  2  048400         CALL DISPLAY(.'WILL BEEP. IF YOU HEAR A',24,MESLIN,31);
00485  2  048500         MESLIN=MESLIN+1;
00486  2  048600         CALL DISPLAY(.'MULTIPLE BEEP, READ THE STATUS',30,MESLIN,31);
00487  2  048700         MESLIN=MESLIN+1;
00488  2  048800         CALL SEPARATOR;
00489  2  048900         END MESSAGE$5;
00490  1  049000         /*******************************************************/
00491  2  049100         MESSAGE$7: PROCEDURE;
00492  2  049200         CALL DISPLAY(.'MOVE RIBBON TO OTHER MACHINE',28,MESLIN,31);
00493  2  049300         MESLIN=MESLIN+1;
00494  2  049400         CALL DISPLAY(.'INSTALL NEW RIBBON HERE',23,MESLIN,31);
00495  2  049500         MESLIN=MESLIN+1;
00496  2  049600         CALL SEPARATOR;
00497  2  049700         END MESSAGE$7;
00498  1  049800         /*******************************************************/
00499  2  049900         MESSAGE$9: PROCEDURE;
00500  2  050000         CALL DISPLAY(.'KEY RE-START TO ABORT, ELSE',27,MESLIN,31);
00501  2  050100         MESLIN=MESLIN+1;
00502  2  050200         CALL DISPLAY(.'MORE INSTRUCTIONS LATER',23,MESLIN,31);
00503  2  050300         MESLIN=MESLIN+1;
00504  2  050400         CALL SEPARATOR;
00505  2  050500         END MESSAGE$9;
00506  1  050600         /*******************************************************/
00507  2  050700         MESSAGE$10: PROCEDURE;
00508  2  050800         CALL DISPLAY(.'TO LIST A STACK WITHOUT HOST',28,MESLIN,31);
00509  2  050900         MESLIN=MESLIN+1;
00510  2  051000         CALL DISPLAY(.'SELECT MENU, THEN RE-START',26,MESLIN,31);
```

```
00511  2  051100      MESLIN=MESLIN+1;
00512  2  051200      CALL DISPLAY(.'AFTER REPORT, BEFORE HOST',26,MESLIN,31);
00513  2  051300      MESLIN=MESLIN+1;
00514  2  051400      CALL SEPARATOR;
00515  2  051500      END MESSAGE$10;
00516  1  051600   /***************************************************/
00517  1  051700   MESSAGE$12: PROCEDURE;
00518  2  051800      CALL DISPLAY(.'KEY MORE-BOARDS FOR MORE',24,MESLIN,31);
00519  2  051900      MESLIN=MESLIN+1;
00520  2  052000      CALL SEPARATOR;
00521  2  052100      END MESSAGE$12;
00522  1  052200   /***************************************************/
00523  1  052300   MESSAGE$14: PROCEDURE;
00524  2  052400      CALL DISPLAY(.'ADJUST PRINTER USING UP AND',27,MESLIN,31);
00525  2  052500      MESLIN=MESLIN+1;
00526  2  052600      CALL DISPLAY(.'DOWN ARROW KEYS.',16,MESLIN,31);
00527  2  052700      MESLIN=MESLIN+1;
00528  2  052800      CALL SEPARATOR;
00529  2  052900      END MESSAGE$14;
00530  1  053000   /***************************************************/
00531  1  053100   MESSAGE$15: PROCEDURE;
00532  2  053200      CALL DISPLAY(.'LOAD PRINTER WITH PAPER',23,MESLIN,31);
00533  2  053300      MESLIN=MESLIN+1;
00534  2  053400      CALL DISPLAY(.'ALIGNING PERFORATION WITH',25,MESLIN,31);
00535  2  053500      MESLIN=MESLIN+1;
00536  2  053600      CALL DISPLAY(.'TEAR-BAR.',9,MESLIN,31);
00537  2  053700      MESLIN=MESLIN+1;
00538  2  053800      CALL SEPARATOR;
00539  2  053900      END MESSAGE$15;
00540  1  054000   /***************************************************/
00541  1  054100   MESSAGE$16: PROCEDURE;
00542  2  054200      CALL DISPLAY(.'KEY PRINT WILL START PRINT',26,MESLIN,31);
00543  2  054300      MESLIN=MESLIN+1;
00544  2  054400      CALL SEPARATOR;
00545  2  054500      END MESSAGE$16;
00546  1  054600   /***************************************************/
00547  1  054700   MESSAGE$17: PROCEDURE;
00548  2  054800      CALL DISPLAY(.'KEY REPORT FOR MORE COPIES',26,MESLIN,31);
00549  2  054900      MESLIN=MESLIN+1;
00550  2  055000      CALL SEPARATOR;
00551  2  055100      END MESSAGE$17;
00552  1  055200   /***************************************************/
00553  1  055300   MESSAGE$18: PROCEDURE;
00554  2  055400      CALL DISPLAY(.'KEY STOP-PRINT IF NECESSARY',27,MESLIN,31);
00555  2  055500      MESLIN=MESLIN+1;
00556  2  055600      CALL SEPARATOR;
00557  2  055700      END MESSAGE$18;
00558  1  055800   /***************************************************/
00559  1  055900   MESSAGE$20: PROCEDURE;
```

```
00560  2   056000      CALL DISPLAY(.'ELSE KEY LABELS',15,MESLIN,31);
00561  2   056100      MESLIN=MESLIN+1;
00562  2   056200      CALL SEPARATOR;
00563  2   056300      END MESSAGE$20;
00564  1   056400      /**********************************************/
00565  1   056500      MESSAGE$21: PROCEDURE;
00566  2   056600      CALL DISPLAY(.'KEY LABELS FOR MORE COPIES',26,MESLIN,31);
00567  2   056700      MESLIN=MESLIN+1;
00568  2   056800      CALL SEPARATOR;
00569  2   056900      END MESSAGE$21;
00570  1   057000      /**********************************************/
00571  1   057100      MESSAGE$22: PROCEDURE;
00572  2   057200      CALL DISPLAY(.'LOAD PRINTER WITH LABELS',24,MESLIN,31);
00573  2   057300      MESLIN=MESLIN+1;
00574  2   057400      CALL DISPLAY(.'ALIGN BOTTOM OF ANY LABEL',25,MESLIN,31);
00575  2   057500      MESLIN=MESLIN+1;
00576  2   057600      CALL DISPLAY(.'WITH TOP OF RIBBON-GUIDE.',25,MESLIN,31);
00577  2   057700      MESLIN=MESLIN+1;
00578  2   057800      CALL SEPARATOR;
00579  2   057900      END MESSAGE$22;
00580  1   058000      /**********************************************/
00581  1   058100      MESSAGE$24: PROCEDURE;
00582  2   058200      CALL DISPLAY(.'KEY DONE IF FINISHED',20,MESLIN,31);
00583  2   058300      MESLIN=MESLIN+1;
00584  2   058400      CALL SEPARATOR;
00585  2   058500      END MESSAGE$24;
00586  1   058600      /**********************************************/
00587  1   058700      MESSAGE$25: PROCEDURE;
00588  2   058800      CALL DISPLAY(.'KEY STOP-HOST IF NEEDED',23,MESLIN,31);
00589  2   058900      MESLIN=MESLIN+1;
00590  2   059000      CALL SEPARATOR;
00591  2   059100      END MESSAGE$25;
00592  1   059200      /**********************************************/
00593  1   059300      MESSAGE$26: PROCEDURE;
00594  2   059400      CALL DISPLAY(.'USE X-ACTO KNIFE AGAINST',24,MESLIN,31);
00595  2   059500      MESLIN=MESLIN+1;
00596  2   059600      CALL DISPLAY(.'TEAR-BAR TO REMOVE LABELS',25,MESLIN,31);
00597  2   059700      MESLIN=MESLIN+1;
00598  2   059800      CALL SEPARATOR;
00599  2   059900      END MESSAGE$26;
00600  1   060000      /**********************************************/
00601  1   060100      MESSAGE$27: PROCEDURE;
00602  2   060200      CALL DISPLAY(.'S  = STOCK OUTPUT',18,6,33);
00603  2   060300      CALL DISPLAY(.'U  = UTILITIES',15,8,33);
00604  2   060400      CALL BRACKETS(31,35,6,2);
00605  2   060500      MESLIN=12;
00606  2   060600      CALL SEPARATOR;
00607  2   060700      END MESSAGE$27;
00608  1   060800      /**********************************************/
```

```
00609  1        060900    STATUS: PROCEDURE (NUMBER,STATUS$WINDOW,WINK);
00610  2        061000    DECLARE (NUMBER,STATUS$WINDOW,WINK)BYTE;
00611  2        061100    STATUS$WINDOW=STATUS$WINDOW+STATUS$WINDOW;
00612  2        061200    DO CASE NUMBER;
00613  2        061300    CALL DISPLAY('SYSTEM READY        ',16,STATUS$WINDOW,64);
00614  3        061400    CALL DISPLAY('WAITING BADGE       ',16,STATUS$WINDOW,64);
00615  3        061500    CALL DISPLAY('TO PN-WB FLOOR      ',16,STATUS$WINDOW,64);
00616  3        061600    CALL DISPLAY('TO PN-CB CII        ',16,STATUS$WINDOW,64);
00617  3        061700    CALL DISPLAY('REJECTED BY HOST    ',16,STATUS$WINDOW,64); /* 5*/
00618  3        061800    CALL DISPLAY('ACCEPTED BY HOST    ',16,STATUS$WINDOW,64);
00619  3        061900    CALL DISPLAY('BAD NUMBER          ',16,STATUS$WINDOW,64);
00620  3        062000    CALL DISPLAY('LOAD LABELS         ',16,STATUS$WINDOW,64);
00621  3        062100    CALL DISPLAY('LOAD PAPER          ',16,STATUS$WINDOW,64);
00622  3        062200    CALL DISPLAY('ID                  ',16,STATUS$WINDOW,64); /*10*/
00623  3        062300    CALL DISPLAY('SEQUENCE            ',16,STATUS$WINDOW,64);
00624  3        062400    CALL DISPLAY('SERIALIZE ONLY      ',16,STATUS$WINDOW,64);
00625  3        062500    CALL DISPLAY('WAND INPUT          ',16,STATUS$WINDOW,64);
00626  3        062600    CALL DISPLAY('COUNT               ',16,STATUS$WINDOW,64);
00627  3        062700    CALL DISPLAY('VALID               ',16,STATUS$WINDOW,64); /*15*/
00628  3        062800    CALL DISPLAY('TRANSMITTING        ',16,STATUS$WINDOW,64);
00629  3        062900    CALL DISPLAY('SYSTEM BUSY         ',16,STATUS$WINDOW,64);
00630  3        063000    CALL DISPLAY('PRINTING            ',16,STATUS$WINDOW,64);
00631  3        063100    CALL DISPLAY('RO FROM PN-76       ',16,STATUS$WINDOW,64);
00632  3        063200    CALL DISPLAY('RO FROM PN-77       ',16,STATUS$WINDOW,64); /*20*/
00633  3        063300    CALL DISPLAY('REPLACEMENT LBLS    ',16,STATUS$WINDOW,64);
00634  3        063400    CALL DISPLAY('REV FILE UPDATE     ',16,STATUS$WINDOW,64);
00635  3        063500    CALL DISPLAY('READ BEFORE         ',16,STATUS$WINDOW,64);
00636  3        063600    CALL DISPLAY('FIRST TIME READ     ',16,STATUS$WINDOW,64);
00637  3        063700    CALL DISPLAY('SUCCESSFUL          ',16,STATUS$WINDOW,64); /*25*/
00638  3        063800    CALL DISPLAY('VALIDATION          ',16,STATUS$WINDOW,64);
00639  3        063900    CALL DISPLAY('DUPLICATE NUMBER    ',16,STATUS$WINDOW,64);
00640  3        064000    CALL DISPLAY('DIALING THE HOST    ',16,STATUS$WINDOW,64);
00641  3        064100    CALL DISPLAY('TO I.M.S. + WWBS    ',16,STATUS$WINDOW,64);
00642  3        064200    CALL DISPLAY('TO RAW-BALANCE      ',16,STATUS$WINDOW,64); /*30*/
00643  3        064300    CALL DISPLAY('OUT OF PAPER        ',16,STATUS$WINDOW,64);
00644  3        064400    CALL DISPLAY('MEMORY ROOM 0000    ',16,STATUS$WINDOW,64);
00645  3        064500    CALL DISPLAY('SUB-TOTAL      000  ',16,STATUS$WINDOW,64);
00646  3        064600    CALL DISPLAY('SERIAL         000  ',16,STATUS$WINDOW,64);
00647  3        064700    CALL DISPLAY('BUILD STATUS LOG    ',16,STATUS$WINDOW,64);
00648  3        064800    CALL DISPLAY('SYSTEM-N SIGN ON    ',16,STATUS$WINDOW,64);
00649  3        064900    CALL DISPLAY('DATA BASE LOG ON    ',16,STATUS$WINDOW,64);
00650  3        065000    END;
00651  2        065100    IF WINK=1 THEN CALL WINKER(16,STATUS$WINDOW,64,3);
00652  2        065200    IF WINK=0 THEN CALL WINKER(16,STATUS$WINDOW,64,4);
00653  2        065300    END STATUS;
00654  2        065400    /****************************************************/
00655  1        065500    CLEAR$STATUS: PROCEDURE;
00656  2        065600    J=2;
```

```
00658  2  065600           DO I=1 TO 11;
00659  2  065900           CALL STATUS(0,J,0);
00660  3  066000           J=J+2;
00661  3  066100           END;
00662  2  066200           END CLEAR$STATUS;
00663  1  066300           /*****************************************************/
00664  2  066400           WAND$READS$DISP: PROCEDURE;
00665  2  066500           MESLIN=21;
00666  2  066600           CALL SEPARATOR;
00667  2  066700           CALL DISPLAY('.WAND READS',10,21,41);
00668  2  066800           MESLIN=2;
00669  2  066900           END WAND$READS$DISP;
00670  1  067000           /*****************************************************/
00671  1  067100           CHECKCODE: PROCEDURE(J);
00672  2  067200           DECLARE (I,J) BYTE;
00673  2  067300           DO I=0 TO 19;
00674  2  067400           IF J = CODESTRING(I) THEN CHECKSUM=CHECKSUM+1;
00675  3  067500           END;
00676  2  067600           END CHECKCODE;
00677  1  067700           /*****************************************************/
00678  1  067800           CHECK$76$CODE: PROCEDURE (J,K);
00679  2  067900           DECLARE (I,J,K) BYTE;
00680  2  068000           DO I=0 TO 19;
00681  2  068100           IF J = CODESTRING(I) THEN CHECKSUM=CHECKSUM+I*K;
00682  3  068200           END;
00683  2  068300           END CHECK$76$CODE;
00684  1  068400           /*****************************************************/
00685  1  068500           DISPLAY$QUANTITY: PROCEDURE(QTY,L,P);
00686  2  068600           /*DISPLAY QUANTITY QTY AT LINE L POSITION P*/
00687  2  068700           DECLARE QTY ADDRESS;
00688  2  068800           DECLARE (L,P) BYTE;
00689  2  068900           DISPQTY(0)=QTY/1000 MOD 10 + 30H;
00690  2  069000           DISPQTY(1)=QTY/100 MOD 10 + 30H;
00691  2  069100           DISPQTY(2)=QTY/10 MOD 10 + 30H;
00692  2  069200           DISPQTY(3)=QTY MOD 10 + 30H;
00693  2  069300           CALL DISPLAY(.DISPQTY,4,L,P);
00694  2  069400           END DISPLAY$QUANTITY;
00695  2  069500           /*****************************************************/
00696  1  069600           CLEAR$INSTR: PROCEDURE;
00697  2  069700           DO I=MESLIN TO 22;
00698  2  069800           CALL DISPLAY('                                ',32,I,30);
00699  3  069900           END;
00700  2  070000           END CLEAR$INSTR;
00701  2  070100           TIME$SHARE$CONNECT: PROCEDURE;
00702  1  070200           TRYAGAIN:
00703  1  070300           CALL STATUS(28,3,1);
00704  2  070400           CALL AUTODIAL(1,.'5576',4);
00705  2  070500
00706  2  070600
```

```
00707  070700  2   IF KEYEDVALUE=STOPHOST THEN RETURN;
00708  070800  2   IF ON$HOST=YES THEN GO TO TSSLOG;/*GOT ON*/
00709  070900  2   CALL AUTODIAL(1,,'92495756',8);
00710  071000  2   IF ON$HOST=YES THEN GO TO TSSLOG;/*GOT ON*/
00711  071100  2   IF KEYEDVALUE=STOPHOST THEN RETURN;
00712  071200  2   CALL AUTODIAL(1,,'92497003',8);
00713  071300  2   IF ON$HOST=YES THEN GO TO TSSLOG;/*GOT ON*/
00714  071400  2   IF KEYEDVALUE=STOPHOST THEN RETURN;
00715  071500  2   CALL AUTODIAL(1,,'92497384',8);
00716  071600  2   IF ON$HOST=YES THEN GO TO TSSLOG;/*GOT ON*/
00717  071700  2   IF KEYEDVALUE=STOPHOST THEN RETURN;
00718  071800  2   CALL AUTODIAL(1,,'5576',4);
00719  071900  2   IF ON$HOST=YES THEN GO TO TSSLOG;/*GOT ON*/
00720  072000  2   IF KEYEDVALUE=STOPHOST THEN RETURN;
00721  072100  2   CALL AUTODIAL(1,,'92497373',8);
00722  072200  2   IF ON$HOST=YES THEN GO TO TSSLOG;/*GOT ON*/
00723  072300  2   IF KEYEDVALUE=STOPHOST THEN RETURN;
00724  072400  2   CALL AUTODIAL(1,,'92497710',8);
00725  072500  2   IF ON$HOST=YES THEN GO TO TSSLOG;
00726  072600  2   IF KEYEDVALUE=STOPHOST THEN RETURN;
00727  072700  2   GO TO TRYAGAIN;
00728  072800  2   TSSLOG:
00729  072900  2   CALL STATUS(36,3,1);
00730  073000  2   TSSFLAG=1;
00731  073100  2   CALL SEND$HOST(.CRETURN,1);/*FIRST CARRIAGE RETURN*/
00732  073200  2   TSSFLAG=0;
00733  073300  2   CALL RECEIVE$HOST(.TDSBUF,75,10,11H,5);
00734  073400  2   IF KEYEDVALUE=STOPHOST THEN RETURN;
00735  073500  2   IF TIMEOUT=1 THEN GO TO TRYAGAIN;
00736  073600  2   CALL SEND$HOST(.01H,1);
00737  073700  2   DO I=0 TO 75;
00738  073800  2   TDS$BUF(I)=0FFH;
00739  073900  3   END;
00740  074000  2   CALL SEND$HOST(.03H,1);/*GET CP OR NPS DISCONNECTS*/
00741  074100  2   CALL RECEIVE$HOST(.TDSBUF,75,15,'E',5);/*WAIT FOR IT*/
00742  074200  2   IF KEYEDVALUE=STOPHOST THEN RETURN;
00743  074300  2   IF TIMEOUT=1 THEN GO TO TRYAGAIN;
00744  074400  2   DO J=1 TO 200;/*ALLOW LINE TO SETTLE*/
00745  074500  2   CALL TIME(100);
00746  074600  3   END;
00747  074700  2   CALL STATUS(37,3,1);
00748  074800  2   END TIME$SHARE$CONNECT;
00749  074900  1   /***************************************************/
00750  075000  1   /*                                                 */
00751  075100  1   S I G N   O N   T D S
00752  075200  1   ---------------------
00753  075300  1   CALLING THIS PROCEDURE WILL DO THE HOST PROTOCOL NECESSARY
00754  075400  1   TO BEGIN SENDING AND RECEIVING CHARACTERS. THIS CALLS TDS-SEND
00755  075500  1   AND TDS-RECEIVE PROCEDURES AS NECESSARY. A KEYEDVALUE OF 09H
```

```
00756  1       075600  WILL ALLOW CONTROL TO RETURN BECAUSE THIS IS THE CTRL-STOP HOST
00757  1       075700  KEY.
00758  1       075800  /***************************************************************/
00759  1       075900  SIGN$ON$TDS: PROCEDURE;
00760  2       076000  NOCLOCK=1;
00761  2       076100  BEGIN;
00762  2       076200  CALL TIME$SHARE$CONNECT;

00763  2       076300  IF KEYEDVALUE=STOPHOST THEN GO TO ABORT;
00764  2       076400  KEYEDVALUE=0;
00765  2       076500  LOGON=1;
00766  2       076600  DO I=0 TO 75;/*CHECK FOR NPS SIGN ON*/
00767  2       076700  IF TDS$BUF(I)='M' THEN GO TO SEND$NAME;
00768  3       076800  END;
00769  2       076900  DO I=0 TO 75;
00770  2       077000  TDSBUF(I)=0FFH;
00771  3       077100  END;
00772  2       077200  CALL SEND$HOST(.'01H',1);
00773  2       077300  TIMER=3000;
00774  2       077400  CALL TDS$RECEIVE;
00775  2       077500  IF TIMEOUT=1 THEN GO TO ABORT;
00776  2       077600  DO I=0 TO 75;
00777  2       077700  IF TDS$BUF(I)='M' THEN GO TO SEND$NAME;
00778  3       077800  END;
00779  2       077900  GO TO ABORT;
00780  2       078000  SEND$NAME:
00781  2       078100  IF TESTBASE=1 THEN CALL SEND$HOST(.'PDACTD',6);
00782  2       078200  ELSE CALL SEND$HOST(.'PCOTDS',6);
00783  2       078300  TIMER=3000;
00784  2       078400  CALL SEND$HOST(.CRETURN,1);
00785  2       078500  CALL TDS$RECEIVE;
00786  2       078600  IF TIMEOUT=1 THEN GO TO ABORT;
00787  2       078700  DO I=0 TO 75;
00788  2       078800  IF TDS$BUF(I)='L' THEN GO TO SEND$ID;
00789  3       078900  END;
00790  2       079000  GO TO ABORT;
00791  2       079100  SEND$ID:
00792  2       079200  CALL SEND$HOST(.'103N',4);
00793  2       079300  TIMER=3000;
00794  2       079400  CALL SEND$HOST(.CRETURN,1);
00795  2       079500  CALL TDS$RECEIVE;
00796  2       079600  IF TIMEOUT=1 THEN GO TO ABORT;
00797  2       079700  LOGON=0;
00798  2       079800  DO I=0 TO 75;
00799  2       079900  IF TDS$BUF(I)=2AH THEN DO;
00800  3       080000  LOGON=0;
00801  4       080100  CALL STATUS(0,3,0);
00802  4       080200  RETURN;
00803  4       080300  END;
00804  3       080400  END;
```

```
00805  2  080500          ABORT:
00806  2  080600          DO J=1 TO 300;
00807  2  080700          CALL TIME(100);
00808  3  080800          END;
00809  2  080900          LOGON=0;
00810  2  081000          CALL HANG$UP$HOST;
00811  2  081100          IF KEYEDVALUE=09H THEN RETURN;
00812  2  081200          GO TO BEGIN;
00813  2  081300          END SIGN$ON$TDS;
00814  1  081400          /*****************************************/
00815  1  081500          /***** T D S   P R O T O C O L **********/
00816  1  081600          /*****************************************/
00817  1  081700          PROTOCOL: PROCEDURE;
00818  2  081800          IF KEYEDVALUE=09H THEN DO;
00819  2  081900          DO J=1 TO 300;
00820  3  082000          CALL TIME(100);
00821  4  082100          END;

00822  3  082200          CALL HANG$UP$HOST;
00823  3  082300          GO TO OCR$START;
00824  3  082400          END;
00825  2  082500          IF TIMEOUT=1 THEN DO;
00826  2  082600          CALL STATUS (0,3,0);
00827  3  082700          CALL SIGN$ON$TDS;
00828  3  082800          IF KEYEDVALUE=09H THEN DO;
00829  3  082900          DO J=1 TO 300;
00830  4  083000          CALL TIME(100);
00831  5  083100          END;
00832  4  083200          CALL HANG$UP$HOST;
00833  4  083300          GO TO OCR$START;
00834  4  083400          END;
00835  3  083500          CALL STATUS(16,2,0);
00836  3  083600          GO TO SENDAGAIN;
00837  3  083700          END;
00838  2  083800          END PROTOCOL;
00839  1  083900          /*****************************************/
00840  1  084000          PACK: PROCEDURE;
00841  2  084100          DECLARE (I,J,K) ADDRESS;
00842  2  084200          I=1;
00843  2  084300          J=0;
00844  2  084400          DO K=0 TO 9;
00845  2  084500          COMPACT(K)=(SHL((EXPAND(J)-30H),4))OR((EXPAND(I)-30H)AND 0FH);
00846  3  084600          I=I+2;
00847  3  084700          J=J+2;
00848  3  084800          END;
00849  2  084900          END PACK;
00850  1  085000          /*****************************************/
00851  1  085100          UNPACK: PROCEDURE;
00852  2  085200          DECLARE (I,J,K) ADDRESS;
00853  2  085300          I=0; J=1;
```

```
085400  2     DO K=0 TO 8;
085500  2       EXPAND(J)=(COMPACT(K) AND 0FH)+30H;
085600  3       EXPAND(I)=SHR(COMPACT(K),-1)+30H;
085700  3       I=I+2;  J=J+2;
085800  3     END;
085900  2   END UNPACK;
086000  1   /**********************************************************/
086100  1   FILE$TO$CRT: PROCEDURE(CRTLN);
086200  2     DECLARE CRTLN BYTE;
086300  2     DECLARE (J,K) BYTE;
086400  2     DO J=0 TO 4;
086500  2       COMPACT(J)=STORAGE(FLPNTR);
086600  3       FLPNTR=FLPNTR+1;
086700  3     END;
086800  2     CALL UNPACK;
086900  2     DO J=10 TO 17;
087000  2       EXPAND(J)=STORAGE(FLPNTR);
087100  3       FLPNTR=FLPNTR+1;
087200  3     END;
087300  2     CALL DISPLAY(.EXPAND(10),5,CRTLN,0);
087400  2     IF EXPAND(6)='8' THEN DO;
087500  2       CALL DISPLAY('58',2,CRTLN,7);
087600  3       CALL DISPLAY(.EXPAND(0),6,CRTLN,9);
087700  3       CALL DISPLAY('-',1,CRTLN,15);
087800  3       CALL DISPLAY(.EXPAND(7),3,CRTLN,16);
087900  3       GO TO REV;
088000  3     END;
088100  2     CALL DISPLAY('43',2,CRTLN,7);
088200  2     IF EXPAND(6)='5' THEN CALL DISPLAY('C',1,CRTLN,9);
088300  2     IF EXPAND(6)='6' THEN CALL DISPLAY('D',1,CRTLN,9);
088400  2     IF EXPAND(6)='7' THEN CALL DISPLAY('X',1,CRTLN,9);
088500  2     CALL DISPLAY(.EXPAND(0),6,CRTLN,10);
088600  2     CALL DISPLAY('G',1,CRTLN,16);
088700  2     CALL DISPLAY(.EXPAND(7),1,CRTLN,17);
088800  2     IF EXPAND(8)=3BH THEN EXPAND(8)=20H;
088900  2     CALL DISPLAY(.EXPAND(8),1,CRTLN,16);
089000  2   REV:
089100  2     K=20;
089200  2     DO J=15 TO 17;
089300  2       IF EXPAND(J) > 5AH THEN DO;/*DOUBLE DIGIT REV*/
089400  3         CALL DISPLAY('A',1,CRTLN,K);
089500  4         EXPAND(J)=EXPAND(J)-26;/*SHIFT BACK INTO ALPHABET*/
089600  4         K=K+1;
089700  3       END;
089800  3       CALL DISPLAY(.EXPAND(J),1,CRTLN,K);
089900  3       K=K+2;
090000  3     END;
090100  2   END FILE$TO$CRT;
090200  1   /**********************************************************/
```

```
00903  090300  1   DISPLAY$FILE$DOWN: PROCEDURE;
00904  090400  2     DO J=4 TO 22;
00905  090500  2       CALL FILE$TO$CRT(J);
00906  090600  3     IF FLPNTR > (TABLETOP-1) THEN FLPNTR=FLPNTR-TABLETOP;
00907  090700  3   END;
00908  090800  2   FLPNTR=FLPNTR-(19*13); /*RETURN POINTER TO TOP*/
00909  090900  2   IF FLPNTR > 60000 THEN FLPNTR=FLPNTR+TABLETOP;
00910  091000  2   END DISPLAY$FILE$DOWN;
00911  091100  1   /*****************************************************/
00912  091200  1   DISPLAY$FILE$UP: PROCEDURE;
00913  091300  2   FLPNTR=FLPNTR+(19*13);
00914  091400  2   IF FLPNTR > (TABLETOP-1) THEN FLPNTR=FLPNTR-TABLETOP;
00915  091500  2   K=22;
00916  091600  2     DO J=4 TO 22;
00917  091700  2       CALL FILE$TO$CRT(K);
00918  091800  3     FLPNTR=FLPNTR-26;
00919  091900  3     IF FLPNTR > 60000 THEN FLPNTR=FLPNTR+TABLETOP;
00920  092000  3     K=K-1;
00921  092100  3   END;
00922  092200  2   FLPNTR=FLPNTR+13; /*RETURN PTR TO TOP*/
00923  092300  2   IF FLPNTR > 60000 THEN FLPNTR=FLPNTR+TABLETOP;
00924  092400  2   END DISPLAY$FILE$UP;
00925  092500  1   /*****************************************************/
00926  092600  1   FORM$SET: PROCEDURE(QTY,DIR);
00927  092700  2   DECLARE (QTY,DIR)BYTE;
00928  092800  2     DO WHILE (INPUT(0C4H) AND 11H) <> 11H; /*WAIT*/
00929  092900  2   END;
00930  093000  2   OUTPUT(0C8H)=QTY;
00931  093100  2   OUTPUT(0C9H)=DIR;
00932  093200  2   OUTPUT(0CBH)=07H; /*STROBE*/
00933  093300  2   OUTPUT(0CBH)=06H;
00934  093400  2   END FORM$SET;
00935  093500  1   /*****************************************************/
00936  093600  1   LINE$UP: PROCEDURE;
00937  093700  2   IF PAPERSET=1 THEN DC; /*MOVE PAPER NOT SCREEN*/
00938  093800  2   CALL FORM$SET(2,0);
00939  093900  3   RETURN;
00940  094000  3   END;
00941  094100  2   CALL DISPLAY$FILE$UP;
00942  094200  2   END LINE$UP;
00943  094300  1   /*****************************************************/
00944  094400  1   LINE$DOWN: PROCEDURE;
00945  094500  2   IF PAPERSET=1 THEN DC; /*MOVE PAPER NOT SCREEN*/
00946  094600  2   CALL FORM$SET(2,4);
00947  094700  3   RETURN;
00948  094800  3   END;
00949  094900  2   FLPNTR=FLPNTR-13;
00950  095000  2   IF FLPNTR>60000 THEN FLPNTR=FLPNTR+TABLETOP; /*NEG CHK*/
00951  095100  2   CALL DISPLAY$FILE$DOWN;
00952  095200  2   END LINE$DOWN;
```

```
095300  /*********************************************************/
095400  PAGE$UP: PROCEDURE;
095500    IF PAPER$SET=1 THEN DO;/*PAPER NOT SCREEN*/
095600      CALL FORM$SET(72,0);
095700      RETURN;
095800    END;
095900    FLPNTR=FLPNTR+(13*18);
096000    CALL DISPLAY$FILE$UP;
096100  END PAGE$UP;
096200  /*********************************************************/
096300  PAGE$DOWN: PROCEDURE;
096400    IF PAPER$SET=1 THEN RETURN;/*PAPER NOT SCREEN*/
096500    FLPNTR=FLPNTR-(13*19);
096600    IF FLPNTR>60000 THEN FLPNTR=FLPNTR+TABLETOP;
096700    CALL DISPLAY$FILE$DOWN;
096800  END PAGE$DOWN;
096900  /*********************************************************/
097000  /* D O W N L O A D
097100  -----------------
097200     THIS PROCEDURE DOWNLOADS THE DUPLICATE FILE ON THE
097300     HOST IN CASE OF POWER FAILURE. EACH CALL-UP OF TPR
097400     PC1011 AND A NEXT DIRECT ADDRESS RETURNS WITH 20
097500     RECORDS, EACH LAYED OUT AS FOLLOWS:
097600       6N - BASE DWRAWING IDENT
097700       1N - PREFIX CODE:
097800               5 IS 43C
097900               6 IS 43D
098000               7 IS 43X
098100               8 IS 58
098200       3N - TAB OR GROUP
098300       5AN- MNEMONIC
098400       3AN- B/WL/IC REVISIONS
098500       1AN- PLANNERS CODE
098600     THESE ARE THEN PACKED SUCH THAT THE 10 DWG ID NUMERICS
098700     ARE COMPRESSED INTO 5 BYTES*/
098800  /*********************************************************/
098900  DOWNLOAD: PROCEDURE;
099000    CALL CLEAR$SCREEN;
099100    BEGIN:
099200    KEYLOCK=1;
099300    MESLIN=10;
099400    CALL MESSAGE$25;
099500    VALID,TDS,D,E,FILELOAD=0;
099600    B,C=0;
099700    CALL SIGN$ON$TDS;
099800    IF KEYED$VALUE=09H THEN DO;
099900      FILELOAD=0;
100000      RETURN;
100100    END;
```

```
01002  2  100200         MESLIN=2; CALL CLEAR,INSTR;
01003  2  100300         CALL STATUS(17,5,0);
01004  2  100400         CALL STATUS(16,6,0);
01005  2  100500         CALL DISPLAY(.'COME BACK IN 15 MIN',19,14,60);
01006  2  100600         DO J=(STORAGELIMIT-400) TO (STORAGELIMIT-1);
01007  2  100700         STORAGE(J)='0';
01008  3  100800         END;
01009  2  100900         K=0;
01010  2  101000    SENDNEXT:
01011  2  101100         FILELOAD=1;
01012  2  101200         CALL SEND$HOST(.'PC1C11',6);
01013  2  101300         CALL SEND$HOST(.STORAGE((STORAGELIMIT-395)),10);
01014  2  101400         I=STORAGELIMIT-395;
01015  2  101500         DO J=0 TO 9;/*SAVE DIRECT ADDRESS*/
01016  2  101600         BSTAT(J)=STORAGE(I);
01017  2  101700         I=I+1;
01018  3  101800         END;
01019  2  101900         TIMER=9000;
01020  2  102000         CALL SEND$HOST(.ODH,1);
01021  2  102100         CALL TDS$RECEIVE;
01022  2  102200         IF TIMEOUT=1 THEN GO TO BEGIN;
01023  2  102300         IF FILELOAD <> 9 THEN DO;/*DROPPED CHARACTERS*/
01024  2  102400         IF (VALID:=VALID+1)=10 THEN GO TO BEGIN;
01025  2  102500         I=STORAGELIMIT-395;
01026  3  102600         DO J=0 TO 9;/*GET SAVED DIRECT ADDRESS*/
01027  3  102700         STORAGE(I)=BSTAT(J);
01028  4  102800         I=I+1;
01029  4  102900         END;
01030  3  103000         GO TO SENDNEXT;
01031  3  103100         END;
01032  2  103200         VALID=0;
01033  2  103300         C=(STORAGELIMIT-385);
01034  2  103400         CALL DISPLAY(.STORAGE(STORAGELIMIT-395),10,10,0);
01035  2  103500         CALL DISPLAY(.STORAGE(STORAGELIMIT-385),6,10,20);
01036  2  103600         DO L=1 TO 20;
01037  2  103700         DO J=0 TO 9;
01038  3  103800         EXPAND(J)=STORAGE(C);
01039  4  103900         IF STORAGE(C)=20H THEN EXPAND(J)=0BBH;
01040  4  104000         C=C+1;
01041  4  104100         END;
01042  3  104200         CALL PACK;
01043  3  104300         DO J=0 TO 4;
01044  3  104400         STORAGE(B)=COMPACT(J);
01045  4  104500         B=B+1;
01046  4  104600         END;
01047  3  104700         DO J=1 TO 8;
01048  3  104800         STORAGE(B)=STORAGE(C);
01049  4  104900         B=B+1;
01050  4  105000         C=C+1;
```

```
01051  4  105100           END;
01052  3  105200           C=C+1; /*DROP UNUSED PLANNER CODE*/
01053  3  105300           IF STORAGE((STORAGELIMIT-396))=2AH THEN IF STORAGE(C)=0DH THEN DO;
01054  3  105400             FREE,TABLETOP=B;
01055  4  105500             GO TO LAST$ONE;
01056  4  105600           END;
01057  3  105700           END;

01058  2  105800           IF STORAGE((STORAGELIMIT-396))=2AH THEN FREE,TABLETOP=B;
01059  2  105900           IF STORAGE((STORAGELIMIT-396))='0' THEN GO TO SEND$NEXT;
01060  2  106000           IF STORAGE((STORAGELIMIT-396))<> 2AH THEN GO TO BEGIN;
01061  2  106100           LAST$ONE:
01062  2  106200           NEWFILE=0;
01063  2  106300           DO J=1 TO 500;
01064  2  106400           CALL TIME(100);
01065  3  106500           END;
01066  2  106600           CALL HANG$UP$HOST;
01067  2  106700           FILELOAD=0;
01068  2  106800           FLPNTR=0;
01069  2  106900           END DOWNLOAD;
01070  1  107000           /************************************************/
01071  1  107100           INITIALIZE$SCREEN: PROCEDURE;
01072  2  107200           CALL CLEAR$SCREEN;
01073  2  107300           CALL DISPLAY (.2FH,1,0,0);
01074  2  107400           DO J=0 TO 8;
01075  2  107500           WANDCHAR(J)=27H;/*FILL APOST BUFF*/
01076  3  107600           END;
01077  2  107700           CALL DISPLAY (.WANDCHAR,2,0,1);
01078  2  107800           CALL DISPLAY ('. REVISION STATUS FILE ',22,0,3);
01079  2  107900           CALL DISPLAY (.WANDCHAR,3,0,25);
01080  2  108000           CALL DISPLAY (.5CH,1,0,28);
01081  2  108100           CALL DISPLAY ('-',1,0,29);
01082  2  108200           CALL DISPLAY (.2FH,1,0,30);
01083  2  108300           CALL DISPLAY (.WANDCHAR,8,0,31);
01084  2  108400           CALL DISPLAY (' INSTRUCTIONS ',14,0,40);
01085  2  108500           CALL DISPLAY (.WANDCHAR,8,0,54);
01086  2  108600           CALL DISPLAY (.5CH,1,0,61);
01087  2  108700           CALL DISPLAY (' ',1,0,62);
01088  2  108800           CALL DISPLAY (.2FH,1,0,63);
01089  2  108900           CALL DISPLAY (.WANDCHAR,3,0,64);
01090  2  109000           CALL DISPLAY (' STATUS ',8,0,67);
01091  2  109100           CALL DISPLAY (.WANDCHAR,4,0,75);
01092  2  109200           CALL DISPLAY (.5CH,1,0,79);
01093  2  109300           DO J=0 TO 35;
01094  2  109400           WANDCHAR(J)=22H;/*LOAD QUOTE BUFF*/
01095  3  109500           END;
01096  2  109600           CALL DISPLAY(.WANDCHAR,29,1,0);
01097  2  109700           CALL DISPLAY(.WANDCHAR,32,1,30);
01098  2  109800           CALL DISPLAY(.WANDCHAR,17,1,63);
```

```
01099  2  109900              DO A=1 TO 23;
01100  2  110000              CALL DISPLAY(.21H,1,A,29);
01101  3  110100              CALL DISPLAY(.21H,1,A,62);
01102  2  110200              END;
01103  2  110300              B=3;
01104  2  110400              DO A=1 TO 10;
01105  2  110500              DO J=63 TO 79;
01106  3  110600              CALL DISPLAY(.3AH,1,B,J);
01107  4  110700              END;
01108  3  110800              B=B+2;
01109  3  110900              END;
01110  2  111000              CALL DISPLAY  (.'MNEM       BOARD          BD WL IC',23,2,0);
01111  2  111100              CALL DISPLAY  (.WANDCHAR, 5, 3, 0);
01112  2  111200              CALL DISPLAY  (.WANDCHAR,12, 3, 7);
01113  2  111300              CALL DISPLAY  (.WANDCHAR, 1, 3,21);
01114  2  111400              CALL DISPLAY  (.WANDCHAR, 1, 3,24);
01115  2  111500              CALL DISPLAY  (.WANDCHAR, 1, 3,27);
01116  2  111600              DO J=0 TO 35;
01117  2  111700              WANDCHAR(J)=2EH;/*LOAD DOT BUFF*/
01118  3  111800              END;
01119  2  111900              CALL DISPLAY(.WANDCHAR,29,23, 0);
01120  2  112000              CALL DISPLAY(.WANDCHAR,32,23,30);
01121  2  112100              CALL DISPLAY(.WANDCHAR,17,23,63);
01122  2  112200              END INITIALIZE$SCREEN;
01123  2  112300  /*********************************************************/
01124  1  112400              DISPLAY$SERIAL: PROCEDURE;
01125  2  112500              SERIAL$DISP(0)='P';
01126  2  112600              SERIALDISP(1)=CLOCKDISP2(3);
01127  2  112700              SERIALDISP(2)=CLOCKDISP2(8);
01128  2  112800              SERIALDISP(3)=CLOCKDISP2(9);
01129  2  112900              K=1000;
01130  2  113000              DO J=4 TO 7;
01131  2  113100              SERIALDISP(J)=SERIAL/K MOD 10 +30H;
01132  3  113200              K=K/10;
01133  3  113300              END;
01134  2  113400              CALL DISPLAY(.'SERIAL-',7,22,64);
01135  2  113500              CALL DISPLAY(.SERIALDISP,8,22,71);
01136  2  113600              END DISPLAY$SERIAL;
01137  2  113700  /*********************************************************/
01138  1  113800              DISPLAY$CI1$SERIAL: PROCEDURE;
01139  2  113900              SERIAL$DISP(0)='C';
01140  2  114000              SERIALDISP(1)=CLOCKDISP2(3);
01141  2  114100              SERIALDISP(2)=CLOCKDISP2(8);
01142  2  114200              SERIALDISP(3)=CLOCKDISP2(9);
01143  2  114300              K=1000;
01144  2  114400              DO J=4 TO 7;
01145  2  114500              SERIALDISP(J)=CI1$SERIAL/K MOD 10 +30H;
01146  3  114600              K=K/10;
01147  3  114700              END;
```

```
01148  2  114800              CALL DISPLAY(.'CII NO-',7,20,64);
01149  2  114900              CALL DISPLAY(.SERIALDISP,8,20,71);
01150  2  115000              END DISPLAY$CII$SERIAL;
01151  1  115100  /***************************************************/
01152  1  115200  DISPLAY$CLOCK: PROCEDURE;
01153  2  115300      DISABLE;
01154  2  115400      HOURDISP=HOUR;
01155  2  115500      CLOCKDISP1(13)='A';
01156  2  115600      IF HOUR > 11 THEN CLOCKDISP1(13)='P';
01157  2  115700      IF HOUR > 12 THEN HOURDISP=HOUR-12;
01158  2  115800      IF HOUR=0 THEN HOURDISP=12;
01159  2  115900      CLOCKDISP1(6)=HOURDISP/10 MOD 10 + 30H;
01160  2  116000      CLOCKDISP1(7)=HOURDISP MOD 10 + 30H;
01161  2  116100      CLOCKDISP1(9)=MINUTE/10 MOD 10 + 30H;
01162  2  116200      CLOCKDISP1(10)=MINUTE MOD 10 + 30H;
01163  2  116300      CALL DISPLAY(.CLOCKDISP1,15,16,64);
01164  2  116400      CLOCKDISP2(2)=YEAR/10 MOD 10 + 30H;
01165  2  116500      CLOCKDISP2(3)=YEAR MOD 10 + 30H;
01166  2  116600      CLOCKDISP2(8)=WEEK/10 MOD 10 + 30H;
01167  2  116700      CLOCKDISP2(9)=WEEK MOD 10 + 30H;
01168  2  116800      CLOCKDISP2(15)=DAY+ 30H;
01169  2  116900      CALL DISPLAY(.CLOCKDISP2,16,18,64);
01170  2  117000      ENABLE;
01171  2  117100  END DISPLAY$CLOCK;
01172  1  117200  /***************************************************/
01173  1  117300  DECLARE CLOCKINTR DATA('');
01174  1  117400  CLKINRT: PROCEDURE;
01175  2  117500      CALL PUSH;
01176  2  117600      OUTPUT(0C7H)=0DH;
01177  2  117700      OUTPUT(0C7H)=0CH;/*TOGGLE CLOCK RESET*/
01178  2  117800      MINUTE=MINUTE+1;
01179  2  117900      IF MINUTE=60 THEN DO;
01180  2  118000          HOUR=HOUR+1;
01181  2  118100          MINUTE=0;
01182  3  118200      END;
01183  2  118300      IF HOUR=24 THEN DO;
01184  2  118400          DAY=DAY+1;
01185  3  118500          HOUR=0;
01186  3  118600      END;
01187  2  118700      IF DAY=8 THEN DO;
01188  2  118800          WEEK=WEEK+1;
01189  3  118900          DAY=1;
01190  3  119000          SERIALSAVE,SERIAL=1;
01191  3  119100          CII$SERIALSAVE,CII$SERIAL=1;
01192  3  119200          CALL DISPLAY$SERIAL;
01193  3  119300      END;
01194  2  119400      IF WEEK=53 THEN DO;
01195  2  119500          YEAR=YEAR+1;
01196  3  119600          WEEK=1;
```

```
01197  3  119700  END;
01198  2  119800  IF DAY < 6 THEN IF HOUR = 0 THEN IF MINUTE = 1 THEN NEWFILE=1;
01199  2  119900  IF NOCLOCK=0 THEN CALL DISPLAY$CLOCK;
01200  2  120000  IF TSSFLAG=0 THEN GO TO SKIPTSS;/*NOT LOGGING ON*/
01201  2  120100  IF (TSSFLAG:=TSSFLAG+1)=3 THEN DO;/*HUNG UP LOG ON*/
01202  3  120200  TSSFLAG=0;
01203  3  120300  OUTPUT(OCH)=00H;
01204  3  120400  CALL POP;
01205  3  120500  ENABLE;
01206  3  120600  GO TO OCR$START;
01207  3  120700  END;
01208  2  120800  SKIPTSS:
01209  2  120900  OUTPUT(OCH)=00H;
01210  2  121000  CALL POP;
01211  2  121100  ENABLE;
01212  2  121200  END CLKINRT;
01213  1  121300  INTADDPTR(11)=.CLOCKINTR;
01214  1  121400  /*******************************************************/
01215  1  121500  SETCLOCK: PROCEDURE;
01216  2  121600  RESETCLOCK:
01217  2  121700  OUTPUT (0C7H)=09H;
01218  2  121800  OUTPUT (0C7H)=0AH;
01219  2  121900  MESLIN=2;
01220  2  122000  CALL CLEAR$INSTR;
01221  2  122100  CALL DISPLAY(.'KEY 2 DIGIT - HR, MIN, WK',25,10,34);
01222  2  122200  CALL DISPLAY(.'1 DIGIT - DAY',13,11,38);
01223  2  122300  CALL DISPLAY(.'2 DIGIT - YEAR',14,12,38);
01224  2  122400  DO J=0 TO 8;
01225  2  122500  KEYEDVALUE=0;
01226  3  122600  DO WHILE KEYEDVALUE=0;
01227  3  122700  END;
01228  3  122800  WANDCHAR(J)=KEYEDVALUE;
01229  3  122900  END;
01230  2  123000  HOUR=(WANDCHAR(0)-30H)*10 + (WANDCHAR(1)-30H);
01231  2  123100  MINUTE=(WANDCHAR(2)-30H)*10 + (WANDCHAR(3)-30H);
01232  2  123200  WEEK=(WANDCHAR(4)-30H)*10 + (WANDCHAR(5)-30H);
01233  2  123300  DAY=(WANDCHAR(6)-30H);
01234  2  123400  YEAR=(WANDCHAR(7) - 30H)*10 + (WANDCHAR(8)-30H);
01235  2  123500  OUTPUT (0C7H)=09H;  /*START CLOCK*/
01236  2  123600  OUTPUT (0C7H)=0BH;
01237  2  123700  CALL DISPLAY$CLOCK;
01238  2  123800  END SETCLOCK;
01239  1  123900  /*******************************************************/
01240  1  124000  SET$SERIAL: PROCEDURE;
01241  2  124100  MESLIN=2;
01242  2  124200  CALL CLEAR$INSTR;
01243  2  124300  CALL DISPLAY(.'KEY - 0001 TO 9999',18,10,34);
01244  2  124400  CALL DISPLAY(.'NEXT PHOENIX SERIAL',19,13,34);
```

```
01245  2  124500            SERIAL=0;
01246  2  124600            K=1000;
01247  2  124700            DO J=1 TO 4;
01248  2  124800        SR: KEYEDVALUE=0;
01249  3  124900            ENABLE;
01250  3  125000            DO WHILE KEYEDVALUE=0;
01251  3  125100            END;
01252  3  125200            DISABLE;
01253  3  125300            IF KEYEDVALUE > 39H THEN GO TO SR;
01254  3  125400            IF KEYEDVALUE < 30H THEN GO TO SR;
01255  3  125500            SERIAL=SERIAL + (KEYEDVALUE-30H)*K;
01256  3  125600            K=K/10;
01257  3  125700            END;
01258  3  125800            ENABLE;
01259  2  125900            CALL DISPLAY$SERIAL;
01260  2  126000            SERIALSAVE=SERIAL;
01261  2  126100            END SET$SERIAL;
01262  2  126200            /**********************************************/
01263  1  126300            SET$CII$SERIAL: PROCEDURE;
01264  1  126400            MESL'N=2;
01265  2  126500            CALL CLEAR$INSTR;
01266  2  126600            CALL DISPLY(.'KEY - 0001 TO 9999',18,10,34);
01267  2  126700            CALL DISPLAY (.'TO SET NEXT CII LABEL',21,13,34);
01268  2  126800            CII$SERIAL=0;
01269  2  126900            K=1000;
01270  2  127000            DO J=1 TO 4;
01271  2  127100        SR: KEYEDVALUE=0;
01272  3  127200            ENABLE;
01273  3  127300            DO WHILE KEYEDVALUE=0;
01274  3  127400            END;
01275  3  127500            DISABLE;
01276  3  127600            IF KEYEDVALUE > 39H THEN GO TO SR;
01277  3  127700            IF KEYEDVALUE < 30H THEN GO TO SR;
01278  3  127800            CII$SERIAL=CII$SERIAL + (KEYEDVALUE-30H)*K;
01279  3  127900            K=K/10;
01280  3  128000            END;
01281  3  128100            ENABLE;
01282  2  128200            CALL DISPLAY$CII$SERIAL;
01283  2  128300            CII$SERIALSAVE=CII$SERIAL;
01284  2  128400            END SET$CII$SERIAL;
01285  2  128500            /**********************************************/
01286  2  128600            FILE$UPDATE: PROCEDURE;
01287  1  128700            TDS=1; /*USE 13 CHAR ACKNOL*/
01288  1  128800            START$AGAIN:
01289  2  128900            CALL STATUS(1,1,0);
01290  2  129000            CALL STATUS(22,2,0);
01291  2  129100            MESLIN=2, CALL CLEAR$INSTR;
```

```
01294  2  129400         CALL MESSAGE$,25;
01295  2  129500         KEYEDVALUE=00;
01296  2  129600         CALL SIGN$ON$TDS;
01297  2  129700         IF KEYEDVALUE=09H THEN RETURN;
01298  2  129800         MESLIN=2; CALL CLEAR$INSTR;
01299  2  129900         CALL STATUS(0,3,0);
01300  2  130000         UPDATE$FILE:
01301  2  130100         CALL DISPLAY(.'KEY A-ADD OR D-DELETE',21,2,35);
01302  2  130200         DO J=4 TO 22;
01303  2  130300         CALL DISPLAY(.'                              ',27,J,35);
01304  3  130400         END;
01305  2  130500         CALL DISPLAY(.'KEY RE-START TO ABORT',21,22,35);
01306  2  130600         KEYEDVALUE=00H;
01307  2  130700         KEYINDATA=0;
01308  2  130800         DO WHILE KEYEDVALUE=00H;
01309  3  130900         END;
01310  2  131000         CALL STATUS(0,3,0);
01311  2  131100         CALL DISPLAY (.'KEY DATA INTO # FIELDS',23,5,35);
01312  2  131200         CALL DISPLAY(.'USE SPACES WHERE NECESSARY',26,6,35);
01313  2  131300         CALL DISPLAY(.'CODED DWG - *********',22,8,35);
01314  2  131400         CALL DISPLAY(.'43C-5 D-6 X-7 58-8',18,18,35);
01315  2  131500         IF KEYEDVALUE ='D' THEN GO TO DELETE;
01316  2  131600         CALL DISPLAY(.'MNEMONIC - *****',16,10,35);
01317  2  131700         CALL DISPLAY(.'STATUS - ***',12,12,35);
01318  2  131800         IF KEYEDVALUE <>'A' THEN GO TO UPDATE$FILE;
01319  2  131900         KEYINDATA=1;/*NO SCROLL*/
01320  2  132000         KEYEDVALUE=00H;
01321  2  132100         K=47;
01322  2  132200         EXPAND(6)=0;
01323  2  132300         DO J=0 TO 9;
01324  2  132400         IF J=9 THEN IF EXPAND(6)<>'8' THEN DO;
01325  3  132500         EXPAND(9)=0BBH;
01326  4  132600         GO TO SKIP;
01327  4  132700         END;
01328  3  132800         CALL WINKER(1,8,K,1);
01329  3  132900         KEYEDVALUE=00H;
01330  3  133000         DO WHILE KEYEDVALUE =00H;
01331  3  133100         END;
01332  3  133200         IF J=6 THEN IF KEYEDVALUE<>'8' THEN CALL DISPLAY(.' ',1,8,56);
01333  3  133300         CALL DISPLAY(.KEYEDVALUE,1,8,K);
01334  4  133400         GO TO UPDATE$FILE;
01335  4  133500         END;
01336  3  133600         IF J=6 THEN IF KEYEDVALUE>'8' THEN CALL DISPLAY(.' ',1,8,56);
01337  3  133700         CALL DISPLAY(.KEYEDVALUE,1,8,K);
01338  3  133800         IF (KEYEDVALUE<30H) OR (KEYEDVALUE>39H) THEN DO;
01339  3  133900         IF J > 7 THEN IF KEYEDVALUE=20H THEN GO TO E1;
01340  4  134000         CALL STATUS(7,3,1);
01341  4  134100         GO TO UPDATE$FILE;
01342  4  134200         E1:
```

```
01343  4  134300      END;
01344  3  134400      EXPAND(J)=KEYEDVALUE;
01345  3  134500      IF EXPAND(J)=20H THEN; EXPAND(J)=0B6H;
01346  3  134600      CALL WINKER(1,8,K,2);
01347  3  134700      K=K+1;
01348  3  134800   SKIP:
01349  3  134900      END;
01350  2  135000      CALL PACK;
01351  2  135100      K=46;
01352  2  135200      DO J=5 TO 9;
01353  2  135300      CALL WINKER(1,10,K,1);
01354  3  135400      KEYEDVALUE=0;
01355  3  135500      DO WHILE KEYEDVALUE=0;
01356  3  135600      END;
01357  3  135700      COMPACT(J)=KEYEDVALUE;
01358  3  135800      CALL DISPLAY(,KEYEDVALUE,1,10,K);
01359  3  135900      CALL WINKER(1,10,?);
01360  3  136000      K=K+1;
01361  3  136100      END;
01362  2  136200      K=44;
01363  2  136300      DO J=10 TO 12;
01364  3  136400      CALL WINKER(1,12,K,1);
01365  3  136500   KEYSTAT:
01366  3  136600      KEYEDVALUE=0;
01367  3  136700      DO WHILE KEYEDVALUE=0;
01368  3  136800      END;
01369  3  136900      IF (KEYEDVALUE < 'A') OR (KEYEDVALUE > 'Z') THEN GO TO KEYSTAT;
01370  3  137000   SKIPPLANCK:
01371  3  137100      COMPACT(J)=KEYEDVALUE;
01372  3  137200      CALL DISPLAY(,KEYEDVALUE,1,12,K);
01373  3  137300      CALL WINKER(1,12,K,2);
01374  3  137400      K=K+1;
01375  3  137500      END;
01376  2  137600      CALL STATUS(16,3,0);
01377  2  137700      CALL SEND$HOST(,'PC101300000000000',16);
01378  2  137800      DO J=0 TO 9;
01379  2  137900      IF EXPAND(J)=0B6H THEN CALL SEND$HOST(,' ',1);
01380  2  138000      ELSE CALL SEND$HOST(,EXPAND(J),1);
01381  3  138100      END;
01382  2  138200      DO J=5 TO 12;
01383  2  138300      CALL SEND$HOST(,COMPACT(J),1);
01384  3  138400      END;
01385  2  138500      CALL SEND$HOST(,20H,1);
01386  2  138600      TIMER=9000;
01387  2  138700      CALL SEND$HOST(,0DH,1);
01388  2  138800      CALL TDS$RECEIVE;
01389  2  138900      IF TIMEOUT=1 THEN GO TO START$AGAIN;
01390  2  139000      IF TDSBUF(1)='0' THEN GO TO DCRT1;
01391  2  139100      IF TDSBUF(1)='6' THEN GO TO DCRT1;
```

```
01392  2  139200  CALL STATUS(5,3,0);
01393  2  139300  CALL TIME(250);
01394  2  139400  GO TO UPDATE$FILE;
01395  2  139500  DCRT1:
01396  2  139600  CALL STATUS(6,3,0);
01397  2  139700  B,J=0;
01398  2  139800  NEXTCHAR1:
01399  2  139900  IF COMPACT(J) > STORAGE(B) THEN GO TO NEXT$REC1;
01400  2  140000  IF COMPACT(J) < STORAGE(B) THEN DO;
01401  2  140100  B=B-J;
01402  2  140200  C=TABLE$TOP;
01403  2  140300  SWITCH1:
01404  3  140400  IF C=B THEN GO TO STORE1;
01405  3  140500  C=C-1;
01406  3  140600  STORAGE(C+13)=STORAGE(C);
01407  3  140700  GO TO SWITCH1;
01408  3  140800  STORE1:
01409  3  140900  FREE,STORAGETOP,TABLE$TOP=TABLE$TOP+13;
01410  3  141000  DO J=0 TO 12;
01411  3  141100  STORAGE(B)=COMPACT(J);
01412  4  141200  B=B+1;
01413  4  141300  END;
01414  3  141400  CALL STATUS(25,3,1);
01415  3  141500  GO TO UPDATE$FILE;
01416  3  141600  END;
01417  2  141700  IF J=4 THEN DO;
01418  3  141800  CALL STATUS(27,3,1);
01419  3  141900  GO TO UPDATE$FILE;
01420  3  142000  END;
01421  2  142100  J=J+1;
01422  2  142200  B=B+1;
01423  2  142300  GO TO NEXT$CHAR1;
01424  2  142400  NEXT$REC1:
01425  2  142500  B=B+13-J;
01426  2  142600  J=0;
01427  2  142700  GO TO NEXT$CHAR1;
01428  2  142800  DELETE:
01429  2  142900  K=47;
01430  2  143000  DO J=0 TO 9;
01431  3  143100  CALL WINKER(1,8,K,1);
01432  3  143200  KEYEDVALUE=0;
01433  3  143300  DO WHILE KEYEDVALUE=0;
01434  3  143400  END;
01435  3  143500  EXPAND(J)=KEYEDVALUE;
01436  3  143600  IF EXPAND(J)=20H THEN EXPAND(J)=0BBH;
01437  3  143700  CALL DISPLAY(.KEYEDVALUE,1,8,K);
01438  3  143800  CALL WINKER(1,8,K,2);
01439  3  143900  K=K+1;
01440  3  144000  END;
```

```
01441  2  144100    CALL STATUS(16,3,0);
01442  2  144200    CALL SEND$HOST(.'PC10120000000000',16);
01443  2  144300    DO J=0 TO 9;
01444  2  144400    IF EXPAND(J)=0BBH THEN CALL SEND$HOST(.' ',1);
01445  3  144500    ELSE CALL SEND$HOST(.EXPAND(J),1);
01446  3  144600    END;
01447  2  144700    TIMER=9000;
01448  2  144800    CALL SEND$HOST(.ODH,1);
01449  2  144900    CALL TDS$RECEIVE;
01450  2  145000    IF TIMEOUT=1 THEN GO TO START$AGAIN;
01451  2  145100    IF TDSBUF(1)='0' THEN GO TO DCRT2;
01452  2  145200    IF TDSBUF(1)='5' THEN GO TO DCRT2;
01453  2  145300    CALL STATUS(5,3,0);
01454  2  145400    CALL TIME(250);
01455  2  145500    GO TO UPDATE$FILE;
01456  2  145600    DCRT2:
01457  2  145700    CALL STATUS(6,3,0);
01458  2  145800    CALL PACK;
01459  2  145900    B,J=0;
01460  2  146000    NEXT$CHAR2:
01461  2  146100    IF COMPACT(J) > STORAGE(B) THEN GO TO NEXT$REC2;
01462  2  146200    IF COMPACT(J) < STORAGE(B) THEN DO;/*NO REC FOUND*/
01463  2  146300    CALL STATUS(7,3,1);
01464  3  146400    GO TO UPDATE$FILE;
01465  3  146500    END;
01466  3  146600    IF J=4 THEN DO;
01467  2  146700    C=B-J;
01468  3  146800    SWITCH2:
01469  3  146900    IF C=TABLE$TOP THEN DO;
01470  3  147000    FREE,STORAGETOP,TABLE$TOP=TABLE$TOP-13;
01471  4  147100    CALL STATUS(25,3,1);
01472  4  147200    GO TO UPDATE$FILE;
01473  4  147300    END;
01474  3  147400    STORAGE(C)=STORAGE(C+13);
01475  3  147500    C=C+1;
01476  3  147600    GO TO SWITCH2;
01477  3  147700    END;
01478  3  147800    B=B+1;
01479  2  147900    J=J+1;
01480  2  148000    GO TO NEXT$CHAR2;
01481  2  148100    NEXT$REC2:
01482  2  148200    B=B+13-J;
01483  2  148300    J=0;
01484  2  148400    IF B=TABLE$TOP THEN DO;
01485  2  148500    CALL STATUS(25,3,1);
01486  2  148600    GO TO UPDATE$FILE;
01487  3  148700    END;
01488  2  148800    GO TO NEXT$CHAR2;
01489  2  148900    KEYINDATA=0;
```

```
149000  2    END FILE$UPDATE;
149100  1    /*****************************************************/
149200  2    CHECK$76$NUMERICS: PROCEDURE;
149300  2      VALID=0;
149400  2      DO J=0 TO 35;/*SAVE BUFFER IN CASE OLD STYLE*/
149500  2        TDSBUF(J)=WANDCHAR(J);
149600  3      END;
149700  2      DO J=0 TO 34;/*REMOVE SPACES*/
149800  2        IF WANDCHAR(J)=20H OR WANDCHAR(J)=3FH THEN DO I=J TO 34;
149900  3          WANDCHAR(I)=WANDCHAR(I+1);
150000  4        END;
150100  3      END;
150200  2      K=5;
150300  2    TRYAGAIN:
150400  2      IF K>30 THEN DO;
150500  2        DO J=0 TO 35;/*GET OLD RECORD*/
150600  3          WANDCHAR(J)=TDSBUF(J);
150700  4        END;
150800  3        GO TO START;
150900  3      END;
151000  2      DO A=K TO 34;
151100  2        IF ((WANDCHAR(A)='4') AND (WANDCHAR(A+1)='3')) OR
151200  3           ((WANDCHAR(A)='5') AND (WANDCHAR(A+1)='8')) THEN GO TO GOTIT;
151300  3      END;
151400  2      DO J=0 TO 35;/*GET OLD RECORD*/
151500  2        WANDCHAR(J)=TDSBUF(J);
151600  3      END;
151700  2      GO TO START;
151800  2    GOTIT:
151900  2      CHECKSUM=0;
152000  2      K=A-4;
152100  2      L=1;
152200  2      DO J=K TO K+12;
152300  2        CALL CHECK$76$CODE(WANDCHAR(J),L);
152400  3        IF (L:=L+1)=3 THEN L=1;/*ALTERN DOUB*/
152500  3      END;
152600  2      IF WANDCHAR(K:K-1)=CODESTRING((CHECKSUM MOD 20)+1) THEN DO;
152700  2        DO J=0 TO 13;
152800  3          WANDCHAR(J)=WANDCHAR(J+K);
152900  4        END;
153000  3        GO TO STARTCHECK;
153100  3      END;
153200  2      K=A+1;
153300  2      GO TO TRYAGAIN;
153400  2    START:
153500  2      VALID=0;
153600  2      DO J=0 TO 34;
153700  2        IF WANDCHAR(0)='M' THEN GO TO STARTCHECK;
```

```
01538  3  153800           DO I=0 TO (34-J);
01539  3  153900           WANDCHAR(I)=WANDCHAR(I+1);
01540  4  154000           END;
01541  3  154100           END;
01542  2  154200           VALID=1;
01543  2  154300           RETURN;
01544  2  154400  STARTCHECK:
01545  2  154500           DO I=1 TO 4;
01546  2  154600           IF WANDCHAR(I) < 30H THEN VALID=1;
01547  3  154700           IF WANDCHAR(I) > 39H THEN VALID=1;
01548  3  154800           END;
01549  2  154900           IF WANDCHAR(5)=20H THEN DO J=5 TO 33;
01550  2  155000           WANDCHAR(J)=WANDCHAR(J+1);
01551  3  155100           END;
01552  2  155200           IF WANDCHAR(5)='5' THEN IF WANDCHAR(6)='6'
01553  2  155300                  THEN GO TO CHECK$58;
01554  2  155400           IF WANDCHAR(5)='4' THEN IF WANDCHAR(6)='3' THEN GO TO CHECK$43;
01555  2  155500           IF WANDCHAR(34)='M' THEN DO;
01556  2  155600           VALID=1;/*PREVENT BUFFER FILLING WITH M'S*/
01557  3  155700           RETURN;
01558  3  155800           END;
01559  2  155900           DO I=0 TO 33;
01560  2  156000           WANDCHAR(I)=WANDCHAR(I+1);/*SHIFT FOR NEW M*/
01561  3  156100           END;
01562  2  156200           GO TO START;
01563  2  156300  CHECK$58:
01564  2  156400           IF WANDCHAR(7)=20H THEN DO J=7 TO 33;
01565  2  156500           WANDCHAR(J)=WANDCHAR(J+1);
01566  3  156600           END;
01567  2  156700           DO I=7 TO 12;
01568  2  156800           IF WANDCHAR(I) < 30H THEN VALID=1;
01569  3  156900           IF WANDCHAR(I) > 39H THEN VALID=1;
01570  3  157000           END;
01571  2  157100           IF VALID=1 THEN RETURN;
01572  2  157200           I=7;
01573  2  157300           DO J=0 TO 5;
01574  2  157400           EXPAND(J)=WANDCHAR(I);
01575  3  157500           I=I+1;
01576  3  157600           END;
01577  2  157700           EXPAND(6)=34H; EXPAND(7)=0BBH; EXPAND(8)=0BBH; EXPAND(9)=0BBH;
01578  2  157800           DO J=10 TO 13;
01579  2  157900           EXPAND(J)=3AH;
01580  3  158000           END;
01581  2  158100           I=1;
01582  2  158200           DO J=14 TO 17;
01583  2  158300           EXPAND(J)=WANDCHAR(I);
01584  3  158400           I=I+1;
01585  3  158500           END;
01586  2  158600           WANDCHAR(13)=20H;
```

```
01587  2  158700           RETURN;
01588  2  158600           CHECK$43:
01589  2  158800           IF WANDCHAR(8)=20H THEN DO J=0 TO 33;
01590  2  159000           WANDCHAR(J)=WANDCHAR(J+1);
01591  3  159100           END;
01592  2  159200           DO I=8 TO 13;
01593  2  159300           IF WANDCHAR(I) < 30H THEN VALID=1;
01594  2  159400           IF WANDCHAR(I) > 39H THEN VALID=1;
01595  3  159500           END;
01596  2  159600           IF VALID=1 THEN RETURN;
01597  2  159700           I=8;
01598  2  159800           DO J=0 TO 5;
01599  2  159900           EXPAND(J)=WANDCHAR(I);
01600  3  160000           I=I+1;
01601  3  160100           END;
01602  2  160200           EXPAND(6)=0;
01603  2  160300           IF WANDCHAR(7)='C' THEN EXPAND(6)=31H;
01604  2  160400           IF WANDCHAR(7)='D' THEN EXPAND(6)=32H;
01605  2  160500           IF WANDCHAR(7)='X' THEN EXPAND(6)=33H;
01606  2  160600           IF EXPAND(6)=0 THEN DO;
01607  2  160700           VALID=1;
01608  3  160800           RETURN;
01609  3  160900           END;
01610  3  161000           EXPAND(7)=0BBH; EXPAND(8)=0BBH; EXPAND(9)=0BBH;
01611  2  161100           DO J=10 TO 13;
01612  2  161200           EXPAND(J)=3AH;
01613  3  161300           END;
01614  2  161400           I=1;
01615  2  161500           DO J=14 TO 17;
01616  2  161600           EXPAND(J)=WANDCHAR(I);
01617  3  161700           I=I+1;
01618  3  161800           END;
01619  2  161900           END CHECK$76$NUMERICS;
01620  1  162000           /******************************************************/
01621  1  162100           CHECK$77$NUMERICS: PROCEDURE;
01622  2  162200           IF WANDCHAR(34)='P' THEN DO;
01623  2  162300           VALID=1;
01624  3  162400           RETURN;
01625  3  162500           END;
01626  3  162600           START:
01627  2  162700           VALID=0;
01628  2  162800           DO J=0 TO 34;
01629  2  162900           IF WANDCHAR(0)='P' THEN GO TO STARTCHECK;
01630  3  163000           DO I=0 TO (34-J);
01631  3  163100           WANDCHAR(I)=WANDCHAR(I+1);
01632  4  163200           END;
01633  3  163300           END;
01634  3  163400           VALID=1;
01635  2  163500           RETURN;
```

```
01636  2  STARTCHECK:
01637  2      DO I=1 TO 7;
01638  2          IF WANDCHAR(I) < 30H THEN VALID=1;
01639  3          IF WANDCHAR(I) > 39H THEN VALID=1;
01640  3      END;
01641  2      IF WANDCHAR(8)=20H THEN DO J=8 TO 33;
01642  2          WANDCHAR(J)=WANDCHAR(J+1);
01643  3      END;
01644  2      IF WANDCHAR(8)='5' THEN IF WANDCHAR(9)='8'
01645  2          THEN GO TO CHECK$58;
01646  2      IF WANDCHAR(8)='4' THEN IF WANDCHAR(9)='3' THEN GO TO CHECK$43;
01647  2  SHIFT$NEW$P:
01648  2      DO I=0 TO 33;
01649  2          WANDCHAR(I)=WANDCHAR(I+1);/*SHIFT FOR NEW P*/
01650  3      END;
01651  2      GO TO START;
01652  2  CHECK$58:
01653  2      DO I=10 TO 15;
01654  2          IF WANDCHAR(I) < 30H THEN VALID=1;
01655  3          IF WANDCHAR(I) > 39H THEN VALID=1;
01656  3      END;
01657  2      IF VALID=1 THEN RETURN;
01658  2      IF MODE='1' THEN IF STATION='1' THEN RETURN;/*REPLACEMENT LBLS*/
01659  2      I=25;
01660  2      IF (WANDCHAR(16) <3AH) AND (WANDCHAR(16)>2FH) THEN DO J=17 TO 25
01661  2          WANDCHAR(I)=WANDCHAR(I-1);
01662  3          I=I-1;
01663  3      END;
01664  2      I=10;
01665  2      DO J=0 TO 9;
01666  2          EXPAND(J)=WANDCHAR(I);
01667  3          I=I+1;
01668  3      END;
01669  2      EXPAND(6)=38H;/*SET 56 PREFIX*/
01670  2      WANDCHAR(16)='-';/*INSERT DASH FOR DISPLAY*/
01671  2      DO J=17 TO 19;
01672  2          IF WANDCHAR(J) < 30H THEN VALID=1;
01673  3          IF WANDCHAR(J) > 39H THEN VALID=1;
01674  3      END;
01675  2      IF VALID=1 THEN RETURN;
01676  2      IF WANDCHAR(20)=20H THEN DO J=20 TO 33;
01677  2          WANDCHAR(J)=WANDCHAR(J+1);
01678  3      END;
01679  2      GO TO FINAL$CHARACTERS;
01680  2  CHECK$43:
01681  2      DO I=11 TO 16;
01682  2          IF WANDCHAR(I) < 30H THEN VALID=1;
01683  3          IF WANDCHAR(I) > 39H THEN VALID=1;
01684  3      END;
```

```
168500  2       IF VALID=1 THEN RETURN;
168600  2       I=11;
168700  2       DO J=0 TO 5;
168800  2       EXPAND(J)=WANDCHAR(I);
168900  3       I=I+1;
169000  3       END;
169100  2       EXPAND(6)=0;
169200  2       IF WANDCHAR(10)='C' THEN EXPAND(6)=35H;
169300  2       IF WANDCHAR(10)='D' THEN EXPAND(6)=36H;
169400  2       IF WANDCHAR(10)='X' THEN EXPAND(6)=37H;
169500  2       IF EXPAND(6)=0 THEN DO;
169600  2       VALID=1;
169700  3       RETURN;
169800  3       END;
169900  2       IF MODE='1' THEN IF (STATION='1')
170000  2       OR (STATION='2') THEN RETURN;/*REPLACEMENT LBLS*/
170100  2       VALID=1;/*MUST PASS ON OF FOLLOWING*/
170200  2       IF (WANDCHAR(19)=20H) AND (WANDCHAR(20)=20H) THEN DO J=20 TO 33;
170300  2       WANDCHAR(J)=WANDCHAR(J+1);
170400  3       VALID=0;
170500  3       END;
170600  2       IF (WANDCHAR(19)=20H) AND (WANDCHAR(25)=20H) THEN VALID=0;
170700  2       I=24;
170800  2       IF (WANDCHAR(19)<>20H) AND (WANDCHAR(24)=20H) THEN DO J=20 TO 24;
170900  2       WANDCHAR(I)=WANDCHAR(I-1);
171000  3       I=I-1;
171100  3       VALID=0;
171200  3       END;
171300  2       IF (WANDCHAR(19)<>20H) AND (WANDCHAR(20)=20H) THEN DO J=20 TO 25;
171400  2       WANDCHAR(J)=WANDCHAR(J+1);
171500  3       VALID=0;
171600  3       END;
171700  2       IF VALID=1 THEN RETURN;
171800  2       EXPAND(7)=WANDCHAR(18);
171900  2       EXPAND(8)=WANDCHAR(19);
172000  2       EXPAND(9)=0BBH;
172100  2       IF (EXPAND(7)<30H) OR (EXPAND(7)>39H) THEN VALID=1;
172200  2       IF EXPAND(8) <> 20H THEN DO;
172300  3       IF (EXPAND(8)<30H) OR (EXPAND(8)>39H) THEN VALID=1;
172400  3       END;
172500  2       IF VALID=1 THEN RETURN;
172600  2       IF EXPAND(8)=20H THEN EXPAND(8)=0BBH;/*CLEAR SCREEN*/
172700  2       WANDCHAR(17)='G';/*INSERT G FOR DISPLAY*/
172800  2       FINAL$CHARACTERS:
172900  2       IF KEYEDVALUE=0DH THEN GO TO SKIPCHECKDIGIT;/*ENTRY BY KEY NO CHECK*/
173000  2       CHECKSUM=0;
173100  2       DO I=0 TO 23;
173200  2       CALL CHECK$CODE(WANDCHAR(I));
173300  3       END;
```

```
01734  2  173400           IF WANDCHAR(24) <> CODESTRING((CHECKSUM MOD 20)+1) THEN VALID=1;
01735  2  173500           /*CHECK DIGIT MUST CALC EQUAL*/
01736  2  173600           IF VALID=1 THEN GO TO SHIFT$NEW$P;
01737  2  173700           SKIPCHECKDIGIT:
01738  2  173800           I=11;
01739  2  173900           DO J=1 TO 7;
01740  2  174000           EXPAND(I)=WANDCHAR(J);
01741  3  174100           I=I+1;
01742  3  174200           END;
01743  2  174300           EXPAND(10)='1';/*COMPACT CODE FOR P*/
01744  2  174400           END CHECK$77$NUMERICS;
01745  1  174500           /*******************************************************/
01746  2  174600           TABLE$LOOK$UP: PROCEDURE;
01747  2  174700           B,J=0;
01748  2  174800           NEXT$CHAR:
01749  2  174900           IF COMPACT(J)<>STORAGE(B) THEN GO TO NEXT$RECORD;
01750  2  175000           IF J=2 THEN DO;
01751  2  175100           B=B-J; /*RETURN WITH INDEX AT START OF REC*/
01752  3  175200           RETURN;
01753  3  175300           END;
01754  3  175400           J=J+1;
01755  2  175500           B=B+1;
01756  2  175600           GO TO NEXT$CHAR;
01757  2  175700           NEXT$RECORD:
01758  2  175800           B=B+13-J; /*INCREMENT TO NEXT REC*/
01759  2  175900           IF B=TABLETOP THEN RETURN;
01760  2  176000           J=0;
01761  2  176100           GO TO NEXT$CHAR;
01762  2  176200           END TABLE$LOOK$UP;
01763  1  176300           /*******************************************************/
01764  1  176400           FIND$OR$STORE: PROCEDURE;
01765  2  176500           LOGON=0;/*0 RETURN MEANS NEW REC, 1 RETURN MEANS DUP*/
01766  2  176600           B=FREE;
01767  2  176700           FIND$DWG:
01768  2  176800           IF (STORAGE(B) AND 0F0H) = 0F0H THEN GO TO COMPARE$NEW$DWG;
01769  2  176900           /ALL RECORDS BEGIN WITH 1111XXXX BEFORE DWG/
01770  2  177000           B=B+1;
01771  2  177100           GO TO FIND$DWG;
01772  2  177200           COMPARE$NEW$DWG:
01773  2  177300           J=0;
01774  2  177400           CONTINUE$DWG$COMPARE:
01775  2  177500           IF B=STORAGE$TOP THEN GO TO STORE$NEW$TOP$DWG;
01776  2  177600           B=B+1;
01777  2  177700           IF COMPACT(J) > STORAGE(B) THEN GO TO FIND$DWG;
01778  2  177800           IF COMPACT(J) = STORAGE(B) THEN DO;
01779  2  177900           IF J=4 THEN DO;
01780  3  178000           B=B+1;
01781  4  178100           GO TO FIND$SERIAL;
01782  4  178200           END;
```

```
01783  178300  3  J=J+1;
01784  178400  3  GO TO CONTINUE$DWG$COMPARE;
01785  178500  3  END;
01786  178600  2  FIND$RECORD$START$FLAG:
01787  178700  2  IF (STORAGE(B) AND OFOH) <> OFOH THEN DO;/*TRY NEXT*/
01788  178800  3  B=B-1;
01789  178900  3  GO TO FIND$RECORD$START$FLAG;
01790  179000  3  END;
01791  179100  2  D,STORAGE$TOP=STORAGE$TOP+10;/*NEW TOP*/
01792  179200  2  SHIFT$FOR$NEW$DWG:
01793  179300  2  IF PASS=2 THEN DO;
01794  179400  3  CALL BEEPER;
01795  179500  3  RETURN;
01796  179600  3  END;
01797  179700  2  LOGON=1;
01798  179800  2  STORAGE(D)=STORAGE(D-10);
01799  179900  2  D=D-1;
01800  180000  2  IF D <> B THEN GO TO SHIFT$FOR$NEW$DWG;
01801  180100  2  STORAGE(B)=STATION OR OFOH;/*NEW REC FLAG*/
01802  180200  2  DO J=0 TO 8;
01803  180300  3  B=B+1;
01804  180400  3  STORAGE(B)=COMPACT(J);
01805  180500  3  END;
01806  180600  2  QTY=QTY+1;
01807  180700  2  SUBTOTAL=SUBTOTAL+1;
01808  180800  2  RETURN;
01809  180900  2  FIND$SERIAL:
01810  181000  2  VALID=0;
01811  181100  2  DO I=5 TO 8;
01812  181200  2  IF (STORAGE(B) AND OFOH) = OFOH THEN GO TO STORE$NEW$SERIAL;
01813  181300  3  IF STATION='1' THEN IF I=5 THEN GO TO SKIPFLAG;
01814  181400  3  IF STATION='1' THEN IF I=6 THEN GO TO SKIPFLAG;
01815  181500  3  IF COMPACT(I)<> STORAGE(B) THEN VALID=1;
01816  181600  3  /*THIS IS USED FOR MATCH OR NO MATCH AFTER THE 4 DIG TEST*/
01817  181700  3  SKIPFLAG: /*RQ-76 USES VALIDATION FLAGS*/
01818  181800  3  B=B+1;
01819  181900  3  END;
01820  182000  2  IF VALID=1 THEN GO TO FIND$SERIAL,
01821  182100  2  IF PASS=1 THEN CALL BEEPER;
01822  182200  2  IF PASS=2 THEN DO;
01823  182300  2  IF STORAGE(B-3)=0EEH THEN VALIDQTY=VALIDQTY+1;
01824  182400  3  STORAGE(B-3)=00H;/*SET FLAGS*/
01825  182500  3  STORAGE(B-4)=00H;
01826  182600  3  END;
01827  182700  3  RETURN;
01828  182800  2  STORE$NEW$SERIAL:
01829  182900  2  IF PASS=2 THEN DO;
01830  183000  2  CALL BEEPER;
01831  183100  3  RETURN;
01832  183200  3  END;
```

```
01833  2  183300  LOGON=1;
01834  2  183400  STORAGE$TOP=STORAGE$TOP+1;
01835  2  183500  C=STORAGE$TOP;
01836  2  183600  B=B-1;
01837  2  183700  SHIFT$FOR$NEW$SERIAL:
01838  2  183800  STORAGE(C)=STORAGE(C-4);
01839  2  183900  C=C-1;
01840  2  184000  IF C<>B THEN GO TO SHIFT$FOR$NEW$SERIAL;
01841  2  184100  DO J=5 TO 8;
01842  2  184200  B=B+1;
01843  3  184300  STORAGE(B)=COMPACT(J);
01844  3  184400  END;
01845  2  184500  QTY=QTY+1;
01846  2  184600  SUBTOTAL=SUBTOTAL+1;
01847  2  184700  RETURN;
01848  2  184800  STORE$NEW$TOP$DWG:
01849  2  184900  IF PASS=2 THEN DO;
01850  2  185000  CALL BEEPER;
01851  3  185100  RETURN;
01852  3  185200  END;
01853  2  185300  LOGON=1;
01854  2  185400  QTY=QTY+1;
01855  2  185500  SUBTOTAL=SUBTOTAL+1;
01856  2  185600  STORAGE(B)=STATION OR OFOH; /*SAVE STATION WITH START REC FLAG*/
01857  2  185700  DO J=0 TO 8;
01858  2  185800  B=B+1;
01859  3  185900  STORAGE(B)=COMPACT(J);
01860  3  186000  END;
01861  2  186100  STORAGE$TOP=STORAGE$TOP+10;
01862  2  186200  END FIND$OR$STORE;
01863  1  186300  /*********************************************************/
01864  1  186400  PAGE$SLEW: PROCEDURE; /*COMPUTE AND LINE FEED NEXT PAGE*/
01865  2  186500  DECLARE UPIT ADDRESS;
01866  2  186600  CALL GET$PRINT$LINE;
01867  2  186700  UPIT=132-LINE;
01868  2  186800  CALL PRINT(UPIT,.OAH,1);
01869  2  186900  CALL PRINT(0,.ODH,1);
01870  2  187000  CALL TRANSFER$LINE(O);
01871  2  187100  END PAGE$SLEW;
01872  1  187200  /*********************************************************/
01873  1  187300  SERIALIZATION: PROCEDURE;
01874  2  187400  /*ASSIGN SEQUENTIAL SERIAL NUMBERS IN MEMORY*/
01875  2  187500  B=FREE;
01876  2  187600  FINDNEXT:
01877  2  187700  IF B=STORAGE$TOP THEN RETURN;
01878  2  187800  IF (STORAGE(B) AND OFOH) = OFOH THEN B=B+6;/*SKIP DWG NO*/
01879  2  187900  K=1000;
01880  2  188000  DO J=4 TO 7;
01881  2  188100  SERIAL$DISP(J)=SERIAL/K MOD 10 + 30H;
```

```
01882  3  188200            K=K/10;
01883  3  188300            END;
01884  2  188400          EXPAND(0)='1';
01885  2  188500          DO J=1 TO 7;
01886  2  188600            EXPAND(J)=SERIALDISP(J);
01887  2  188700          END;
01888  3  188800          CALL PACK;
01889  2  188900          DO J=0 TO 3;
01890  2  189000            STORAGE(B)=COMPACT(J);
01891  3  189100            B=B+1;
01892  3  189200          END;
01893  2  189300          SERIAL=SERIAL+1;
01894  2  189400          GO TO FIND$NEXT;
01895  2  189500        END SERIALIZATION;
01896  1  189600      /******************************************/
01897  1  189700      /*ASSIGN SEQUENTIAL SERIAL NUMBERS IN MEMORY*/
01898  2  189800      CI1$SERIALIZATION: PROCEDURE;
01899  2  189900        B=FREE;
01900  2  190000        FIND$NEXT:
01901  2  190100          IF B=STORAGE$TOP THEN RETURN;
01902  2  190200          IF (STORAGE(B) AND 0F0H) = 0F0H THEN B=B+6;/*SKIP DWG NO*/
01903  2  190300          K=1000;
01904  2  190400          DO J=4 TO 7;
01905  2  190500            SERIALDISP(J)=CI1$SERIAL/K MOD 10 + 30H;
01906  3  190600            K=K/10;
01907  3  190700          END;
01908  2  190800          EXPAND(0)='2';
01909  2  190900          DO J=1 TO 7;
01910  2  191000            EXPAND(J)=SERIALDISP(J);
01911  3  191100          END;
01912  2  191200          CALL PACK;
01913  2  191300          DO J=0 TO 3;
01914  2  191400            STORAGE(B)=COMPACT(J);
01915  3  191500            B=B+1;
01916  3  191600          END;
01917  2  191700          CI1$SERIAL=CI1$SERIAL+1;
01918  2  191800          GO TO FIND$NEXT;
01919  2  191900        END CI1$SERIALIZATION;
01920  1  192000      /******************************************/
01921  1  192100      TITLE$REPORT: PROCEDURE;
01922  1  192200        CALL PRINT(0,.'COPY FOR -',10);
01923  2  192300        CALL BLACK;
01924  2  192400        CALL PRINT(4,.TITLE(COPYNO*18),10);
01925  2  192500        CALL RED;
01926  2  192600        CALL PRINT (6,.CLOCKDISP2,16);/*GET WEEK-DAY FROM CRT*/
01927  2  192700        CALL PRINT (8,.CLOCKDISP1(6),9);/*GET TIME FROM CRT*/
01928  2  192800        CALL PRINT (6,.'PAGE-',5);
01929  2  192900        PAGE=PAGE+1;
01930  2  193000
```

```
01931  2  193100     CALL BLACK;
01932  2  193200     IF STATION='2' THEN CALL PRINT(4,,20H,1);/*TWO EXTRA SPACES*/
01933  2  193300     CALL PRINT(2,,PAGE,1);
01934  2  193400     CALL PRINT(0,,ODH,1);
01935  2  193500     CALL PRINT(3,,OAH,1);
01936  2  193600     PRINT$QTY(0)=QTY/100 MOD 10 + 30H;
01937  2  193700     PRINT$QTY(1)=QTY/10 MOD 10 + 30H;
01938  2  193800     PRINT$QTY(2)=QTY MOD 10 + 30H;
01939  2  193900     CALL PRINT (0,,PRINT$QTY,3);
01940  2  194000     CALL RED;
01941  2  194100     CALL PRINT(4,,'TOTAL BOARDS',12);
01942  2  194200     IF (MODE='3') OR (STATION='7') THEN CALL PRINT(76,,'NO HOST REPORT',14);
01943  2  194300     ELSE DO;
01944  3  194400     IF STATION='1' THEN CALL
01945  3  194500     PRINT(10,,'RO FROM PN-76 TO PRE-IC INSERTION SERIALIZATION',47);
01946  3  194600     IF STATION='2' THEN CALL
01947  3  194700     PRINT(30,,'RO FROM PN-76 TO PN-CB  SHIPMENT TO CII',39);
01948  3  194800     END;
01949  2  194900     CALL PRINT (0,,ODH,1);
01950  2  195000     CALL PRINT (3,,OAH,1);
01951  2  195100     CALL PRINT(0,,'QTY',3);
01952  2  195200     CALL PRINT(5,,'MNEM',4);
01953  2  195300     CALL PRINT(7,,'DRAWING ID',10);
01954  2  195400     IF STATION='2' THEN CALL PRINT(4,,20H,1);/*2 EXTRA*/
01955  2  195500     CALL PRINT(6,,'SERIAL NUMBERS',14);
01956  2  195600     CALL PRINT(2,,'........................',30);
01957  2  195700     CALL PRINT(2,,OAH,1);
01958  2  195800     CALL TRANSFER$LINE(8);
01959  2  195900     END TITLE$REPORT;
01960  1  196000     /**********************************************************/
01961  1  196100     TITLE$BUILD$STATUS: PROCEDURE;
01962  2  196200     CALL TRANSFERLINE(0);
01963  2  196300     LINE=0;
01964  2  196400     CALL RED;
01965  2  196500     CALL PRINT(0,,'HONEYWELL INFORMATION SYSTEMS',29);
01966  2  196600     CALL BLACK;
01967  2  196700     CALL PRINT(6,,'MANUFACTURING BUILD STATUS - WWB LOG',36);
01968  2  196800     CALL PRINT(4,,OAH,1);
01969  2  196900     CALL PRINT(12,,ODH,1);
01970  2  197000     CALL PRINT(0,,'MU-',3);
01971  2  197100     CALL PRINT(48,,'SN-',3);
01972  2  197200     CALL PRINT(4,,OAH,1);
01973  2  197300     CALL PRINT(0,,ODH,1);
01974  2  197400     CALL PRINT(0,,'SLOT           SERIAL    MNEM    DRAWING ID',37);
01975  2  197500     CALL PRINT(10,,'BD WL    IC     LATEST',21);
01976  2  197600     CALL PRINT(1,,OAH,1);
01977  2  197700     END TITLE$BUILD$STATUS;
01978  1  197800     /**********************************************************/
01979  1  197900     PRINT$REPORT: PROCEDURE;
```

```
01980  2  198000      /*B-REV FILE POINTER,C-STORAGE POINT,D-NEXT DWG*/
01981  2  198100      B=0;
01982  2  198200      C,D=FREE;
01983  2  198300      NEW$DWG$PRINT:
01984  2  198400      BRDCNT=1;
01985  2  198500      D=D+10;
01986  2  198600      IF STORAGE(C)=0FFH THEN GO TO WRAP$UP;
01987  2  198700      FIND$NEXT$DWG:
01988  2  198800      IF (STORAGE(D) AND 0F0H) <> 0F0H THEN DO; /*TEST FOR NEW REC*/
01989  2  198900      BRDCNT=BRDCNT+1;
01990  2  199000      D=D+4;
01991  3  199100      GO TO FIND$NEXT$DWG;
01992  3  199200      END;
01993  2  199300      CALL GET$PRINT$LINE;
01994  2  199400      IF (LINE+((BRDCNT*2)/5)) > 118 THEN DO;
01995  2  199500      CALL PAGESLEW;
01996  3  199600      CALL TITLE$REPORT;
01997  3  199700      END;
01998  3  199800      DISPQTY(0)=BRDCNT/100 MOD 10 + 30H;
01999  2  199900      DISPQTY(1)=BRDCNT/10 MOD 10 + 30H;
02000  2  200000      DISPQTY(2)=BRDCNT MOD 10 + 30H;
02001  2  200100      DO J=0 TO 2;
02002  2  200200      IF DISPQTY(J) <> 30H THEN DO;
02003  3  200300      GO TO P1;
02004  4  200400      END;
02005  3  200500      DISPQTY(J)=20H;
02006  3  200600      END;
02007  2  200700      P1:
02008  2  200800      CALL PRINT(0,.0DH,1);
02009  2  200900      CALL PRINT(3,.0AH,1);
02010  2  201000      CALL BLACK;
02011  2  201100      CALL PRINT (0,.DISPQTY,3);
02012  2  201200      DO J=0 TO 4;
02013  2  201300      C=C+1;
02014  3  201400      COMPACT(J)=STORAGE(C);
02015  3  201500      END;
02016  2  201600      C=C+1;
02017  2  201700      CALL UNPACK;
02018  2  201800      CALL TABLE$LOOK$UP;
02019  2  201900      B=B+5;
02020  2  202000      CALL RED;
02021  2  202100      CALL PRINT (4,.STORAGE(B),5);
02022  2  202200      IF EXPAND(6) > 38H THEN EXPAND(6)=30H;
02023  2  202300      IF EXPAND(6) < 30H THEN EXPAND(6)=30H;
02024  2  202400      CALL BLACK;
02025  2  202500      DO CASE (EXPAND(6) -30H);
02026  3  202600      CALL PRINT(4,.'43C',3);
02027  3  202700      CALL PRINT(4,.'43C',3);
02028  3  202800      CALL PRINT(4,.'43D',3);
```

```
02029  3  202900        CALL PRINT(4,,'43X',3);
02030  3  203000        CALL PRINT(4,,'58',2);
02031  3  203100        CALL PRINT(4,,'43C',3);
02032  3  203200        CALL PRINT(4,,'43D',3);
02033  3  203300        CALL PRINT(4,,'43X',3);
02034  3  203400        CALL PRINT(4,,'58',2);
02035  3  203500        END;
02036  3  203600        DO CASE (EXPAND(6) -30H);
02037  2  203700        EXPAND(6)=20H;
02038  3  203800        EXPAND(6)=20H;
02039  3  203900        EXPAND(6)=20H;
02040  3  204000        EXPAND(6)=20H;
02041  3  204100        EXPAND(6)='G';
02042  3  204200        EXPAND(6)='G';
02043  3  204300        EXPAND(6)='G';
02044  3  204400        EXPAND(6)='G';
02045  3  204500        EXPAND(6)='-';
02046  3  204600        END;
02047  3  204700        DO J=7 TO 9;
02048  2  204800        IF EXPAND(J)=3BH THEN EXPAND(J)=20H;
02049  3  204900        END;
02050  2  205000        IF STATION='2' THEN DO;/*C11 SUFFIX CC*/
02051  2  205100        IF EXPAND(6)='-' THEN DO;
02052  3  205200        CALL PRINT(2,,EXPAND,10);
02053  3  205300        CALL PRINT(2,,'CC',2);
02054  4  205400        GO TO GOTA58;
02055  4  205500        END;
02056  3  205600        IF EXPAND(9)=20H THEN DO; CALL PRINT(2,,EXPAND,9);
02057  4  205700        CALL PRINT(2,,'CC',2);
02058  4  205800        CALL PRINT(2,,20H,1);
02059  4  205900        END;
02060  3  206000        ELSE DO;
02061  3  206100        CALL PRINT(2,,EXPAND,9);
02062  4  206200        CALL PRINT(2,,'CC',2);
02063  4  206300        END;
02064  3  206400        END;
02065  2  206500        ELSE DO;/*REGULAR SUFFIX*/
02066  2  206600        IF EXPAND(6)='-' THEN CALL PRINT(2,,EXPAND,10);
02067  3  206700        ELSE CALL PRINT (2,,EXPAND,9);
02068  3  206800        END;
02069  3  206900  GOTA58:
02070  2  207000        J=0;/*COUNT NUMBER OF SERIAL NUMBERS FOR LINE SLEW*/
02071  2  207100        CALL RED;
02072  2  207200  PRINT$SERIALS:
02073  2  207300        IF KEYEDVALUE=14H THEN RETURN; /*STOP PRINT*/
02074  2  207400        J=J+1;
02075  2  207500        DO K=0 TO 3;
02076  2  207600        COMPACT(K)=STORAGE(C);
02077  3  207700        C=C+1;
```

```
02078  3  207800   END; UNPACK;
02079  2  207900   CALL UNPACK;
02080  2  208000   IF EXPAND(0)='1' THEN EXPAND(0)='P';
02081  2  208100   IF EXPAND(0)='2' THEN EXPAND(0)='C';
02082  2  208200   CALL PRINT(4,.EXPAND,3);
02083  2  208300   IF C=D THEN GO TO NEW$DWG$PRINT;
02084  2  208400   J=J+1;
02085  2  208500   IF J MOD 5 = 0 THEN DO;/*NEW LINE*/
02086  2  208600   CALL PRINT (2,.0AH,1);
02087  3  208700   IF STATION='2' THEN CALL PRINT (46,.0UH,1);
02088  3  208800   ELSE CALL PRINT (42,.0DH,1);
02089  3  208900   J=0;
02090  3  209000   END;
02091  2  209100   GO TO PRINT$SERIALS;
02092  2  209200   WRAP$UP:
02093  2  209300   CALL PAGE$SLEW;
02094  2  209400   END PRINT$REPORT;
02095  1  209500   /**********************************************/
02096  1  209600   PRINT$LABELS: PROCEDURE;
02097  2  209700   /*B-REV FILE POINTER, C-DWG SER POINT*/
02098  2  209800   B=0;
02099  2  209900   C=FREE;
02100  2  210000   NEW$DWG:
02101  2  210100   CHECKSUM=0;
02102  2  210200   IF STORAGE(C)=0FFH THEN RETURN;
02103  2  210300   DO J=0 TO 4;
02104  2  210400   C=C+1;
02105  3  210500   COMPACT(J)=STORAGE(C);
02106  3  210600   END;
02107  2  210700   C=C+1;
02108  2  210800   CALL UNPACK;
02109  2  210900   K=11;
02110  2  211000   IF EXPAND(6)='8' THEN DO;
02111  2  211100   FDWG(0),BDWG(11)='5';
02112  3  211200   CALL CHECKCODE(FDWG(C));
02113  3  211300   FDWG(1),BDWG(10)='8';
02114  3  211400   CALL CHECKCODE(FDWG(1));
02115  3  211500   EXPAND(6)='';
02116  3  211600   K=9;
02117  3  211700   L=2;
02118  3  211800   DO J=0 TO 9;
02119  3  211900   IF EXPAND(J)=30H THEN EXPAND(J)=20H;
02120  4  212000   FDWG(L),BDWG(K)=EXPAND(J);
02121  4  212100   CALL CHECKCODE(FDWG(L));
02122  4  212200   L=L+1; K=K-1;
02123  4  212300   END;
02124  3  212400   GO TO GET$STATUS;
02125  3  212500   END;
02126  2  212600   FDWG(0),BDWG(11)='4';
```

```
02127  2  212700        CALL CHECKCODE(FDWG(C));
02128  2  212800        FDWG(1),BDWG(10)='3';
02129  2  212900        CALL CHECKCODE(FDWG(1));
02130  2  213000        FDWG(2),BDWG(9)=20H;
02131  2  213100        IF EXPAND(6)='5' THEN FDWG(2),BDWG(9)='C';
02132  2  213200        IF EXPAND(6)='6' THEN FDWG(2),BDWG(9)='D';
02133  2  213300        IF EXPAND(6)='7' THEN FDWG(2),BDWG(9)='X';
02134  2  213400        CALL CHECKCODE(FDWG(2));
02135  2  213500        EXPAND(6)='G';
02136  2  213600        K=8; L=3;
02137  2  213700        DO J=0 TO 8;
02138  2  213800        IF EXPAND(J)=5EH THEN EXPAND(J)=20H;
02139  2  213900        FDWG(L),BDWG(K)=EXPAND(J);
02140  3  214000        CALL CHECKCODE(FDWG(L));
02141  3  214100        K=K-1; L=L+1;
02142  3  214200        END;
02143  2  214300 GET$STATUS:
02144  2  214400        CALL TABLE$LOOKSUP;
02145  2  214500        B=B+5; /*GET MNEM*/
02146  2  214600        K=4;
02147  2  214700        DO J=0 TO 4;
02148  2  214800        FMNEM(J),BMNEM(K)=STORAGE(B);
02149  3  214900        B=B+1; K=K-1;
02150  3  215000        END;
02151  2  215100        K=3;
02152  2  215200        DO J=0 TO 3;/*GET STATUS*/
02153  2  215300        BSTAT(K)=STORAGE(B);
02154  3  215400        B=B+1; K=K-1;
02155  3  215500        END;
02156  2  215600        CHECKSUMSAVE=CHECKSUM;
02157  2  215700 NEXT$SERIAL:
02158  2  215800        CHECKSUM=CHECKSUMSAVE;
02159  2  215900        DO J=0 TO 3;
02160  2  216000        COMPACT(J)=STORAGE(C);
02161  3  216100        C=C+1;
02162  3  216200        END; UNPACK;
02163  2  216300        IF EXPAND(0)='1' THEN EXPAND(0)='P';
02164  2  216400        IF EXPAND(0)='2' THEN EXPAND(0)='C';
02165  2  216500        K=7;
02166  2  216600        DO J=0 TO 7;
02167  2  216700        BSER(K)=EXPAND(J);
02168  2  216800        CALL CHECKCODE(BSER(K));
02169  3  216900        K=K-1;
02170  3  217000        END;
02171  2  217100        CALL PRINT(1,.6DH,1);
02172  2  217200        CALL PRINT(2,.6EH,1);
02173  2  217300        CALL PRINT(2,.65H,1);
02174  2  217400        CALL PRINT(2,.6DH,1);
02175  2  217500        CALL PRINT(2,.6DH,1);
```

```
02176  2  217600         CALL PRINT(11,.73H,1);
02177  2  217700         CALL PRINT(2,.65H,1);
02178  2  217800         CALL PRINT(2,.72H,1);
02179  2  217900         CALL PRINT(2,.69H,1);
02180  2  218000         CALL PRINT(2,.61H,1);
02181  2  218100         CALL PRINT(2,.6CH,1);
02182  2  218200         CALL PRINT(12,.62H,1);
02183  2  218300         CALL PRINT(2,.6FH,1);
02184  2  218400         CALL PRINT(2,.61H,1);
02185  2  218500         CALL PRINT(2,.72H,1);
02186  2  218600         CALL PRINT(2,.64H,1);
02187  2  218700         IF STATION='2' THEN CALL PRINT(17,.63H,1);/*CII LBL*/
02188  2  218800         ELSE CALL PRINT(13,.63H,1);
02189  2  218900         CALL PRINT(2,.6FH,1);
02190  2  219000         CALL PRINT(2,.64H,1);
02191  2  219100         CALL PRINT(2,.65H,1);
02192  2  219200         CALL PRINT(6,.62H,1);
02193  2  219300         CALL PRINT(2,.64H,1);
02194  2  219400         CALL PRINT(4,.77H,1);
02195  2  219500         CALL PRINT(2,.6CH,1);
02196  2  219600         CALL PRINT(4,.69H,1);
02197  2  219700         CALL PRINT(2,.63H,1);
02198  2  219800         IF STATION='2' THEN DO;/*CII LABELS - NO TRAVEL LABEL*/
02199  2  219900         CALL PRINT(2,.20H,1);
02200  3  220000         CALL LEFT;
02201  3  220100         CALL PRINT(3,.0AH,1);
02202  3  220200         GO TO CII$STAT;
02203  3  220300         END;
02204  2  220400         CALL PRINT(13,.FD/0,12);
02205  2  220500         CALL PRINT(12,.FMNEM,5);
02206  2  220600         CALL PRINT(3,.0AH,1);
02207  2  220700         CALL PRINT(2,BSTAT(0),1);
02208  2  220800         CALL PRINT(2,'A',1);
02209  2  220900         CALL LEFT;
02210  2  221000         /***/
02211  2  221100         PRINT$STATUS: PROCEDURE;
02212  3  221200         DO K=1 TO 3;
02213  4  221300         IF BSTAT(K) > 5AH THEN DO;/*DOUBLE ALPHA REV*/
02214  5  221400         BSTAT(0)=BSTAT(K)-26;/*0 ELEM NOT USED, BACK-UP TO ALPHA*/
02215  5  221500         CALL PRINT(2,BSTAT(0),1);
02216  5  221600         CALL PRINT(2,'A',1);
02217  4  221700         END;
02218  4  221800         ELSE DO;/*SINGLE ALPHA*/
02219  5  221900         CALL PRINT(2,BSTAT(K),1);
02220  5  222000         END;
02221  4  222100         CALL PRINT(2,.20H,1);
02222  4  222200         END;
02223  3  222300         END PRINT$STATUS;
02224  2  222400         /*****/
```

```
02225  222500  2  CALL PRINT$STATUS;
02226  222600  2  CALL PRINT(12,.BSER,8);
02227  222700  2  CALL PRINT(11,.20H,1);
02228  222800  2  CI$STAT:
02229  222900  2  CALL PRINT$STATUS;
02230  223000  2  CALL BLACK;
02231  223100  2  CALL OCR$PRINT(2);
02232  223200  2  BCODE(4)=30H;
02233  223300  2  K=1;
02234  223400  2  J=3;
02235  223500  2  DO L=1 TO 3;
02236  223600  2  IF BSTAT(J) > 54H THEN DO;
02237  223700  3  BSTAT(J)=BSTAT(J)-20;/*SHIFT BACK TO A*/
02238  223800  3  BCODE(4)=BCODE(4) OR K;
02239  223900  3  END;
02240  224000  3  IF BSTAT(J)<41H THEN BSTAT(J)=41H;
02241  224100  3  BCODE(J)=CODESTRING(BSTAT(J)-40H);
02242  224200  3  CALL CHECKCODE(BCODE(J));
02243  224300  3  J=J-1;
02244  224400  3  K=K+K;
02245  224500  3  END;
02246  224600  2  CALL CHECKCODE(BCODE(4));
02247  224700  2  IF STATION='2' THEN CHECKSUM=CHECKSUM+24;/*VAL OF CC*/
02248  224800  2  BCODE(0)=CODESTRING((CHECKSUM MOD 20)+1);/*CHECK DIGIT*/
02249  224900  2  K=1;
02250  225000  2  CALL PRINT(3,.BCODE,5);
02251  225100  2  IF STATION='2' THEN DO;
02252  225200  2  IF BDWG(0)=20H THEN DO;
02253  225300  3  CALL PRINT(6,.'CC',2);
02254  225400  3  CALL PRINT(2,.BDWG(1),11);
02255  225500  3  END;
02256  225600  3  ELSE DO;
02257  225700  3  CALL PRINT(4,.'CC',2);
02258  225800  4  CALL PRINT(2,.BDWG,12);
02259  225900  4  END;
02260  226000  3  END;
02261  226100  2  ELSE CALL PRINT(4,.BDWG,12);
02262  226200  2  CALL PRINT(4,.BSER,8);
02263  226300  2  CALL RED;
02264  226400  2  CALL OCR$PRINT(0);
02265  226500  2  CALL PRINT(8,.BMNEM,5);
02266  226600  2  CALL PRINT(5,.0AH,1);
02267  226700  2  IF KEYEDVALUE=14H THEN RETURN;/*STOP PRINT*/
02268  226800  2  CALL RIGHT;
02269  226900  2  IF (STORAGE(C) AND 0F0H)=0F0H THEN GO TO NEW$DWG;
02270  227000  2  GO TO NEXT$SERIAL;
02271  227100  2  END PRINT$LABELS;
02272  227200  1  /*******************************************************/
02273  227300  1  REPLACEMENT$LABELS: PROCEDURE;
```

```
02274  2   227400           NOCLOCK=1;
02275  2   227500           CALL STATUS(13,2,1);
02276  2   227600           CALL STATUS(21,3,0);
02277  2   227700           MESLIN=2; CALL CLEAR$INSTR;
02278  2   227800           CALL MESSAGE$22;
02279  2   227900           CALL MESSAGE$14;
02280  2   228000           CALL MESSAGE$3;
02281  2   228100           CALL MESSAGE$24;
02282  2   228200      NEXT$LABEL:
02283  2   228300           PAPERSET=1;
02284  2   228400           STORAGE$TOP=FREE;
02285  2   228500           DO B=FREE TO (FREE+10);
02286  2   228600           STORAGE(B)=0FFH;
02287  3   228700           END;
02288  2   228800           KEYEDVALUE=0;
02289  2   228900           CALL WANDRECORD;
02290  2   229000           IF KEYEDVALUE=11H THEN RETURN;/*DONE*/
02291  2   229100           CALL CHECK$77$NUMERICS;
02292  2   229200           IF VALID=1 THEN GO TO NEXT$LABEL;
02293  2   229300           DO J=1 TO 7;
02294  2   229400           BSER(J)=WANDCHAR(J);/*SAVE SERIAL*/
02295  3   229500           END;
02296  2   229600           WANDCHAR(3)='M';
02297  2   229700           DO J=0 TO 34;
02298  2   229800           WANDCHAR(J)=WANDCHAR(J+3);
02299  3   229900           END;
02300  2   230000           CALL CHECK$76$NUMERICS;
02301  2   230100           IF VALID=1 THEN GO TO NEXT$LABEL;
02302  2   230200      PACKIT:
02303  2   230300           CALL PACK;
02304  2   230400           CALL TABLE$LOOKSUP;
02305  2   230500           CALL STATUS(0,5,0);
02306  2   230600           IF B=TABLE$TOP THEN GO;/*CANT FIND*/
02307  2   230700           CALL STATUS(7,5,1);
02308  3   230800           CALL BEEPTWICE;
02309  3   230900           GO TO NEXT$LABEL;
02310  3   231000           END;
02311  2   231100           COMPACT(3)=STORAGE(B+3);
02312  2   231200           COMPACT(4)=STORAGE(B+4);
02313  2   231300           CALL FIND$OR$STORE;
02314  2   231400           DO J=1 TO 7;
02315  2   231500           EXPAND(J)=BSER(J);
02316  3   231600           END;
02317  2   231700           IF STATION='2' THEN EXPAND(0)='2';/* CIT-TYPE */
02318  2   231800           ELSE EXPAND(0)='1';
02319  2   231900           CALL PACK;
02320  2   232000           B=B-4;
02321  2   232100           DO J=0 TO 3;
02322  2   232200           B=B+1;
```

```
02323  3  232300     STORAGE(B)=COMPACT(J);/*STORE SERIAL*/
02324  3  232400     END; PRINT$LABELS;
02325  2  232500     CALL PRINT$LABEL;
02326  2  232600     GO TO NEXT$LABEL;
02327  2  232700     END REPLACEMENT$LABELS;
02328  1  232800     /**********************************************/
02329  1  232900     STOCKROOM$MENU: PROCEDURE;
02330  2  233000     MESLIN=2; CALL CLEAR$INSTR;
02331  2  233100     MODE='2';
02332  2  233200     CALL MESSAGE$1;
02333  2  233300     CALL DISPLAY(,'FL    = PN-76 TO FLOOR',21,6,33);
02334  2  233400     CALL DISPLAY(,'CI    = PN-76 TO CII',19,8,33);
02335  2  233500     CALL BRACKETS(31,36,6,2);
02336  2  233600     DO WHILE KEYEDVALUE='S';
02337  2  233700     END;
02338  2  233800     IF KEYEDVALUE='F' THEN STATION='1';
02339  2  233900     IF KEYEDVALUE='C' THEN STATION='2';
02340  2  234000     IF STATION=0 THEN DO;
02341  2  234100     KEYEDVALUE,MODE,STATION=0;
02342  2  234200     RETURN;
02343  3  234300     END;
02344  2  234400     KEYEDVALUE=0;
02345  2  234500     DO WHILE KEYEDVALUE=0;
02346  2  234600     END;
02347  2  234700     IF (KEYEDVALUE='L') AND (STATION='1') THEN RETURN;
02348  2  234800     IF (KEYEDVALUE='1') AND (STATION='2') THEN RETURN;
02349  2  234900     KEYEDVALUE,STATION,MODE=0;
02350  2  235000     RETURN;
02351  2  235100     END STOCKROOM$MENU;
02352  1  235200     /**********************************************/
02353  1  235300     UTILITIES$MENU: PROCEDURE;
02354  2  235400     MESLIN=2; CALL CLEAR$INSTR;
02355  2  235500     CALL MESSAGE$1;
02356  2  235600     CALL DISPLAY(,'NH    = NO-HOST SERIALIZE',24,6,33);
02357  2  235700     CALL DISPLAY(,'LB    = LABELS',13,8,33);
02358  2  235800     CALL DISPLAY(,'SC    = SET CLOCK',16,10,33);
02359  2  235900     CALL DISPLAY(,'SS    = SET SERIAL',17,12,33);
02360  2  236000     CALL DISPLAY(,'FU    = FILE UPDATE',18,14,33);
02361  2  236100     CALL DISPLAY(,'BS    = BUILD STATUS LOG',23,16,33);
02362  2  236200     CALL DISPLAY(,'DF    = DOWNLOAD FILE',20,18,33);
02363  2  236300     CALL BRACKETS(31,36,6,7);
02364  2  236400     MODE='1';
02365  2  236500     DO WHILE KEYEDVALUE='U';
02366  2  236600     END;
02367  2  236700     IF KEYEDVALUE='N' THEN STATION='1';
02368  2  236800     IF KEYEDVALUE='L' THEN STATION='2';
02369  2  236900     IF KEYEDVALUE='S' THEN STATION='3';
02370  2  237000     IF KEYEDVALUE='F' THEN STATION='5';
02371  2  237100     IF KEYEDVALUE='B' THEN STATION='7';
```

```
02372  2  237200       IF KEYEDVALUE='D' THEN STATION='8';
02373  2  237300       IF STATION=0 THEN DO;
02374  2  237400         KEYEDVALUE,MODE=0;
02375  3  237500         RETURN;
02376  3  237600       END;
02377  2  237700       KEYEDVALUE=0;
02378  2  237800     DO WHILE KEYEDVALUE=0;
02379  2  237900     END;
02380  2  238000     IF KEYEDVALUE='H' AND STATION='1' THEN DO;
02381  2  238100       MODE='3';
02382  2  238200       MESLIN=5; CALL CLEAR$INSTR;
02383  2  238300       CALL DISPLAY(.'LABEL TYPE F-FLOOR C-CII',24,10,32);
02384  2  238400       KEYEDVALUE,STATION=0;
02385  2  238500     DO WHILE KEYEDVALUE=0;
02386  3  238600     END;
02387  3  238700     IF KEYEDVALUE='F' THEN STATION='1';
02388  3  238800     IF KEYEDVALUE='C' THEN STATION='2';
02389  3  238900     RETURN;
02390  3  239000   END;
02391  2  239100   IF KEYEDVALUE='B' AND STATION='2' THEN DO;
02392  2  239200     MESLIN=5; CALL CLEAR$INSTR;
02393  3  239300     CALL DISPLAY(.'LABEL TYPE F-FLOOR C-CII',24,10,32);
02394  2  239400     KEYEDVALUE,STATION=0;
02395  3  239500   DO WHILE KEYEDVALUE=0;
02396  3  239600   END;
02397  3  239700   IF KEYEDVALUE='F' THEN STATION='1';
02398  3  239800   IF KEYEDVALUE='C' THEN STATION='2';
02399  3  239900   RETURN;
02400  3  240000 END;
02401  2  240100 IF KEYEDVALUE='C' AND STATION='3' THEN RETURN;
02402  2  240200 IF KEYEDVALUE='S' AND STATION='3' THEN DO;
02403  2  240300   MESLIN=5; CALL CLEAR$INSTR;
02404  3  240400   CALL DISPLAY(.'SERIAL F-FLOOR C-CII',20,10,32);
02405  3  240500   KEYEDVALUE,STATION=0;
02406  3  240600 DO WHILE KEYEDVALUE=0;
02407  3  240700 END;
02408  3  240800 IF KEYEDVALUE='F' THEN STATION='4';
02409  3  240900 IF KEYEDVALUE='C' THEN STATION='6';
02410  3  241000 RETURN;
02411  3  241100 END;
02412  2  241200 IF KEYEDVALUE='U' AND STATION='5' THEN RETURN;
02413  2  241300 IF KEYEDVALUE='S' AND STATION='7' THEN RETURN;
02414  2  241400 IF KEYEDVALUE='F' AND STATION='8' THEN RETURN;
02415  2  241500 KEYEDVALUE,MODE,STATION=0;
02416  2  241600 END UTILITIES$MENU;
02417  1  241700 /**************************************************/
02418  1  241800 DECLARE KBINRTAD DATA ('');
02419  1  241900 KBINRT: PROCEDURE;
02420  2  242000 DECLARE I BYTE;
```

```
02421  2  242100        CALL PUSH;
02422  2  242200        MEMORY$ADDRESS(1DABH),KEYEDVALUE=(INPUT(49H) AND 7FH);/*GET DATA*/
02423  2  242300        IF KEYEDVALUE=1DH THEN DO;/*CTRL-SHIFT-M*/
02424  2  242400        NOCLOCK=1;/*STOP CLOCK DISPLAY ONLY*/
02425  3  242500        OUTPUT(0CH)=0;
02426  3  242600        CALL POP;
02427  3  242700        ENABLE;
02428  3  242800        GO TO 17CEH;/*PROM*/
02429  3  242900        END;
02430  2  243000        IF KEYLOCK=1 THEN GO TO K2;
02431  2  243100        IF KEYINDATA=1 THEN GO TO K1;
02432  2  243200        IF KEYEDVALUE=3BH THEN CALL LINE$UP;
02433  2  243300        IF KEYEDVALUE=7FH THEN CALL PAGE$UP;
02434  2  243400        IF KEYEDVALUE=2EH THEN CALL LINE$DOWN;
02435  2  243500        IF KEYEDVALUE=2FH THEN CALL PAGE$DOWN;
02436  2  243600 K1:
02437  2  243700        IF KEYEDVALUE=3DH THEN GO TO RESTART;
02438  2  243800 K2:
02439  2  243900        OUTPUT(0CH)=00H;
02440  2  244000        CALL POP;
02441  2  244100        ENABLE;
02442  2  244200        RETURN;
02443  2  244300 RESTART:
02444  2  244400        OUTPUT(0CH)=00H;
02445  2  244500        CALL POP;
02446  2  244600        ENABLE;
02447  2  244700        GO TO OCR$START;
02448  2  244800        END KBINRT;
02449  1  244900        INTADDPTR(5)=.KBINRTAD;
02450  1  245000 /*************************************************************/
02451  1  245100 /*************************************************************/
02452  1  245200 ***
02453  1  245300 ***        S T A R T   O F   M A I N L I N E   P R O G R A M
02454  1  245400 ***        -------------------------------------------------
02455  1  245500 ***
02456  1  245600 /*************************************************************/
02457  1  245700
02458  1  245800        IF FREE <> 0FFFFH THEN GO TO OCRSTART;
02459  1  245900        CALL SET$CLOCK;
02460  1  246000        CALL SET$SERIAL;
02461  1  246100        CALL SET$CI1$SERIAL;
02462  1  246200        CALL CLEAR$SCREEN;
02463  1  246300        CALL DOWNLOAD;
02464  1  246400        CPDISCONNECTS,FLPNTR=0;
02465  1  246500        GO TO SK$RE;
02466  1  246600 OCR$START:
02467  1  246700        IF UP$DE=NO THEN GO TO SK$RE;
02468  1  246800        IF KEYEDVALUE=KEYRESTART THEN DO;
02469  1  246900
```

```
02470  247000  1        KEYEDVALUE=0;
02471  247100  2        UP$DE=NO;
02472  247200  2        MESLIN=2; CALL CLEAR$INSTR;
02473  247300  2        CALL DISPLAY(. 'TO ABORT, KEY RESTART AGAIN',27,12,31);
02474  247400  2        DO J=1 TO 900;/*WAIT 9 SEC THEN RETURN TO WAITUPLOAD*/
02475  247500  2        CALL TIME(100);
02476  247600  3        END;
02477  247700  2        GO TO WAIT$UPLOAD;/*TIME OUT WITHOUT A SECOND RESTART*/
02478  247800  2        END;
02479  247900  1     SK$RE:
02480  248000  1        UP$DE=NO;
02481  248100  1        STORAGE$TOP=FREE;
02482  248200  1        KEYEDVALUE=00H;
02483  248300  1        KEYLOCK=0;
02484  248400  1        KEYINDATA=0;
02485  248500  1        PAPERSET,PAPERBRANCH=0;
02486  248600  1        CII$SERIAL=CII$SERIALSAVE;
02487  248700  1        IF TDS <>0 THEN CALL HANG$UP$HOST;
02488  248800  1        PASS,TDS=0;
02489  248900  1        CALL RESET$PRINTER;
02490  249000  1        QTY=0;
02491  249100  1        VALIDQTY=0;
02492  249200  1        DO B=FREE TO (STORAGELIMIT-1);
02493  249300  1        STORAGE(B)=0FFH;
02494  249400  2        END;
02495  249500  1        CALL INITIALIZE$SCREEN;
02496  249600  1        CALL CLEAR$STATUS;
02497  249700  1        MESLIN=2;
02498  249800  1        CALL CLEAR$INSTR;
02499  249900  1        CALL STATUS(1,1,0);
02500  250000  1        CALL MESSAGE$1
02501  250100  1        CALL MESSAGE$27;
02502  250200  1        CALL MESSAGE$2;
02503  250300  1        NOCLOCK=0; /*ALLOW CLOCK DISP*/
02504  250400  1        CALL DISPLAY$CLOCK;
02505  250500  1        CALL DISPLAY$SERIAL;
02506  250600  1        SERIAL=SERIALSAVE;
02507  250700  1        CII$SERIAL=CII$SERIALSAVE;
02508  250800  1        CALL DISPLAY$CII$SERIAL;
02509  250900  1        CALL DISPLAY$FILE$UP;
02511  251000  1        SC1:
02511  251100  1        OUTPUT(0C7H)=2;/*HANG UP*/
02512  251200  1        STATION,MODE=0;
02513  251300  1        I,J=0;
02514  251400     /*****************************************************
02515  251500  ***
02516  251600  ***            M E N U     E V A L U A T I O N
02517  251700  ***
02518  251800  *****************************************************/
```

```
/***
COMMENTS:
IN ORDER TO SAVE VALUABLE MEMORY, THE TWO TRANSACTIONS
SHARE COMMON ROUTINES. SWITCHES 'MODE' AND 'STATION' PROVIDE
THE CUSTOMIZATION.
MODE=1 MEANS THERE IS A HOST TRANSACTION
MODE=ANYTHING MEANS THERE IS NO HOST TRANSACTION
STATION=1 MEANS RO-76 TO WB, THE FLOOR
STATION=2 MEANS RO-76 TO CB, TO CII/HB
STATION=ANYTHING ELSE - MEANS A UTILITY
***
************************************************/
MENUWAIT:
IF FREE>TABLETOP THEN I=I+1;
IF I > 500 THEN GO TO BEGIN$UPLOAD;
IF FREE=TABLETOP THEN IF NEWFILE=1 THEN IF (J:=J+1) > 500 THEN DO;
CALL DOWNLOAD;
J=0;
IF (WEEK MOD 2 = 0) AND DAY=1 THEN DO;
CALL CLEAR$SCREEN;
CALL MESSAGE$7;
CALL MESSAGE$24;
KEYEDVALUE=0;
DO WHILE KEYEDVALUE <> 11H;
END;
END;
GO TO OCR$START;
END;
CALL TIME(250);
IF KEYEDVALUE=0 THEN GO TO MENUWAIT;
IF KEYEDVALUE=3BH THEN GO TO MENUWAIT;
IF KEYEDVALUE=7FH THEN GO TO MENUWAIT;
IF KEYEDVALUE=2EH THEN GO TO MENUWAIT;
IF KEYEDVALUE=2FH THEN GO TO MENUWAIT;
IF KEYEDVALUE='S' THEN DO;
CALL STOCKROOM$MENU;
GO TO TYPETEST;
END;
IF KEYEDVALUE='U' THEN DO;
CALL UTILITIES$MENU;
GO TO TYPETEST;
END;
TYPETEST:
IF STATION=0 THEN GO TO OCR$START;
IF MODE='1' THEN DO;
IF STATION='1' THEN CALL REPLACEMENT$LABELS;
IF STATION='2' THEN CALL REPLACEMENT$LABELS;
IF STATION='3' THEN CALL SET$CLOCK;
IF STATION='4' THEN CALL SET$SERIAL;
```

```
02568  256800  2    IF STATION='6' THEN CALL SET$CII$SERIAL;
02569  256900  2    IF STATION='7' THEN GO TO START$PN$77;/*LOG NO-HOST*/
02570  257000  2    IF FREE>TABLETOP THEN GO TO MENUWAIT;/*CANT EXPAND FILE*/
02571  257100  2    IF STATION='5' THEN CALL FILE$UPDATE;
02572  257200  2    IF STATION='8' THEN CALL DOWNLOAD;
02573  257300  2    GO TO OCR$START;
02574  257400  2    END;
02575  257500  1    IF MODE='2' THEN GO TO START$IC;
02576  257600  1    IF MODE='3' THEN DO;
02577  257700  2      IF STATION='1' THEN GO TO START$IC;/*SERIALIZE ONLY NO HOST*/
02578  257800  2      IF STATION='2' THEN GO TO START$IC;/*CII SERIAL - NO HOST*/
02579  257900  2    GO TO OCR$START;
02580  258000  2    END;
02581  258100  1    GO TO OCR$START;
02582  258200  1    /*******************************************************
02583  258300  1    ***        R O - 7 6   F R E - I C   I N S E R T I O N
02584  258400  1    ********************************************************/
02585  258500  1    START$IC:
02586  258600  1    KEYEDVALUE=00H;
02587  258700  1    QTY=0;
02588  258800  1    RETURN$START$IC:
02589  258900  1    PAPERSET=0;
02590  259000  1    NOCLOCK=1; /*KEEP CLOCK FROM DISP*/
02591  259100  1    PASS=1;
02592  259200  1    MESLIN=2;
02593  259300  1    CALL CLEAR$INSTR;
02594  259400  1    CALL WAND$READS$DISP;
02595  259500  1    CALL MESSAGE$4;
02596  259600  1    CALL MESSAGE$5;
02597  259700  1    CALL MESSAGE$24;
02598  259800  1    CALL MESSAGE$2;
02599  259900  1    CALL MESSAGE$9;
02600  260000  1    CALL STATUS(1,1,0);
02601  260100  1    IF MODE = '3' THEN CALL STATUS (12,2,1);/*MODE-3 NO HOST*/
02602  260200  1    ELSE DO;/*HOST*/
02603  260300  1    CALL STATUS(19,2,0);
02604  260400  1    IF STATION='1' THEN CALL STATUS(3,3,1);
02605  260500  2    IF STATION='2' THEN CALL STATUS(4,3,1);
02606  260600  2    END;
02607  260700  2    CALL STATUS (13,4,0);
02608  260800  2    CALL STATUS(10,8,0);
02609  260900  1    CALL STATUS(11,9,0);
02610  261000  1    CALL STATUS(14,10,0);
02611  261100  1    CALL STATUS(32,7,0);
02612  261200  1    CALL STATUS(0,11,0);
02613  261300  1    CALL DISPLAY$QUANTITY(SPACEQTY,14,76);
02614  261400  1    CALL WAND$RECORD;/*CLEAR WAND BUFFER*/
```

```
02617  1  261700            NEXT$IC:
02618  1  261800            CALL DISPLAY$QUANTITY(QTY,20,72);
02619  1  261900            IF (SPACEQTY:=((STORAGELIMIT-5)-STORAGETOP)/10) < 10 THEN DO;
02620  2  262000              CALL STATUS(32,7,1);
02621  2  262100              CALL BEEP$TWICE;
02622  2  262200              CALL TIME(250);
02623  2  262300              CALL BEEP$TWICE;
02624  2  262400              GO TO IC$DONE;
02625  2  262500            END;
02626  1  262600            CALL DISPLAY$QUANTITY(SPACEQTY,14,76);
02627  1  262700            CALL WAND$RECORD;
02628  1  262800            IF KEYEDVALUE=11H THEN GO TO IC$DONE;
02629  1  262900            CALL DISPLAY(.WANDCHAR,28,22,34);
02630  1  263000            VALID=0;
02631  1  263100            CALL CHECK$76$NUMERICS;
02632  1  263200            IF VALID=1 THEN DO;
02633  1  263300              GO TO NEXT$IC;
02634  2  263400            END;
02635  1  263500            CALL PACK;
02636  1  263600            VALID=0;
02637  1  263700            CALL TABLE$LOOKUP;
02638  1  263800            CALL STATUS(0,5,0);
02639  1  263900            IF B=TABLETOP THEN DO; /*CANT FIND*/
02640  2  264000              CALL STATUS(7,5,1);
02641  2  264100              CALL BEEP$TWICE;
02642  2  264200              GO TO NEXT$IC;
02643  2  264300            END;
02644  1  264400            COMPACT(3)=STORAGE(B+3);
02645  1  264500            COMPACT(4)=STORAGE(B+4);
02646  1  264600            OUTPUT(0C3H)=05H; /*LED ON /
02647  1  264700            CALL DISPLAY(.WANDCHAR(5),9,16,67);
02648  1  264800            CALL DISPLAY(.WANDCHAR(1),4,18,73);
02649  1  264900            CALL FIND$OR$STORE;
02650  1  265000            GO TO NEXT$IC;
02651     265100            IC$DONE:
02652  1  265200            IF QTY=0 THEN GO TO CCR$START;
02653  1  265300            KEYEDVALUE=00H;
02654  1  265400            VALID=0;
02655  1  265500            PRINTWAIT1:
02656  1  265600            PAPERSET=1;
02657  1  265700            CALL RESET$PRINTER;
02658  1  265800            MESLIN=2; CALL CLEAR$INSTR;
02659  1  265900            CALL MESSAGE$12;
02660  1  266000            CALL MESSAGE$15;
02661  1  266100            CALL MESSAGE$14;
02662  1  266200            CALL MESSAGE$16;
02663  1  266300            CALL MESSAGE$9;
02664  1  266400            CALL STATUS(9,3,1);
02665  1  266500            CALL STATUS(0,4,0);
```

```
02666  266600          KEYEDVALUE=00H;
02667  266700          PW1:
02668  266800          IF KEYEDVALUE=05H THEN GO TO RETURN$START$IC;
02669  266900          IF KEYEDVALUE<>12H THEN GO TO PW1;
02670  267000          CALL PRINT(82,,0AH,1);
02671  267100          IF STATION='1' THEN DO;
02672  267200          SERIAL=SERIALSAVE;
02673  267300          CALL SERIALIZATION;
02674  267400          END;
02675  267500          IF STATION='2' THEN DO;
02676  267600          CI$SERIAL=CI$SERIALSAVE;
02677  267700          CALL CI$SERIALIZATION;
02678  267800          END;
02679  267900          CALL STATUS(18,3,0);
02680  268000          MESLIN=2; CALL MESSAGE$18;
02681  268100          CALL CLEAR$INSTR;
02682  268200          CALL PRINT(8,,20H,1);/*MOVE LEFT MARGIN*/
02683  268300          CALL TRANSFER$POSITION(0);
02684  268400          DO COPYNO = 0 TO 3;
02685  268500          IF MODE='3' THEN IF COPYNO=2 THEN COPYNO=3;
02686  268600          PAGE=30H;
02687  268700          CALL TITLE$REPORT;
02688  268800          IF KEYEDVALUE=14H THEN GO TO PRINTWAIT;
02689  268900          CALL PRINT$REPORT;
02690  269000          IF KEYEDVALUE=14H THEN GO TO PRINTWAIT1;/*STOP PRINT*/
02691  269100          END;
02692  269200          CALL PRINT(50,,0AH,1);
02693  269300          IF VALID=1 THEN GO TO NA1;
02694  269400          MESLIN=2; CALL CLEAR$INSTR;
02695  269500          CALL MESSAGE$17;
02696  269600          CALL MESSAGE$20;
02697  269700          CALL MESSAGE$12;
02698  269800          CALL MESSAGE$2;
02699  269900          CALL MESSAGE$9;
02700  270000          MORE$COPIES:
02701  270100          PAPERSET=0;
02702  270200          CALL STATUS(0,3,0);
02703  270300          KEYEDVALUE=00H;
02704  270400          MC1:
02705  270500          IF KEYEDVALUE=05H THEN GO TO RETURN$START$IC;
02706  270600          IF KEYEDVALUE=19H THEN GO TO PRINT$WAIT1;
02707  270700          IF KEYEDVALUE<>15H THEN GO TO MC1;
02708  270800          LABEL$WAIT:
02709  270900          PAPERSET=1;
02710  271000          CALL RESET$PRINTER;
02711  271100          MESLIN=2; CALL CLEAR$INSTR;
02712  271200          CALL MESSAGE$22;
02713  271300          CALL MESSAGE$14;
02714  271400          CALL MESSAGE$16;
```

```
02715  271500        CALL MESSAGE$9;
02716  271600        CALL STATUS(8,4,1);
02717  271700        KEYEDVALUE=00H;
02718  271800        DO WHILE KEYEDVALUE<>12H;
02719  271900          END;
02720  272000          MESLIN=2; CALL CLEAR$INSTR;
02721  272100          CALL MESSAGE$18;
02722  272200          CALL MESSAGE$26;
02723  272300          CALL STATUS(18,4,0);
02724  272400          CALL PRINT$LABELS;
02725  272500          IF KEYEDVALUE=14H THEN GO TO LABEL$WAIT;
02726  272600          VALID=1;
02727  272700          CALL PRINT(54,.0AH,1);
02728  272800      SKIPLABELPRINT:
02729  272900          I=0;
02730  273000      MORE$ANYTHING:
02731  273100          GO TO WAIT$UPLOAD;
02732  273200      /***************************************************************/
02733  273300      ***
02734  273400      ***       R 0 - 7 7   T O   M A J O R   U N I T   A S M
02735  273500      ***
02736  273600      /***************************************************************/
02737  273700      START$PN677:
02738  273800          QTY=0;
02739  273900          RETURN$START$PN677:
02740  274000          NOCLOCK=1;
02741  274100          CALL CLEAR$STATUS;
02742  274200          CALL STATUS(1,1,0);
02743  274300          CALL STATUS(35,2,0);
02744  274400          CALL STATUS(9,3,1);
02745  274500          CALL STATUS(10,8,0);
02746  274600          CALL STATUS(34,9,0);
02747  274700          CALL STATUS(14,10,0);
02748  274800          CALL STATUS(33,11,0);
02749  274900          CALL STATUS(32,7,0);
02750  275000          MESLIN=2;
02751  275100          CALL CLEAR$INSTR;
02752  275200          CALL MESSAGE$15;
02753  275300          CALL MESSAGE$14;
02754  275400          CALL MESSAGE$16;
02755  275500          CALL MESSAGE$9;
02756  275600          PAGE=30H;
02757  275700          PAPERSET=1;
02758  275800          KEYEDVALUE=0;
02759  275900          DO WHILE KEYEDVALUE<>12H;
02760  276000          END;
02761  276100          CALL STATUS(0,3,0);
02762  276200          CALL PRINT(82,.0AH,1);
02763  276300      MORE$BUILD$STATUS:
```

```
02764  276400  1   CALL STATUS(0,3,0);
02765  276500  1   CALL TITLE$BUILD$STATUS;
02766  276600  1   MESLIN=2;
02767  276700  1   CALL CLEAR$INSTR;
02768  276800  1   CALL WAND$READ$DISP;
02769  276900  1   CALL MESSAGE$4;
02770  277000  1   CALL MESSAGE$5;
02771  277100  1   CALL MESSAGE$24;
02772  277200  1   CALL MESSAGE$2;
02773  277300  1   CALL MESSAGE$9;
02774  277400  1   SUBTOTAL=0;
02775  277500  1   KEYEDVALUE=0;
02776  277600  1   PAPERSET=0;
02777  277700  1   NOCLOCK=1;/*KEEP CLOCK FROM DISP*/
02778  277800  1   CALL DISPLAY$QUANTITY(SPACEQTY,14,76);
02779  277900  1   CALL DISPLAY$QUANTITY(SUBTOTAL,22,77);
02780  278000  1   CALL WAND$RECORD;/*CLEAR WAND BUFFER*/
02781  278100  1 NEXT$PN$77:
02782  278200  1   CALL DISPLAY$QUANTITY(QTY,20,72);
02783  278300  1   CALL DISPLAY$QUANTITY(SUBTOTAL,22,77);
02784  278400  1   IF (SPACEQTY:=((STORAGELIMIT-5)-STORAGETOP)/10) < 10 THEN DO;
02785  278500  1     CALL STATUS(32,7,1);
02786  278600  1     CALL BEEPTWICE;
02787  278700  2     CALL TIME(250);
02788  278800  2     CALL BEEPTWICE;
02789  278900  2     GO TO PN$77$DONE;
02790  279000  2   END; DISPLAY$QUANTITY(SPACEQTY,14,76);
02791  279100  2   CALL WANDRECORD;
02792  279200  1   IF KEYEDVALUE=11H THEN GO TO PN$77$DONE;
02793  279300  1   CALL DISPLAY(.WANDCHAR,27,22,34);
02794  279400  1   CALL DISPLAY(.WANDCHAR(0),8,18,72);
02795  279500  1   CALL CHECK$77$NUMERICS;
02796  279600  1   IF VALID=1 THEN DO;
02797  279700  1     GO TO NEXT$PN$77;
02798  279800  2   END; PACK;
02799  279900  1   OUTPUT(0C3H)=05H; /*LED ON*/
02800  280000  1   CALL DISPLAY(.WANDCHAR(8),12,16,68);
02801  280100  1   CALL DISPLAY(.WANDCHAR(0),8,18,72);
02802  280200  1   CALL FIND$OR$STORE;
02803  280300  1   IF LOGON=1 THEN DO;/*NEW NUMBER*/
02804  280400  1     CALL PRINT(18,.0DH,1);
02805  280500  1     CALL PRINT(6,.0AH,1);
02806  280600  2     CALL BLACK;
02807  280700  2     CALL PRINT(0,.WANDCHAR,8);
02808  280800  2     CALL TABLE$LOOKSUP;
02809  280900  2   IF B=TABLETOP THEN DO;
02810  281000  2     CALL BEEPTWICE;
02811  281100  2     CALL PRINT(16,.20H,1);
02812  281200  3
```

```
02813  3  281300           GO TO SKIPMNEMPR;
02814  3  281400           END;
02815  2  281500           CALL RED;
02816  2  281600           CALL PRINT(6,.STORAGE(B+5),5);/*MNEM*/
02817  2  281700           CALL BLACK;
02818  2  281800  SKIPMNEMPR:
02819  2  281900           OUTPUT(OC3H)=04H;/*LED OFF FOR HEAD START*/
02820  2  282000           CALL PRINT(6,.WANDCHAR(8),12);
02821  2  282100           WANDCHAR(20)=WANDCHAR(20)-30H;/*SHIFT CODE*/
02822  2  282200           J=21;
02823  2  282300           K=4;
02824  2  282400           DO L=1 TO 3;/*DECODE REV-BD,WL,IC*/
02825  2  282500           BSTAT(L)=40H;/*START AT BEGIN OF ALPHABET*/
02826  3  282600           IF (WANDCHAR(20)AND K)=K THEN BSTAT(L)=54H,
02827  3  282700           /*SHIFT CODE MOVES START OF ALPHABET TO T*/
02828  3  282800           DO I=1 TO 20;
02829  3  282900           BSTAT(L)=BSTAT(L)+1;
02830  4  283000           IF CODESTRING(I)=WANDCHAR(J) THEN GO TO DONEFOUNDIT;
02831  4  283100           END;
02832  3  283200  DONEFOUNDIT:
02833  3  283300           J=J+1;
02834  3  283400           K=K/2;
02835  3  283500           END;
02836  2  283600           CALL RED;
02837  2  283700           CALL PRINT(10,.BSTAT(1),1);
02838  2  283800           CALL PRINT(8,.BSTAT(2),1);
02839  2  283900           CALL PRINT(8,.BSTAT(3),1);
02840  2  284000           IF B=TABLETOP THEN GO TO SKIPSTATCHECK;
02841  2  284100           IF STORAGE(B+3)<>COMPACT(3) THEN GO TO PRINTLATEST;
02842  2  284200           IF STORAGE(B+4)<>COMPACT(4) THEN GO TO PRINTLATEST;
02843  2  284300           IF STORAGE(B+10)<>BSTAT(1) THEN GO TO PRINTLATEST;
02844  2  284400           IF STORAGE(B+11)<>BSTAT(2) THEN GO TO PRINTLATEST;
02845  2  284500           IF STORAGE(B+12)<>BSTAT(3) THEN GO TO PRINTLATEST;
02846  2  284600           CALL PRINT(12,.'YES',3);
02847  2  284700           GO TO NEXTiPN177;
02848  2  284800  PRINTLATEST:
02849  2  284900           C=B+3;
02850  2  285000           DO J=0 TO 1;
02851  3  285100           COMPACT(J)=STORAGE(C);
02852  3  285200           C=C+1;
02853  3  285300           END;
02854  2  285400           CALL UNPACK;
02855  2  285500           CALL BLACK;
02856  2  285600           IF (EXPAND(0)='1') OR (EXPAND(0)='6') THEN CALL PRINT(12,'-',1);
02857  2  285700           ELSE CALL PRINT(12,.'G',1);
02858  2  285800           DO J=1 TO 3;
02859  3  285900           IF EXPAND(J)=3BH THEN CALL PRINT(2,.20H,1);
02860  3  286000           ELSE CALL PRINT(2,.EXPAND(J),1);
02861  3  286100           END;
```

```
02862  2  286200           CALL RED;
02863  2  286300           CALL PRINT(4,,STORAGE(B+10),1);
02864  2  286400           CALL PRINT(4,,STORAGE(B+11),1);
02865  2  286500           CALL PRINT(4,,STORAGE(B+12),1);
02866  2  286600           GO TO NEXT$PN$77;
02867  2  286700  SKIPSTATCHECK:
02868  2  286800           CALL PRINT(8,,3FH,1);
02869  2  286900           GO TO NEXT$PN$77;
02870  2  287000           END;
02871  2  287100           ELSE CALL BEEPER;
02872  2  287200           GO TO NEXT$PN$77;
02873  2  287300  PN$77$DONE:
02874  2  287400           IF QTY=0 THEN GO TO GO$START;
02875  1  287500           KEYEDVALUE=0;
02876  1  287600           CALL PRINT(0,,0DH,1);
02877  1  287700           CALL PRINT (6,,0AH,1);
02878  1  287800           PRINT$QTY(0)=SUBTOTAL/100 MOD 10 + 30H;
02879  1  287900           PRINT$QTY(1)=SUBTOTAL/10 MOD 10 + 30H;
02880  1  288000           PRINT$QTY(2)=SUBTOTAL MOD 10 + 30H;
02881  1  288100           CALL PRINT (52,,PRINT$QTY,3);
02882  1  288200           CALL PRINT (4,,'TOTAL BOARDS',12);
02883  1  288300           CALL PRINT(0,,0DH,1);
02884  1  288400           CALL GET$PRINT$LINE;
02885  1  288500           IF (LINE=132-(LINE MOD 132)) =0 THEN LINE=132;
02886  1  288600           CALL PRINT(LINE,,0AH,1);
02887  1  288700           MESLIN=2; CALL CLEAR$INSTR;
02888  1  288800           IF PAPERSET=1 THEN DO;/*ALLOW RESET PAPER*/
02889  1  288900           CALL MESSAGE$15;
02890  2  289000           CALL MESSAGE$14;
02891  2  289100           END;
02892  1  289200           CALL MESSAGE$16;
02893  1  289300           CALL MESSAGE$12;
02894  1  289400           CALL MESSAGE$9;
02895  1  289500           CALL STATUS (9,3,1);
02896  1  289600           PRINT$77$1:
02897  1  289700           IF KEYEDVALUE=05H THEN GO TO MORE$BUILD$STATUS;
02898  1  289800           IF KEYEDVALUE <> 12H THEN GO TO PRINT$77$1;
02899  1  289900           IF PAPERSET=1 THEN CALL PRINT(82,,0AH,1);/*SLEW TO TOP*/
02900  1  290000           CALL STATUS(18,3,0);
02901  1  290100           MESLIN=2; CALL CLEAR$INSTR;
02902  1  290200           CALL MESSAGE$18;
02903  1  290300           CALL PRINT(8,,20H,1);/*MOVE LEFT MARGIN*/
02904  1  290400           CALL TRANSFER$POSITION(0);
02905  1  290500           POSITION=0;
02906  1  290600           PAPERSET=1;/*ALLOW PAPERSET IF STOP PRINT*/
02907  1  290700           DO COPYNO=2 TO 3;
02908  1  290800           PAGE=30H;
02909  2  290900           CALL TITLE$REPORT;
02910  2  291000           IF KEYEDVALUE=14H THEN GO TO PN$77$DONE;
```

```
02911  291100  2  CALL PRINT$REPORT;
02912  291200  2  IF KEYEDVALUE=14H THEN GO TO PNT77$DONE;
02913  291300  2  END;
02914  291400  1  CALL PRINT(50,,0AH,1);/*SLEW PAGE TO TEAR BAR*/
02915  291500  1  WAIT$UPLOAD:
02916  291600  1  UP$DE=YES;/*NEED DOUBLE RESTART HERE*/
02917  291700  1  PAPERSET=0;
02918  291800  1  MESLIN=2; CALL CLEAR$INSTR;
02919  291900  1  CALL MESSAGE$17;
02920  292000  1  CALL MESSAGE$21;
02921  292100  1  CALL MESSAGE$9;
02922  292200  1  CALL MESSAGE$12;
02923  292300  1  CALL MESSAGE$24;
02924  292400  1  CALL STATUS(0,4,0);
02925  292500  1  KEYEDVALUE=00H;
02926  292600  1  MA1:
02927  292700  1  IF KEYEDVALUE=19H THEN GO TO PRINTWAIT1;
02928  292800  1  IF KEYEDVALUE=15H THEN GO TO LABEL$WAIT;
02929  292900  1  IF KEYEDVALUE=05H THEN GO TO RETURN$RESTART.1C;
02930  293000  1  IF KEYEDVALUE<>111 THEN GO TO MA1;
02931  293100  1  /***********************************************
02932  293200  1  ***       T R A N S M I T    D A T A    T O    H O S T
02933  293300  1  ***********************************************/
02934  293400  1
02935  293500  1  IF MODE='3' THEN IF STATION='1' THEN DO;
02936  293600  1  SERIALSAVE=SERIAL;
02937  293700  1  GO TO OCR$START;/*NO HOST*/
02938  293800  2  END;
02939  293900  2  IF MODE='3' THEN IF STATION='2' THEN DO;
02940  294000  2  CI1$SERIALSAVE=CI1$SERIAL;
02941  294100  2  GO TO OCR$START;/*NO HOST*/
02942  294200  2  END;
02943  294300  2  IF STATION='7' THEN IF MODE='1' THEN GO TO OCR$START;
02944  294400  1  BEGIN$UPLOAD:
02945  294500  1  NOCLOCK=1;
02946  294600  1  KEYLOCK=1;
02947  294700  1  SERIALSAVE=SERIAL;
02948  294800  1  CI1$SERIALSAVE=CI1$SERIAL;
02949  294900  1  FREE=STORAGE$TOP;
02950  295000  1  CALL STATUS (17,1,0);
02951  295100  1  CALL STATUS (10,4,0);
02952  295200  1  CALL STATUS (34,5,0);
02953  295300  1  CALL STATUS (0,8,0);
02954  295400  1  CALL STATUS (0,9,0);
02955  295500  1  CALL STATUS (0,10,0);
02956  295600  1  CALL STATUS (0,11,0);
02957  295700  1  CALL STATUS(32,7,0);
02958  295800  1  SPACEQTY=((STORAGELIMIT-5)-FREE)/10;
```

```
02960  296000  1  CALL DISPLAY$QUANTITY(SPACEQTY,14,76);
02961  296100  1  MESLIN=2; CALL CLEAR$INSTR;
02962  296200  1  CALL MESSAGE$25;
02963  296300  1  TDS=1;
02964  296400  1  D,E=0;
02965  296500  1  SIGNON1:
02966  296600  1  TIMEOUT=1; /*FORCE PROTOCOL TO SIGN OFF*/
02967  296700  1  B=TABLETOP;
02968  296800  1  CALL RESET$PRINTER;/*RETURN PRINTER TO LEFT MARGIN*/
02969  296900  1  CALL PRINT (3,,0AH,1);
02970  297000  1  CALL BLACK;
02971  297100  1  CALL PRINT(0,,'DATA SENT',9);
02972  297200  1  CALL PRINT(4,,CLOCKDISP2,16);
02973  297300  1  CALL PRINT (6,,CLOCKDISP1(6),9);
02974  297400  1  CALL PRINT(0,,0DH,1);
02975  297500  1  CALL PRINT(2,,0AH,1);
02976  297600  1  CALL PRINT(0,,CLOCKDISP1(6),6);
02977  297700  1  CALL RED;
02978  297800  1  /*******LOAD TRANSMIT BUFFER WITH NEXT DRAWING*************/
02979  297900  1  NEXT$DWG$SEND:
02980  298000  1  STATION=STORAGE(B);
02981  298100  1  B=B+1;/*SKIP STATION*/
02982  298200  1  DO I=0 TO 4;
02983  298300  1  COMPACT(I)=STORAGE(B);
02984  298400  2  B=B+1;
02985  298500  1  END;
02986  298600  1  CALL UNPACK;
02987  298700  1  IF EXPAND(6)='8' THEN DO;
02988  298800  2  BDWG(0)='5'; BDWG(1)='8';
02989  298900  2  L=2;
02990  299000  2  DO I=0 TO 9;
02991  299100  2  IF EXPAND(I)=3BH THEN EXPAND(I)=20H;
02992  299200  3  BDWG(L)=EXPAND(I);
02993  299300  3  L=L+1;
02994  299400  3  END;
02995  299500  2  BDWG(8)='-';
02996  299600  2  IF (STATION=0F1H) OR (STATION=0F2H)
02997  299700  2  THEN DO I=8 TO 11;/*CLEAR$SCREEN TAB FOR PN-76*/
02998  299800  2  BDWG(I)=' ';
02999  299900  3  END;
03000  300000  2  GO TO LOAD$SERIAL;
03001  300100  2  END;
03002  300200  1  BDWG(0)='4';
03003  300300  1  BDWG(1)='3';
03004  300400  1  BDWG(2)=20H;
03005  300500  1  IF EXPAND(6)='5' THEN BDWG(2)='C';
03006  300600  1  IF EXPAND(6)='6' THEN BDWG(2)='D';
03007  300700  1  IF EXPAND(6)='7' THEN BDWG(2)='X';
03008  300800  1  L=3;
```

```
03009  1    300900        DO I=0 TO 9;
03010  1    301000        IF EXPAND(I)=3BH THEN EXPAND(I)=20H;
03011  2    301100        BDWG(L)=EXPAND(I);
03012  2    301200        L=L+1;
03013  2    301300        END;
03014  1    301400        BDWG(9)='G';
03015  1    301500        IF (STATION=0F1H) OR (STATION=0F2H)
03016  1    301600        THEN DO;/*CLEAR$SCREEN GROUP FOR PN-76*/
03017  2    301700        BDWG(9)='P';
03018  2    301800        BDWG(10)='1';
03019  2    301900        BDWG(11)=' ';
03020  2    302000        END;
03021  1    302100        LOAD$SERIAL:
03022  1    302200        DO I=0 TO 3;
03023  2    302300        COMPACT(I)=STORAGE(B);
03024  2    302400        B=B+1;
03025  2    302500        END;
03026  1    302600        CALL UNPACK;
03027  1    302700        DO I=0 TO 7;
03028  2    302800        BSER(I)=EXPAND(I);
03029  2    302900        END;
03030  1    303000        IF BSER(0)='1' THEN BSER(0)='P';
03031  1    303100        IF BSER(0)='2' THEN BSER(0)='C';
03032  1    303200        CALL PROTOCOL;
03033  1    303300        /*********SEND DRAWING TO RAW BALANCE FIRST***************/
03034  1    303400        SENDAGAIN:
03035  1    303500        TDS=1;
03036  1    303600        CALL DISPLAY(.BDWG,12,8,67);
03037  1    303700        CALL DISPLAY(.BSER,6,10,72);
03038  1    303800        CALL STATUS (29,3,0);
03039  1    303900        CALL SEND$HOST(.'PC1C200000000000',16);
03040  1    304000        CALL SEND$HOST(.BDWG,12);
03041  1    304100        CALL SEND$HOST(.' ',3);
03042  1    304200        IF STATION=0F1H THEN CALL SEND$HOST(.'RU76    ',6);
03043  1    304300        ELSE CALL SEND$HOST(.'RO76WB',6);
03044  1    304400        CALL SEND$HOST(.BSER,8);
03045  1    304500        CALL SEND$HOST(.'001      EAWMB-OCR   000000',26);
03046  1    304600        TIMER=9000;
03047  1    304700        CALL SEND$HOST(.0DH,1);
03048  1    304800        CALL TDS$RECEIVE;
03049  1    304900        CALL PROTOCOL;
03050  1    305000        IF TDSBUF(1)='0' THEN GO TO SENDTOIMS;
03051  1    305100        IF TDSBUF(1)='3' THEN GO TO SENDTOIMS;
03052  1    305200        IF TDSBUF(1)='6' THEN GO TO SENDTOIMS;
03053  1    305300        TIMEOUT=1; /*FORCE PROTOCOL TO RE-SIGN ON*/
03054  1    305400        CALL PROTOCOL;
03055  1    305500        /*********SEND TO IMS AFTER RAW BALANCE ACCEPTANCE*********/
03056  1    305600        SENDTOIMS:
03057  1    305700        TDS=2;
```

```
03058   305800  1   CALL STATUS(30,3,0);
03059   305900  1   CALL SEND$HOST(.'PC00201',7);
03060   306000  1   IF STATION=0F1H THEN DO;
03061   306100  2     IF BDWG(0)='5' THEN DO;
03062   306200  3       CALL SEND$HOST(.BDWG,8);
03063   306300  3       CALL SEND$HOST(.' ',1);
03064   306400  3     END;
03065   306500  2     ELSE CALL SEND$HOST(.BDWG,9);
03066   306600  2     CALL SEND$HOST(.' ',2);
03067   306700  2   END;
03068   306800  1   ELSE DO;/*STATION=F1 CII TRANS*/
03069   306900  1     IF BDWG(0)='5' THEN DO;
03070   307000  2       CALL SEND$HOST(.BDWG,8);
03071   307100  3       CALL SEND$HOST(.'CC ',3);
03072   307200  3     END;
03073   307300  2     ELSE DO;/*43 TYPE*/
03074   307400  2       CALL SEND$HOST(.BDWG,9);
03075   307500  3       CALL SEND$HOST(.'CC',2);
03076   307600  3     END;
03077   307700  2   END;
03078   307800  1   CALL SEND$HOST(.' ',4);
03079   307900  1   IF STATION=0F1H THEN CALL SEND$HOST(.'WS ',3);
03080   308000  1   ELSE CALL SEND$HOST(.' ',3);
03081   308100  1   CALL SEND$HOST(.BSER(4),4);
03082   308200  1   TIMER=9000;
03083   308300  1   CALL SEND$HOST(.0DH,1);
03084   308400  1   CALL TDS$RECEIVE;
03085   308500  1   CALL PROTOCOL;
03086   308600  1   IF TDSBUF(5)='K' THEN GO TO TRANS$DONE;
03087   308700  1   IF TDSBUF(5)='S' THEN GO TO TRANS$DONE;
03088   308800  1   TIMEOUT=1; /*FORCE PROTOCOL TO RE-SIGN ON*/
03089   308900  1   CALL PROTOCOL;
03090   309000  1   TRANS$DONE:
03091   309100  1   CALL STATUS(10,4,0);
03092   309200  1   CALL STATUS(34,5,0);
03093   309300  1   CALL PRINT(4,.BSER(4),4);
03094   309400  1   CALL GET$PRINT$POSITION;
03095   309500  1   IF POSITION > 414 THEN DO;
03096   309600  1     CALL BLACK;
03097   309700  2     CALL DISPLAY$CLOCK;
03098   309800  2     CALL PRINT(0,.0DH,1);
03099   309900  2     CALL PRINT(2,.0AH,1);
03100   310000  2     CALL PRINT(0,.CLOCKDISP1(6),6);
03101   310100  2     CALL RED;
03102   310200  2   END;
03103   310300  1   B=B-4;
03104   310400  1   DO C=B TO STORAGETOP;
03105   310500  1     STORAGE(C)=STORAGE(C+4);
03106   310600  2   END;
```

```
03107   1   310700      STORAGE$TOP=STORAGE$TOP-4;
03108   1   310800      FREE=STORAGE$TOP;
03109   1   310900      SPACEQTY=((STORAGELIMIT-5)-FREE)/10;
03110   1   311000      CALL DISPLAY$QUANTITY(SPACEQTY,14,76);
03111   1   311100      IF (STORAGE(B) AND OFOH) = OFOH THEN DO;/*DELETE DWG*/
03112   1   311200      B=B-6;
03113   2   311300      DO C=B TO STORAGETOP;
03114   2   311400      STORAGE(C)=STORAGE(C+6);
03115   3   311500      END;
03116   2   311600      STORAGETOP=STORAGETOP-6;
03117   2   311700      FREE=STORAGETOP;
03118   2   311800      SPACEQTY=((STORAGELIMIT-5)-FREE)/10;
03119   2   311900      CALL DISPLAY$QUANTITY(SPACEQTY,14,76);
03120   2   312000      IF STORAGE$TOP=TABLE$TOP THEN DO;
03121   2   312100      FREE=STORAGE$TOP;
03122   3   312200      CALL HANG$UP$HOST;
```

What is claimed is:

1. A method of tracking and preventing diversion of articles comprising the steps of:
   a. associating with an article an initial label having an alphanumeric character field identifying the nature of said article and a serial number placing said article within a series of similar articles;
   b. reading said initial label with an OCR device for entry into a computer memory;
   c. identifying a particular storage location for said article, said storage location having articles of a similar nature disposed therein;
   d. placing said article in said particular storage location;
   e. printing a log of said articles, said log including the nature, serial number, and said particular storage location for said article;
   f. selecting some of said articles within said storage locations as certain articles for distribution;
   g. retrieving each of said certain articles from its particular storage location;
   h. reading said initial label associated with each of said certain articles with an OCR device;
   i. printing a sequential label having an indicia disposed thereon uniquely identifying one certain article of said articles generated by a computer for each of said certain articles;
   j. associating said sequential label with said one certain article; and
   k. distributing said article only after step j.

2. The method as set forth in claim 1 wherein steps c, e, and i, include selectively printing characters in a first color and a second color, said OCR device being capable of reading characters printed in said first color and being incapable of reading characters printed in said second color.

3. A method of tracking articles comprising the steps of:
   a. associating an initial label with each article, said initial label having an OCR readable alphanumeric character field identifying said article as to its nature and a serial number locating said article within a series of similar articles;
   b. reading said initial label with at least one OCR device for entry into a memory located within a computer;
   c. printing a log produced by said computer from said alphanumeric field including an assigned particular storage location for each article selected from a plurality of storage locations; said storage locations being adapted to receive said articles therein;
   d. placing said article within said assigned particular storage location;
   e. selecting at least some of said articles as certain articles for distribution from said storage locations;
   f. retrieving each of said certain articles from its assigned storage location;
   g. printing a sequential label having an indicia disposed thereon which uniquely identifies one certain article of said certain articles, said indicia generated from a set of alphanumeric characters and stored conjunctive with the nature thereof by said computer for each of said certain articles;
   h. associating said sequential label with said one certain article;
   i. distributing said articles;
   j. reading said indicia on said sequential label with at least one OCR device;
   k. placing said article in a storage location with similar articles as determined by said computer from said indicia; and
   l. repeating steps i-k as desired until said article is finally utilized to prevent diversion thereof.

4. A system of material control for a plurality of articles, an initial OCR readable label associated with each article and having an alphanumeric character field disposed thereon representing the nature of the article,
   a. a plurality of OCR devices, each OCR device reading alphanumeric characters and producing an electronic representation of each character read, at least one OCR device reading said initial labels;
   b. a computer receiving and storing as data said electronic representation from each OCR device, said computer generating a unique identifying indicia for said article in response to said one OCR device reading said associated initial label and for storing said indicia conjunctive with the nature thereof;
   c. a printer receiving said indicia from said computer to print said indica in response thereto onto another OCR readable label to be read by at least one OCR device;
   d. a keyboard for entering data and instruction to said computer; and
   e. a visual display for exhibiting information from said computer.

5. A material control system for use in a facility for tracking articles within said system and preventing diversion thereof, said system having at least one computer means coupled to a memory capable of storing data, said system comprising:

a. at least one OCR device capable of reading a predetermined set of human readable alphanumeric characters disposed on printed mediums and producing an electronic representation upon reading a printed medium of said characters as OCR data signals;
b. an initial label associated with each article having a serial number identifying said article within a series of similar articles and the nature of said article comprised of characters selected from said predetermined set, said initial label forming one of said printed mediums;
c. data means for storing said OCR data signals within said memory;
d. means responsive to said OCR data signals to generate indicia signals uniquely identifying said article, said indicia signals corresponding to characters selected from said predetermined set;
e. means coupled to said data means and responsive to said indicia signals for storing within said memory said indicia signals conjunctive with said OCR data signals produced from said initial label;
f. a printer means receiving said indicia signals to print in response thereto a sequential label having a unique identifying indicia disposed thereon to form a printed medium comprising characters from said predetermined set; and
g. revision means for entering revision status of said article and including a data storage means including a revision status file containing the latest revision for articles having a nature similar to said article, means for accessing said revision status, and revision status means for comparing the revision status of said article with said latest revision for articles of a similar nature to said article.

6. A system as set forth in claim 5 including status indication means connected to said revision status means for indicating when the latest revision for articles of a similar nature to said article and the revisions status of said article are identical.

7. A system as set forth in claim 5 wherein said data storage means includes an assembly file means having at least one listing of the natures of a plurality of articles required to construct a particular assembly.

8. A system as set forth in claim 5 wherein said data storage means includes an article file means, said system including means for storing OCR data signals into said article file means from said memory, and means for indicating if said OCR data signal stored within said article file means includes each of said certain natures.

* * * * *